(12) United States Patent
Tree

(10) Patent No.: US 7,110,979 B2
(45) Date of Patent: Sep. 19, 2006

(54) SECURE PAYMENT METHOD AND SYSTEM

(75) Inventor: Ian David Tree, Jersey (GB)

(73) Assignee: Virtual Access Limited, St. Helier ( * ) Notice: Subject to any disclaimer, the term of this patent is extended or adjusted under 35 U.S.C. 154(b) by 775 days.

(21) Appl. No.: 09/859,206

(22) Filed: May 16, 2001

(65) Prior Publication Data
US 2002/0165821 A1    Nov. 7, 2002

(30) Foreign Application Priority Data
May 2, 2001    (GB)    ................................ 0110808.3

(51) Int. Cl.
G06Q 40/00    (2006.01)
(52) U.S. Cl. .......................................... 705/39; 705/35
(58) Field of Classification Search .................. 705/35, 705/39
See application file for complete search history.

(56) References Cited

U.S. PATENT DOCUMENTS

| | | | |
|---|---|---|---|
| 1,410,396 A | 3/1922 | Fiala | 152/242 |
| 4,142,069 A | 2/1979 | Stover | 179/15 BS |
| 4,992,940 A | 2/1991 | Dworkin | 364/401 |
| 5,122,950 A * | 6/1992 | Benton et al. | 705/44 |
| 5,336,870 A | 8/1994 | Hughes et al. | 235/379 |
| 5,768,385 A | 6/1998 | Simon | 380/24 |
| 5,903,880 A | 5/1999 | Biffar | 705/39 |
| 5,913,203 A | 6/1999 | Wong et al. | 705/39 |
| 5,915,093 A | 6/1999 | Berlin et al. | 395/200.49 |
| 5,930,777 A | 7/1999 | Barber | 705/40 |
| 5,937,394 A | 8/1999 | Wong et al. | 705/26 |
| 5,956,699 A | 9/1999 | Wong et al. | 705/39 |
| 5,999,919 A | 12/1999 | Jarecki et al. | 705/40 |
| 6,047,268 A | 4/2000 | Bartoli et al. | 705/35 |
| 6,047,269 A | 4/2000 | Biffar | 705/39 |
| 6,058,381 A | 5/2000 | Nelson | 705/40 |
| 6,138,107 A | 10/2000 | Elgamal | 705/39 |
| 6,157,917 A | 12/2000 | Barber | |

(Continued)

FOREIGN PATENT DOCUMENTS

EP    0678836    10/1995

(Continued)

OTHER PUBLICATIONS

Printouts from Millicent.com website, http://www.millicent.com/home3.html, 26 p., (1997-2000).

(Continued)

*Primary Examiner*—Alain L. Bashore
(74) *Attorney, Agent, or Firm*—Schwegman, Lundberg, Woessner & Kluth

(57) ABSTRACT

A secure payment method and system for payment for a product in electronic form comprises a customer's terminal and a merchant's terminal connected by a communications network. A customer uses a customer's terminal to request a product and at the customer's terminal, it is determined whether the product has previously been paid for by identifying if there is a corresponding transaction receipt stored at the customer's terminal. If there is a corresponding receipt this is transmitted with the request to the merchant's terminal. At the merchant's terminal, when the request is received, if there is an accompanying transaction receipt, the product is transmitted to the customer's terminal. If there is no accompanying transaction receipt, the transaction is recorded and a transaction receipt is generated and transmitted to the customer's terminal. A central server can be provided to aggregate transactions by periodically polling the merchant's terminal to retrieve transaction data and for periodically polling the customer's terminal to retrieve receipt data. The receipt data and the transaction data can be reconciled in order to authenticate transactions.

87 Claims, 32 Drawing Sheets

U.S. PATENT DOCUMENTS

| | | | | |
|---|---|---|---|---|
| 6,205,435 | B1 | 3/2001 | Biffar | 705/41 |
| 6,236,981 | B1 | 5/2001 | Hill | 705/67 |
| 6,594,692 | B1 * | 7/2003 | Reisman | 709/219 |
| 2001/0029484 | A1 * | 10/2001 | Schultz et al. | 705/39 |

FOREIGN PATENT DOCUMENTS

| | | |
|---|---|---|
| EP | 0697669 | 2/1996 |
| EP | 0829830 | 3/1998 |
| EP | 0951158 | 10/1999 |
| GB | 2304938 | 3/1997 |
| GB | 2331815 | 6/1999 |
| GB | 2341257 | 3/2000 |
| GB | 2363220 | 12/2001 |
| JP | 8278828 | 10/1996 |
| JP | 10028119 | 1/1998 |
| JP | 10127907 | 5/1998 |
| JP | 11045298 | 2/1999 |
| WO | WO-86/01323 | 2/1986 |
| WO | WO-97/22943 | 6/1997 |
| WO | WO-99/10823 | 3/1999 |
| WO | WO-99/13421 | 3/1999 |
| WO | WO-99/21321 | 4/1999 |
| WO | WO-99/27479 | 6/1999 |
| WO | WO-99/31612 | 6/1999 |
| WO | WO-99/60506 | 11/1999 |
| WO | WO-9956254 | 11/1999 |
| WO | WO-99/62037 | 12/1999 |
| WO | WO-0039721 | 7/2000 |
| WO | WO-00/62195 | 10/2000 |
| WO | WO-00/65519 | 11/2000 |
| WO | WO-0079367 | 12/2000 |
| WO | WO-0122374 | 3/2001 |
| WO | WO-01/82242 | 11/2001 |
| WO | WO-0250727 A1 | 6/2002 |

OTHER PUBLICATIONS

"Clickshare", http://www.clickshare.com/info/contentprovider.html, Clickshare Service Corp., Updated Oct. 28, 1999, 31 p., (Copyright 2000).

"QPass—Content Providers—QPass Digital Commerce Service", http://www.qpass.com/ContentProviderHome.asp, Qpass Inc., 5 p., (Copyright 1998-2001).

"Wave Systems Corp. Web Site—WAVE Secure Electronic Commerce and Content Distribution Services", http://www.wavecommerce.com/, Wave Systems Corp., 19 p., (Copyright 2000).

Gauthier, P., *Millicent and Authentication,* Summer Intern Talk, Digital Systems Research Center, 31 p., (1995).

Glassman, S., et al., *The Millicent micropayment commerce protocol,* DEC Systems Research Center, Palo Alto, 49 p., (1995-1996).

Glassman, S., et al., The Millicent Protocol for inexpensive electronic commerce, DEC Systems Research Center, Palo Alto, 33 p., (1995).

Glassman, S., et al., "The MilliCent Protocol for Inexpensive Electronic Commerce", *Proceedings of the 4th International World Wide Web Conference,* Compaq Computer Corporation, pp. 1-20, (Dec. 1995).

Manasse, M., *The Millicent Microcommerce System,* DIGITAL Systems Research Center, Palo Alto, 67 p., (1995-1997).

Manasse, M.S., *Design Considerations for light-weight electronic payment mechanisms,* DEC Systems Research Center, Palo Alto, California, 22 p., (1995).

Manasse, M.S., "The MilliCent Protocols for Electronic Commerce", *Proceedings of the 1st USENIX Workshop on Electronic Commerce,* Compaq Computer Corporation, pp. 1-8, (Jul. 1995).

International Search Report issued in PCT/GB02/02004, Sep. 23, 2003 (4 pgs.).

"United Kingdom Search Report for Application No. GB0416299.6, dated Aug. 23, 2004".

* cited by examiner

| Receipt - Standard |
|---|
| |
| ProtocolVersion<br>StructureVersion<br>ReceiptType<br>MasterSiteId<br>PublicationId<br>ContentId<br>SiteId<br>UserId<br>TransactionDate<br>ValidPeriod<br>Currency<br>Amount<br>AdditionalData |

*Fig. 12A*

| Receipt - Subscription |
|---|
| |
| ProtocolVersion<br>StructureVersion<br>ReceiptType<br>MasterSiteId<br>PublicationId<br>SiteId<br>UserId<br>TransactionDate<br>SubscriptionDate<br>ValidPeriod<br>Currency<br>Amount<br>AdditionalData |

*Fig. 12B*

User Preferences

Single Transaction Limits

| Above | Action |
|---|---|
| 0.05 | Ask ▷ |
| 4.00 | Req. Password ▷ |
| 10.00 | Refuse ▷ |

Sounds

Play Sound On
- ☑ Low Value Transaction — Select Sound
- ☑ Higher Value Transaction — Select Sound
- ☑ Showing Message Box

Spending Limits

Allow Overspend With Password

| Amount | |
|---|---|
| 7.00 | per Day ☑ |
| 40.00 | per Week ☑ |
| 150.00 | per Month ☑ |
| 500.00 | per Year ☑ |

Status Unlocked

Main Currency: USD ▷ (US Dollars)

Set Password | Cancel
Help | OK

| | | 153 | 151 | | 152 | | | |
|---|---|---|---|---|---|---|---|---|

Publication [?] [X]

Title: [Personal Computer World ▽]  [<< Edit Publication Title]
155

Publication Issue Display Order
☑ Special Sort   Sort Word [2 ⇕] In Issue Title As   ○ Weekday  ◉ Month  ○ Number

Publication Defaults — 154 — 157
☐ Use Site Defaults   ☑ Create Index Entry                              158
[HTML Template]   [C:\Program Files\Apache Group\Apache\htdocs\template.html]

Publication Charge Defaults
Charge By   ○ Issue   ◉ Page/File  — 156
                                        — 159                              164
Currency [USD ▽] (US Dollar)   Valid For   [Unlimited Period] 0
161                                                                           165
Cost  [.05]                        Publisher ID  [1000000001]  (Megabucks Inc)
162                — 160
"Per" [Page ▽] $              Show Files of Type  [*.pdf ▽]
                   — 163                                              — 166

Subscriptions
                                                                      168
| Period | Cost |        [Add Period]
|--------|------|        169
| 6 Months | $28 |      [Edit Period]
| 12 Months | $50 |     170
167                      [Delete Period]

171              172
[Add Publication] [Delete Publication]   [Cancel]   [OK]

*Fig. 23*

SECURE PAYMENT METHOD AND SYSTEM

FIELD OF THE INVENTION

The present invention generally relates to a secure payment method and system for making secure electronic payments over a network. The present invention also relates to the control of electronic spending by customers. The present invention further relates to the generation of index interfaces for retrieving products in electronic form. The present invention still further relates to the processing of time sensitive data such as electronic transaction data.

BACKGROUND OF THE INVENTION

Online transactions between customers and merchants over the Internet are becoming increasingly more common. Such transactions can comprise the purchase of products in electronic form such as software, video, images, text, data and any other material available in electronic form that can be delivered over a network such as the Internet. The transactions can also be for conventional goods in which case the goods are delivered offline.

The problem with online transaction systems is ensuring secure payment for the purchased goods. One form of payment which has been adopted widely is payment by credit or debit cards. This method of payment is particularly suited to electronic payments over the Internet since it only requires the transmission of a credit card number. However, this method of payment has received a great deal of publicity because it fails to provide security since the customer's credit card number is exposed over the Internet to fraudsters. Although a great deal of effort has been expended in increasing the security of transactions using credit card numbers for example using encryption, digital certificates and secure communication channels (e.g. the secure socket layer), there is still an inherent weakness in that the credit card number is transmitted for payment and held by servers.

Products provided over the Internet can range greatly in price. For transactions of a threshold value e.g. a dollar or more, a credit card transaction is commercially viable. However, where purchases made over the Internet have a much lower value, the payment for individual transactions by credit card is not commercially viable because of the transaction cost charged by the credit card companies. Thus micro payment systems have been developed in order to make micro payments by customers to merchants and to aggregate micro payments to make the billing of customers e.g. by credit card commercially viable.

An example of a prior art micro payment system is the QPass system disclosed in WO 00/33221. In this system customers and merchants register for the service. The customer and merchants are interconnected over a transaction network to which is connected a payment processor. When a customer wishes to make a purchase from a merchant, they log in to the system using a user name and password. The user name used need not be unique and is selected by the user during the process of registering for the service. A unique ID is generated for the user during registration and this is stored as a cookie on the customer's computer. Thus when a user logs on and enters their user name and user ID, the cookie is read from their computer and their unique ID is compared to the user's database. Once a user has logged on, a session cookie is stored on the user's computer and this is valid for a period of time. This enables the user to enter into transactions with merchants and the transactions are recorded at the payment processor. In this way payments made by customers for goods from merchants can be aggregated and the customer can be billed by the payment processor when appropriate e.g. when the aggregate amount reaches a threshold.

Although the QPass system provides a transaction network that enables users to register and be authenticated so as to allow aggregation of micro payments, the system relies on cookies. Cookies provide a low level of security since these can be read and accessed readily. Further, this system requires a user to set their browser to enable cookies.

SUMMARY OF THE INVENTION

It is an object of one aspect of the present invention to provide a secure transaction system allowing the aggregation of transactions that does not rely on the capabilities of a web browser.

In accordance with a first aspect, the present invention provides an electronic payment method and system for payment for a product in electronic form. In accordance with the present invention, the term "product" means any type of product that is deliverable in electronic form such as computer software, electronic data, audio, video, text, images and publications such as PDF files. The term "product" is applicable to both analogue and digital forms. The present invention is thus applicable to any type of content for which payment is required to allow the user to gain access to the content.

In accordance with the first aspect of the present invention, an electronic payment method and system comprises a plurality of customer terminals connected over a communications network to a plurality of merchant's terminals. At a customer's terminal, the user inputs a request for a product. Transaction receipt data for previously purchased products is stored at the customer's terminal and when a request is made for a product, the transaction receipts are read to identify if there is a transaction receipt for the product i.e. where the product has been purchased before. If a stored valid transaction receipt is identified it is transmitted over the communications network with the request for the product to a merchant's terminal. At the merchant's terminal the request for the product is received and it is determined if there is an accompanying transaction receipt. The product is transmitted back to the customer's terminal in response to the request. If there is no accompanying transaction receipt, a transaction receipt is determined and transmitted to the customer's terminal along with the requested product. The transaction is also recorded. At the customer's terminal, the requested product is received along with any transaction receipt. Received transaction receipts are stored for later use.

In the present invention, the term terminal refers to any type of processing apparatus capable of being operated by a user and as a product source for the user. The merchant terminal need not be operated by a merchant but can be operated on behalf of a merchant of product. The merchant terminal principally comprises a source of products in electronic form. The processing apparatus can in one embodiment comprise any suitable programmed processing apparatus that can be connected via a communications network.

In this aspect of the present invention, the use of transaction receipts act as tokens indicating that a product has already been paid for and should not be paid for again. Every time a transaction receipt is determined in response to a request from the customer, it is recorded at the merchant to enable the customer to be billed for provision of the products.

In this aspect of the present invention, the transaction receipts or tokens can have a limited lifetime. Thus the mere presence of a transaction receipt at the customer's terminal does not automatically mean that a customer will not be charged for retrieving a product again. For example, the transaction receipt can have a limited lifetime i.e. the product can only be retrieved freely for a limited period after the first retrieval at which point the product was paid for, or the transaction receipt could limit the number of times a product can be retrieved. This latter facility can be provided by monitoring each retrieval of a product and implementing a count recorded in a stored receipt for the product. Thus in the determination of whether or not there is a valid transaction receipt stored at the customer's terminal, the process will identify whether the validity period of the receipt has expired e.g. whether a predetermined period of time has elapsed since the receipt was issued, or whether the product has been retrieved a predetermined number of times and thus the receipt has expired. Expired receipts will not be transmitted to the merchant's terminal and a fresh transaction receipt will be issued by the merchant's terminal and stored at the customer's terminal.

The present invention is applicable to any form of communications network capable of enabling a customer's terminal to request a product in electronic form from a merchant terminal. The present invention is particularly suited to implementation over an Internet Protocol network which is a prevalently used network form. Thus the present invention is applicable to implementation over the Internet, an Intranet, an Extranet or a local area network, for example.

In one embodiment of the present invention, the customer's terminal preferably implements a client application for communication over the communications network and a merchant's terminal implements a server application for communication over the communications network. In this embodiment, an executable application independent of the client application is executed at the customer's terminal to intercept requests input by the user using the client application in order to control the use of transaction receipts and thus the billing of the customer for retrieval of the product. Thus in accordance with this embodiment of the present invention, a simple secure payment system is provided wherein the customer need not be involved in individual transactions. The customer simply requests a product and a transaction is recorded for first retrieval of the product automatically, enabling the user to retrieve the information freely for a period thereafter.

In a preferred embodiment of the present invention, the client application at the customer's terminal comprises a web browser and the server application implemented at the merchant's terminal comprises a web server. In this embodiment, the executable application is independent of the web browser and can conveniently act as a proxy server or can monitor HTTP requests at the socket layer.

In one embodiment the executable application is adapted to identify whether or not the request is a request for a chargeable product and to transmit the request unchanged over the communications network if the request is not for a chargeable product. This enables the application program to act transparently when a chargeable product is not required. When a request is for a chargeable product, a transaction receipt, if available, is added to the request for transmission over the communications network by the executable application.

In a preferred embodiment, the client application comprises a web browser at the customer's terminal and the server application at the merchant's terminal comprises a web server. Thus the request comprises a hyper text transfer protocol (HTTP) request wherein code can be added to the request to identify the request as a request for a chargeable product. The type of request can thus be identified by the executable application by identifying code added to the HTTP request. Conveniently, this code is added as non HTTP significant ASCII code. In accordance with the first aspect of the present invention, the generation of transaction receipts or tokens at a merchant's terminal and the storage of the transaction receipts at the customer's terminal provides a simple secure and automatic payment system for products in electronic form. The use of local storage of transaction receipts provides a secure means by which a user can retrieve subsequent copies of the product without further charge. Thus this aspect of the present invention encompasses the method and apparatus of the customer's terminal and the method and apparatus of the merchant's terminal.

In one embodiment of the first aspect of the present invention, the customer's terminal can transmit transaction receipts to a remote payment server over the communications network. This provides for the reconciliation of transactions recorded by the transaction receipts stored at the customer's terminal and the transaction data stored at the merchant's terminal.

In an alternative embodiment of the first aspect of the present invention, a customer's terminal receives transaction information from a remote payment server over the communications network and the received transaction information is compared with the stored transaction receipts. Information on the result of the comparison is then returned to the payment server. In this embodiment the bulk of the reconciliation for transactions for a user is performed within the customer's terminal. Only the result of the reconciliation process is returned to the payment server.

In another embodiment of the present invention, in addition to individual transaction receipts, the system provides for subscription receipts for subscription to regularly provided products such as electronic magazines or any other product which is published or made available on a regular basis. In this embodiment of the present invention, the user can input a request for a subscription and this request is transmitted over the communications network to the merchant's terminal. At the merchant's terminal, a subscription receipt is generated and the subscription transaction is recorded in the transaction data store. The subscription receipt is transmitted over the communications network to the customer's terminal where it is stored and used in a similar manner to the transaction receipt. The subscription receipt can be used by a customer's terminal to determine whether the product requested by the customer is one to which a customer has subscribed, e.g. an issue of a magazine to which the customer subscribes, or a medium type e.g. movie for which the customer has subscribed to receive. Thus, the subscription receipt comprises a special case of a transaction receipt which represents a transaction not just for a specific retrievable product but rather for a collection of retrievable products.

In one embodiment of the present invention, in order to provide enhanced security, the request for the product as submitted by the customer's terminal includes unique user identification information. This enables the merchant's terminal to perform a validation on the user identification information to prevent unauthorised requests for information being responded to.

The second aspect of the present invention is concerned with the aggregation of transactions in a secure manner. A transaction aggregation apparatus and method aggregates transactions for products in electronic form from a plurality of vendor apparatuses. Transaction data is retrieved periodically from product vendor apparatuses. The transaction data represents transactions for a plurality of products by a plurality of users. Also, information on receipt data is periodically retrieved from users' computers. Thus the users and the vendors store information on the transactions carried out between them. Within the transaction aggregation apparatus, transactions are reconciled using the received transaction data from the product vendor apparatuses and the information on receipt data from the users' computers. The reconciled transactions are then aggregated for individual users and for individual suppliers of the products in respective users' accounts and product suppliers' accounts.

Thus, in accordance with this aspect of the present invention, only the cost of reconciled transactions are aggregated. This ensures that both the merchant and the customer agree on the transactions by virtue of having corresponding transaction data. This prevents the vendors from trying to charge the customers for products that they have not received. This also helps to identify where hackers have gained access to products and have caused a transaction associated with a user to be generated. The user will not be billed for such transactions because their computers do not contain corresponding transaction data. A method of determining whether a user has interfered with the user's receipt file is provided.

In one embodiment of the present invention, the data received from the users' computers comprises receipt data for products and the transaction reconciliation is achieved by comparing the received transaction data from the product vendor with the receipt data from the users' computers.

The transaction aggregation apparatus in accordance with one embodiment can include interface means to allow users and its suppliers to access their respective accounts. It can also include an interface to a financial institution for the transfer of funds to pay the reconciled transactions in the user's accounts and to transfer funds to accounts for product suppliers for reconciled transactions in the user's account for respective product suppliers.

A third aspect of the present invention provides a secure payment method and system for payment for products in electronic form over a communications network. At a user's computer, a client application is executed for the generation of a request for a product in response to user input. An intermediate application is executed simultaneous with the client application to intercept the request before it is sent over the network, to add unique user identification information to the request and to send the request over the network to a product provider's computer. At the product provider's computer server application means is executed to receive the request, to authenticate the user using the user identification information, and if the user is authenticated, to send the requested product over the network to the user and to record the sending of the product as a transaction in a transaction store to allow the billing of the user for the product.

In accordance with this third aspect of the present invention, the use of a separate intermediate application provides additional security without requiring any interaction by a user with the client application. The intermediate application is able to identifying a request for a product for which there is a charge, and to add user identification information to the request for validation of the transaction. Thus the intermediate application acts as a filter, allowing requests for non-chargeable information to pass through unaffected.

In one embodiment of the third aspect of the present invention, the client application comprises a web browser application and the server application comprises a web server application and at least one associated application for authenticating the user, recording the sending of the requested product and for controlling the web server to send the requested product. In this embodiment, the requests for a product are generated as a hyper text transfer protocol (HTTP) request and the HTTP request is intercepted by the intermediate application if it is detected from the HTTP request that it is a request for a product for which there is a charge. The HTTP request can be modified in any suitable way such as the addition of non HTTP significant code, or the inclusion of a program name or any other recognisable pattern of text. The interception of the HTTP request simply requires the identification of a segment of known characters in the request. The request can then be modified to include the unique user identification information e.g. by encoding the information as ASCII characters and adding the characters to the request before sending the modified request over the network.

Thus in accordance with one embodiment of the first invention, the interface application acts as a proxy server to the web browser to intercept the HTTP requests. This means that the interface application comprises code that is independent of the browser application and can thus provide functionality which is independent of the functionality of the web browser. This enables secure communication of information without requiring the security features of the web browser to be enabled. This provides for automatic secure communication to facilitate the transaction without requiring user intervention.

A fourth aspect of the present invention provides a method and apparatus for controlling the spending of a user when requesting chargeable products in electronic form over a communications network from a product provider. A user interface enables a user to input spending limit data for storage. Transaction data for requested and provided products is also stored. Requests for chargeable products over the communications network are monitored and the cost of the requested products are determined. Either the determined costs are compared with the stored spending limit data, or the determined cost and the stored transaction data are compared with the stored spending limit data to determine if the spending limit represented by the stored spending limit data is exceeded. If the spending limit is exceeded, an output is generated. The output can simply prevent the transaction proceeding. Alternatively or in addition, the output can comprise a warning to the user. The warning can for example comprise a visual and or audio warning.

Thus in accordance with this embodiment of the present invention, the user is able to self-regulate their spending limits by pre-setting the spending limit and allowing the system to monitor what they spend on chargeable products.

In one embodiment of this aspect of the present invention, exchange rate data is stored and the spending limit data is stored to represent the spending limit in a first currency. Products are chargeable in one or more second currencies different to the first currency. The determination of the cost of requested products uses the exchange rate data. Thus, this embodiment of the present invention enables a user to monitor their spending when performing transactions in a multitude of currencies by monitoring spending in their home currency.

In one embodiment of this aspect of the present invention, the user interface allows a user to input at least one spending limit amount and at least one associated spending limit period as the spending limit data e.g. $10 over one week. Spending control is achieved by comparing the determined cost of the stored transaction data with the stored spending limit data to determine if the spending limit represented by the spending limit data is exceeded. Thus in this embodiment of the present invention, an aggregate transaction total is used in the monitoring of spending.

In another embodiment of this aspect of the present invention, the user interface allows a user to input a spending limit amount for a single transaction. Spending limit control is achieved by comparing the determined cost with the stored spending limit data in order to determine if the spending limit represented by the spending limit data is exceeded.

In another embodiment of the present invention, the user interface allows an user to input at least one spending limit amount for a single transaction and at least one associated warning to be output if the spending limit is exceeded. With the stored spending limit data, an indication of the or each associated warning is stored. Spending control is achieved by comparing the determined cost with the stored spending limit data to determine if the spending limit represented by the spending limit data is exceeded and to select a warning to be output to a user dependent upon the spending limit exceeded.

In another embodiment of this aspect of the present invention, transmission of requests for products over the communications network is prevented if the requested product causes a spending limit represented by the spending limit data to be exceeded. Thus in this way, the spending limit is never exceeded because the cost of a requested product is determined before the request is allowed to be passed on to the product supplier. In an alternative embodiment to the present invention, the request can be allowed to be sent to the product supplier and the warning only generated after the spending limit has actually been exceeded. Thus this alternative embodiment of the present invention does not prevent the retrieval of the product, it simply provides a warning to the user that they are exceeding their spending limit.

In a further embodiment of the present invention, the user interface allows a user to enter a spending limit override instruction. Thus in this embodiment of the present invention, when the request for the product is not sent before the warning is generated to the user, a user can enter an override instruction to cause the request to be sent even though the spending limit is exceeded. The override instruction can for example require the input of a password to ensure the validity of the override instruction.

In accordance with one embodiment of this aspect of the present invention, the request for the product includes cost data and the spending control is achieved by determining the cost of the product from the cost data. In an alternative embodiment, cost data for the requested product is received from the product provider over the communications network before the request is sent to the product provider. The cost data is used to determine the cost of the product.

A fifth aspect of the present invention comprises a method and system for providing a user interface for the retrieval of products in electronic form. At least one displayable template into which links to products are to be added is received. Index data representing an index of products to be accessed is generated, wherein the index is organised hierarchically in a manner dependent upon the type of product. A plurality of displayable index interfaces is generated, where each index interface is formed from a template with added links to products or groups of products. The links are arranged in accordance with the structure and order of the hierarchical system.

Thus in accordance with this aspect of the present invention, displayable index interfaces are generated using templates by adding indexes to products or groups of products into the templates in accordance with the predetermined hierarchical organisation of the index data. This aspect of the present invention enables the generation of index data in a structure in which they are to appear in user interfaces. This provides an improved navigable user interface for retrieval of products.

In one embodiment of the present invention, each displayable template comprises a template in hyper text markup language (HTML) and the plurality of displayable index interfaces comprise a hierarchical set of linked web pages, each with hyper text links to products or groups of products. Thus in this embodiment of the present invention provides a method of automatic generation of indexed web pages from a web page template based on organised index data. The HTML templates can include tags to identify the position in which the links to the products are to be added. This enables the index page templates to be written using any standard HTML editor with the insertion of special tags to be used in the automatic generation of the indexed web pages.

In one embodiment of the present invention, the index interfaces are generated for products available at a site. Data representing the index data is transmitted to a remote central computer for the central indexing of products at a plurality of sites.

In another embodiment of the present invention, the products have a cost associated with them. Cost data can be input for the products and cost information is included in the displayable index interfaces to indicate the cost of retrieval of the products to the user.

In another embodiment of the present invention, the links comprise images e.g. thumbnail images. The displayable index interfaces are generated by automatically arranging the images in the index interfaces in accordance with the order of their associated products or groups of products in the index data. This automatic arrangement of images or icons comprising links to products provides a standard organised interface to a user in an organised way in which the structure can easily be recognised and understood by a user.

A sixth aspect of the present invention provides a method and system for processing time sensitive data over a communications network. At a first processing apparatus such as a merchant's computer, the clock of the computer, a first clock, provides a first time. A reference time is obtained by connecting to a reference computer over the network. A first offset time is determined by comparing the reference time and the first time. A corrected first time is calculated using the first time and the first offset time and the time sensitive data is processed using the corrected first time. The data is then sent with associated corrected first time to a second processing apparatus e.g. a customer's computer. At the second processing apparatus an internal clock, a second clock, provides a second time. A reference time is obtained by connecting to a reference computer over the network. A second offset time is determined by comparing the reference time and the second time. A corrected second time is calculated using the second time and the second offset time. The corrected second time is then used for the processing of the data with associated corrected first time provided by the first processing apparatus.

This aspect of the present invention enables two different processing apparatuses having two different internal clock times to process time sensitive data without having to reset or synchronise their internal clocks. The same reference clock need not be accessed by both computers to enable the calculation of a time offset for each. The time offset is used in the processing of data sent from one computer to the other. In a processing network there can be more than one reference clock available at respective time servers. Different reference clocks can be used so long as these are synchronised which is common in processing networks such as the Internet.

This aspect of the present invention is particularly suited to the processing of transaction receipts in accordance with the previous aspect of the present invention to enable the validity of the receipt to be determined by the customer's computer and the merchant's computer.

Although each aspect of the present invention has been defined hereinabove independently, each aspect can be used in any combination with any other aspect of the invention.

The present invention can be implemented in any convenient form e.g. using dedicated hardware, or a mixture of dedicated hardware and software. The present invention is particularly suited to implementation as computer software implemented by a network of processing apparatuses. The communications network can comprise any conventional terrestrial or wireless communications network. The processing apparatuses can comprise any suitably programmable apparatuses such as a general purpose computer, personal digital assistant, mobile telephone (e.g. a WAP phone) etc. Since the present invention can be implemented as software, each and every aspect of the present invention thus encompasses computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over a IP network e.g. the Internet. The carrier medium can also comprise a storage medium for storing processor readable code such as a floppy disk, hard disk, CD ROM, magnetic tape device or solid state memory device.

BRIEF DESCRIPTION OF THE DRAWINGS

Embodiments of the present invention will now be described with reference to the accompanying drawings, in which:

FIG. 12a is a table of the information contained in a transaction receipt;

FIG. 12b is a table of the information contained in a subscription receipt;

FIG. 13 is a diagram of the user interface generated by the payment application to enable a user to input spending limit data;

FIG. 22 is a diagram of the user interface provided by the web site manager at the information server for entering index data and cost data in the embodiment of the present invention;

FIG. 23 is a diagram of the user interface for entering information on publications;

DETAILED DESCRIPTION OF THE INVENTION

In the embodiment of the present invention described hereinafter with reference to the accompanying drawings, the vendible product purchased by the user is termed content or information. Specifically, the information comprises the content of magazine publications. It is however to be understood that the present invention is not limited to the retrieval of information. The present invention encompasses retrieval of any content or product for which a charge can be made and which can be retrieved over a network by a user. Thus the present invention encompasses the purchase electronically of video, images, documents, computer data files, computer software, audio, etc.

The specific embodiment will now be described with reference to the retrieval of the content of magazine publications.

Figure 1:
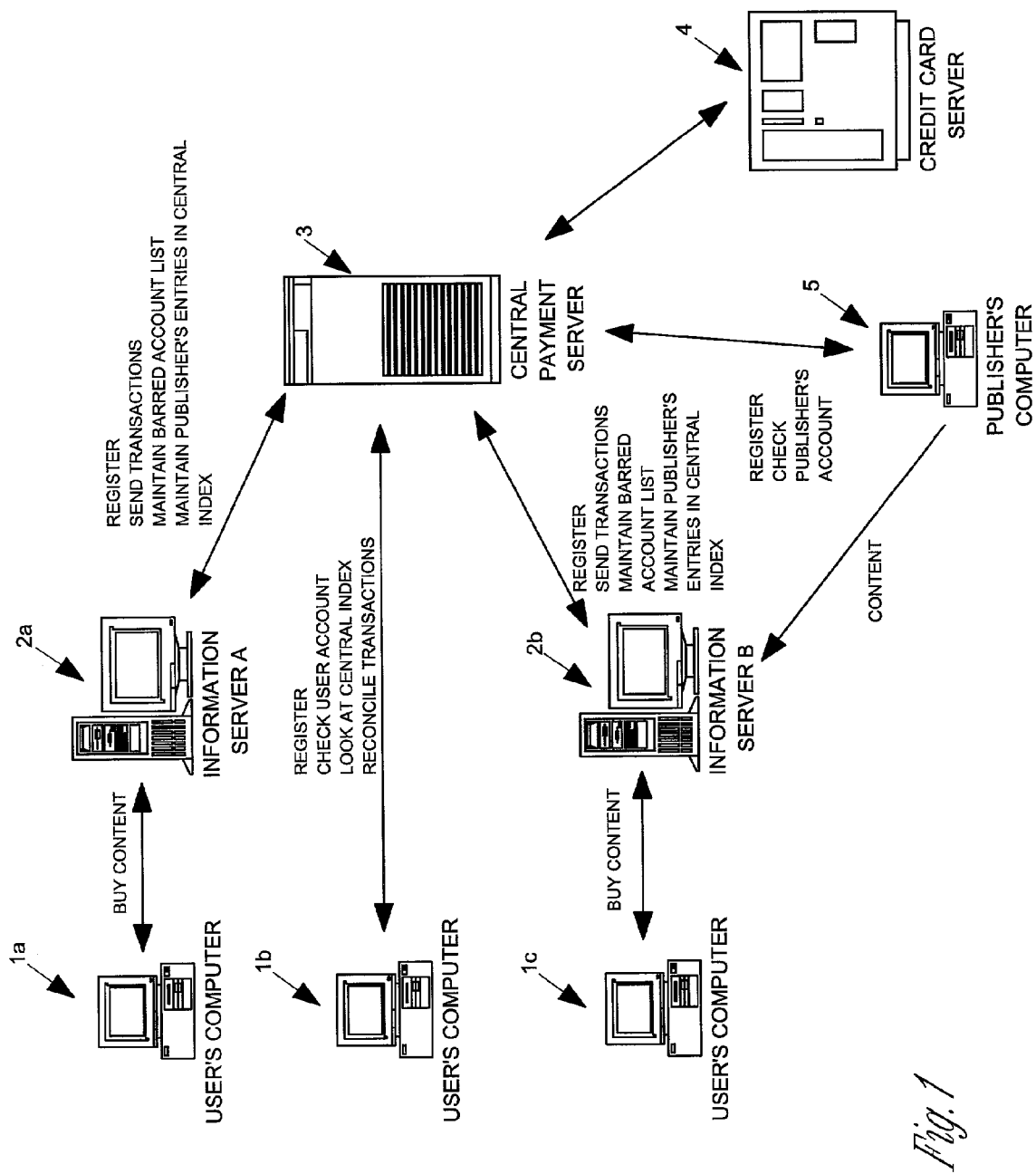
FIG. 1 is a schematic diagram of the secure payment system in accordance with an embodiment of the present invention.

FIG. 1 is a schematic diagram of a system in which users of user's computers 1a and 1c access information servers 2a and 2b in order to access information in the form of the content of magazine publications in this embodiment. In order to buy the content from the information servers 2a and 2b, the users must first register and set up an account with a central payment server 3. This is illustrated in FIG. 1 by a user's computer 1b accessing the central payment server 3 to register for the service and to set up an account. Thus the central payment server 3 holds a user's account that can be accessed by the user's computer 1b in order to check the account. The central payment server 3 also holds a central index of all information available at the information servers 2a and 2b. This can be accessed by the user's computer 1b in order to identify any information server 2a or 2b holding the desired information to be purchased. Direct communication is also established between the central payment server 3 and the user's computer 1b in order to reconcile user's transactions. Receipts for information purchased using the system are stored at the user's computer and information regarding the receipts is transferred to the central payment server 3 during a reconciliation process as will be described in more detail hereinafter.

The information servers 2a and 2b provide information to the user's computers 1a and 1c when requested. They will also provide receipts for the information as will be described in more detail hereinafter. Each information server 2a and 2b communicates with the central payment server 3 to initially register to join the service and thereafter to send information regarding the transactions to the central payment server 3. Further, index information on the information stored at the information server 2a and 2b and available to the user's computer 1a and 1c is passed to the central payment server 3 for the formation of a central index to be made available to users. Information servers 2a and 2b are provided with information on the users for whom the service is being suspended i.e. a barred account list.

The central payment server 3 also communicates with a credit card payment server in order to receive funds for settling a user's account.

A publisher's server 5 comprises a source of information content that is made available to the information servers 2a and 2b. The publisher's computer 5 communicates with the central payment server 3 in order to initially register to join the service and then to be able to check the publisher's account.

Thus as illustrated in FIG. 1, the system of the present invention provides for the provision of information to the users from the information servers at a charge which is aggregated at a central payment server 3 in a user's account. A particular security feature of the present invention is that receipts for transactions are stored at the user's computer 1a and 1c to prevent a user having to pay again for information content for which they have already paid. These receipts can be reconciled with the transaction information stored and aggregated at a central payment server 3 in order to detect fraudulent transactions.

Figure 2:
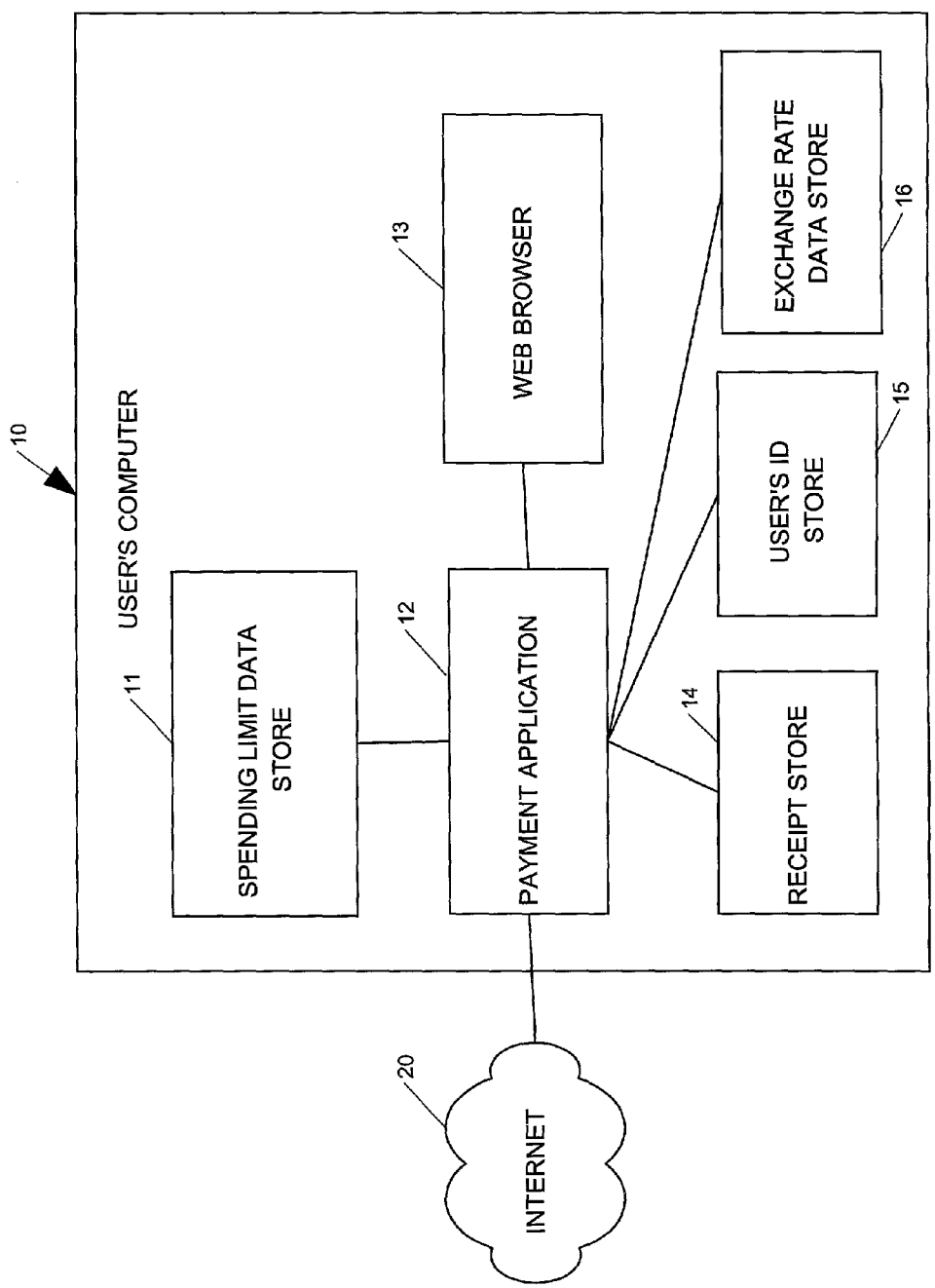
FIG. 2 is a schematic functional diagram of a user's computer in the embodiment of the present invention.

FIG. 2 is a schematic functional diagram of a user's computer 10 used in the embodiment of the present invention illustrated in FIG. 1 as the user's computer 1a, 1b or 1c.

The user's computer can comprise any processing apparatus which is connected to the Internet 20 for communication with the information servers 2a and 2b and the central payment server 3.

The user's computer 10 comprises a payment application 12 acting as an intermediary between a web browser 13 and the Internet 20. All communications to and from the web browser 13 are monitored by the payment application 12. Thus, the payment application 12 intercepts all hyper text transfer protocol (HTTP) requests from the web browser 13 and responses from the Internet 20. In this preferred embodiment, the payment application 12 is configured as a web proxy and the link between the payment application 12 and the web browser 13 is achieved by the web browser 13 being configured to access the web proxy over a local port.

The payment application 12 has access to spending limit data in a spending limit data store 11, receipt data in receipt store 14, the user's identification data in a user's ID store 15 and exchange rate data in an exchange rate data store 16. The use to which this data is put will be described in more detail hereinafter.

In this embodiment of the present invention, the user's computer 10 comprises a general purpose computer e.g. a personal computer configured with appropriate software comprising a web browser 13 and a payment application 12 with appropriate data stored in a data store such as a hard disk drive.

Figure 3:
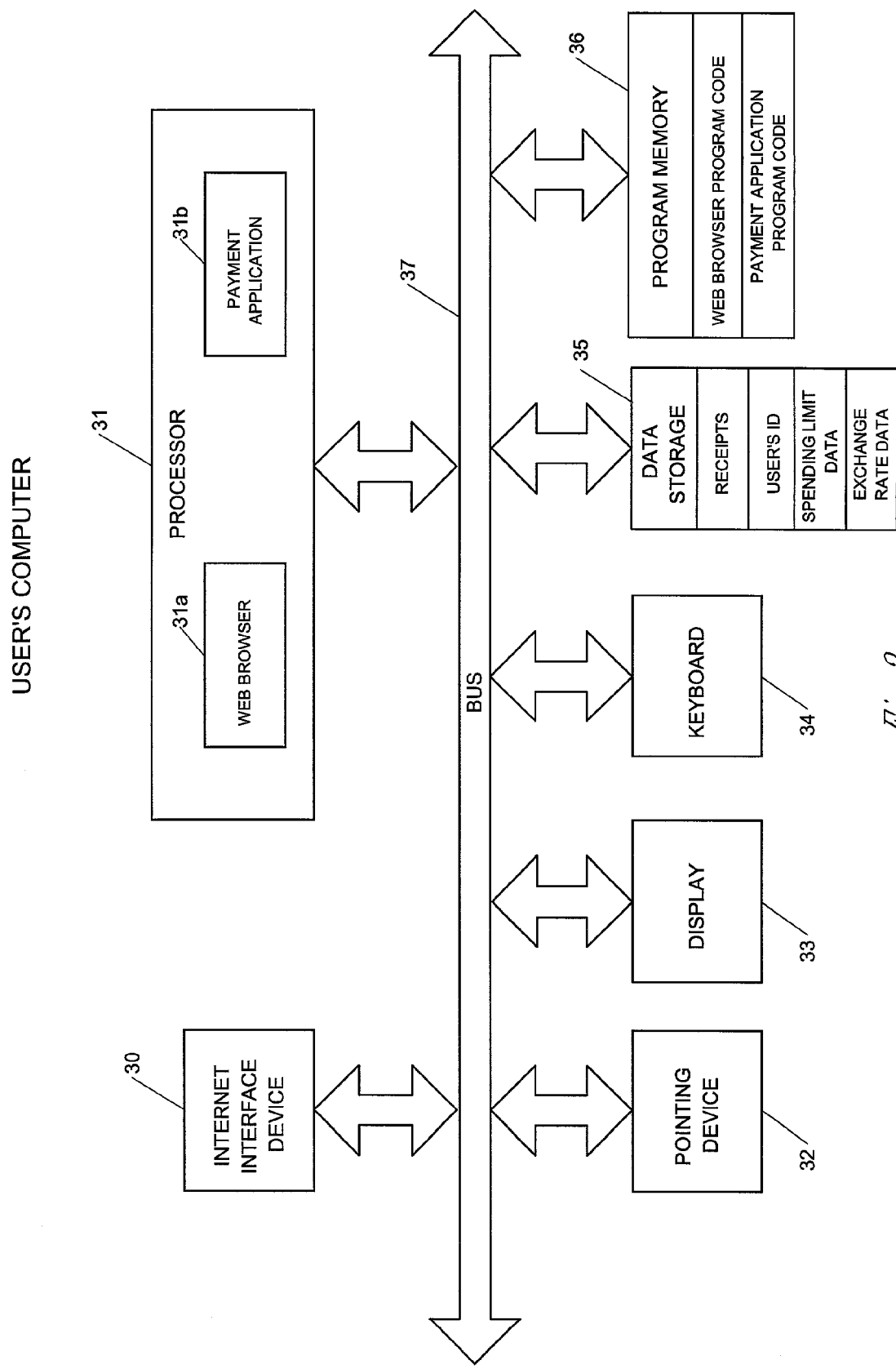
FIG. 3 is a schematic diagram of the structure of the user's computer in the embodiment of the present invention.

FIG. 3 is a schematic diagram of the architecture of a user's computer in accordance with the embodiment of the present invention. The user's computer comprises a pointing device 32 e.g. a mouse, a display 33, and a keyboard 34. An Internet interface device 30 such as a modem or local area network interface is provided to connect the user's computer to the Internet 20. A program memory 36 e.g. a hard disk drive, CD ROM, floppy disk or programmable read only memory device is provided to store program code for controlling a processor 31 provided within the computer. The processor 31 operates to read the program code stored in the program memory 36 and to implement it. Web browser program code is read by the processor 31 to implement a web browser 31a. Payment application program code is read from the program memory 36 to implement the payment application 31b. The data storage device 35 e.g. a hard disk drive, CD ROM or random access memory (RAM) stores data used by the processor 31 during implementation of the web browser 31a and payment application 31b. Specifically, receipts, the user's ID, spending limit data and exchange rate data are stored for use by the payment application 31b.

The components of the user's computer are interconnected by a control and data bus 37.

Figure 4:
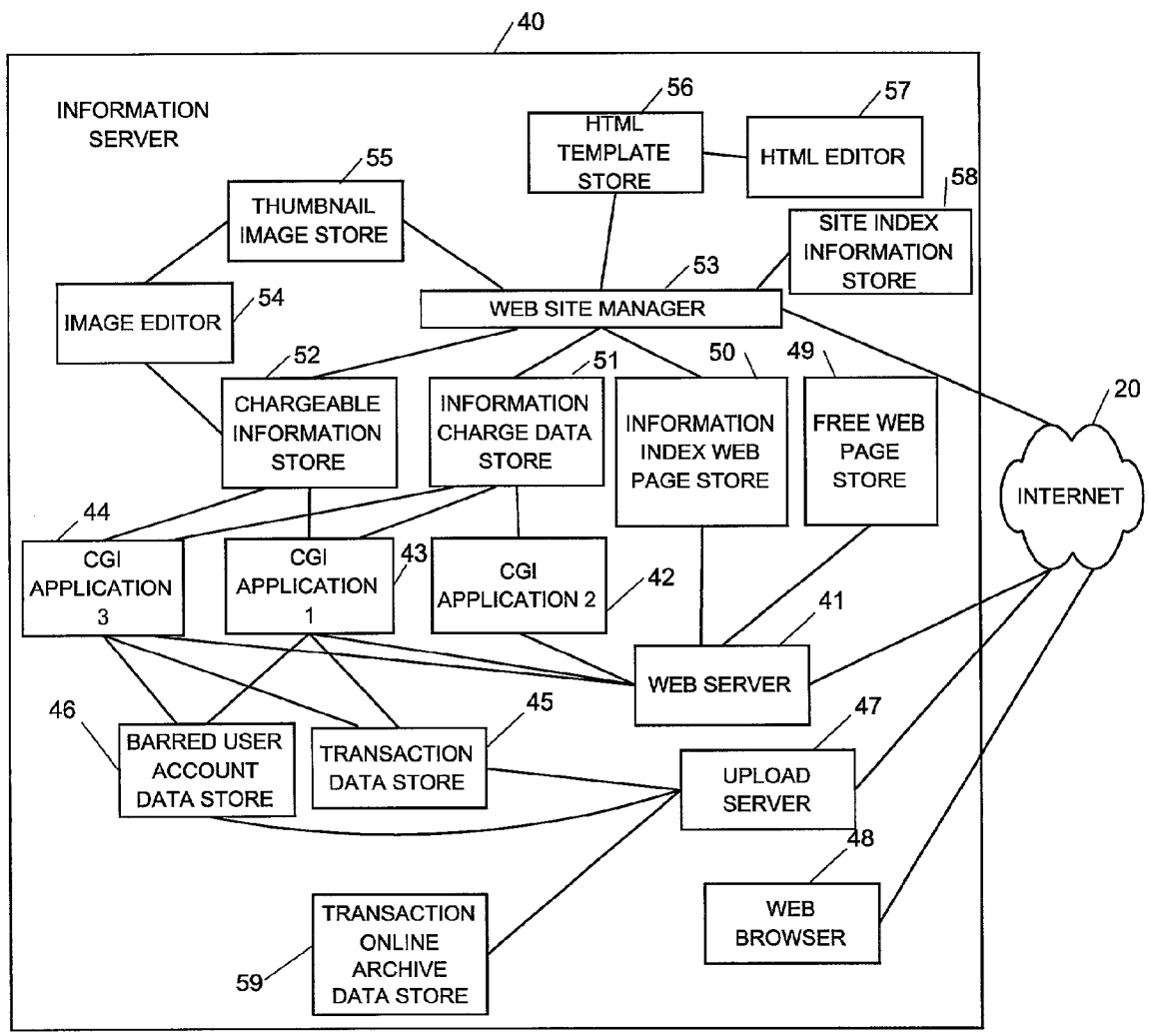
FIG. 4 is a schematic functional diagram of an information server in the embodiment of the present invention.

FIG. 4 is a schematic functional diagram of an information server 40 in accordance with an embodiment of the present invention. Information server 40 is connected over the Internet 20 to user's computers and the central server.

A web server 41 is provided connected to the Internet 20 to provide access to free web pages stored in the free web page store 49. Web server 41 also provides access to information index web pages stored in an information index web page store 50. The web pages in the stores 49 and 50 can be accessed from the web server 41 using a conventional web browser. Operating in the background behind the web server 41 are three common gateway interface applications 42, 43 and 44 which receive information from the web server 41 using the common gateway interface (CGI) standard. Each of these applications performs specific functions as will be described in more detail hereinafter. The second CGI application 42 processes information in the information charge data store 51 in order to provide file identification information. The first CGI application 43 performs the main transaction function within the information server 40 and thus accesses a transaction data store 45 to store transaction information and has access to a barred user account data store 46 in order to determine whether a user requesting a transaction has been barred from using the service. The first CGI application 43 also has access to the information charge data store to determine charge information. The first CGI application 43 also has access to the chargeable information store 52 which contains the information which is requested by a user. Thus the first CGI application 43 not only stores transaction information but also responds with requested information for which there is a charge. The third CGI application 44 performs a subscription function as will be described in more detail hereinafter. This application has access to the transaction data store 45 in order to store subscription transactions and access to the barred user account data store 46 in order to determine whether the user requesting a subscription to information has been barred from the service. Also the third CGI application 44 has access to the information charge data store 51 in order to obtain chargeable information when users have subscription receipts.

An upload server 47 is provided in the information server 40 in order to upload transaction data in the transaction data store 45 over the Internet 20 to the remote payment server. A transaction online archive data store 59 is provided for the storage of transaction files after the transfer of the transaction file when the upload server 47 is polled, as will be described in more detail hereinafter. The information server 40 is also provided with a web browser 48 connected to the Internet 20 to be used by an operator of the information server 40 (i.e. a web master or administrator) in order to register the information server 40 (i.e. as a web site containing information available to users).

The information server 40 is also provided with a web site manager application 53 which is connected to the Internet 20 to enable index information in a site index information store 58 to be sent to the central payment server for the formation of a central index. The web site manager 53 performs the function of configuring and managing the information in the chargeable information store 52 made available to customers. Thus, the web site manager application 53 has access to the chargeable information store 52. The web site manager application generates and manages the information charge data in the information charge data store 51, index information in the site index information store 58, and the information index web pages in the information index web page store 50. For the generation of the information index web pages, the web site manager application 53 uses hyper text mark-up language (HTML) templates stored in the HTML template store 56. The HTML templates in the HTML template store are generated by an HTML editor 57.

The web site manager application 53 also has access to thumbnail images stored in a thumbnail image store 55. An image editor 54 accesses chargeable information in the chargeable information store 52 in order to generate the thumbnail images in the thumbnail image store 55. The thumbnail images in the thumbnail image store 55 are used for generating links for information by the web site manager 53 in the information index web pages which are stored in the information index web page store 50.

The information server 40 can be implemented using any suitable program processing apparatus.

Figure 5:
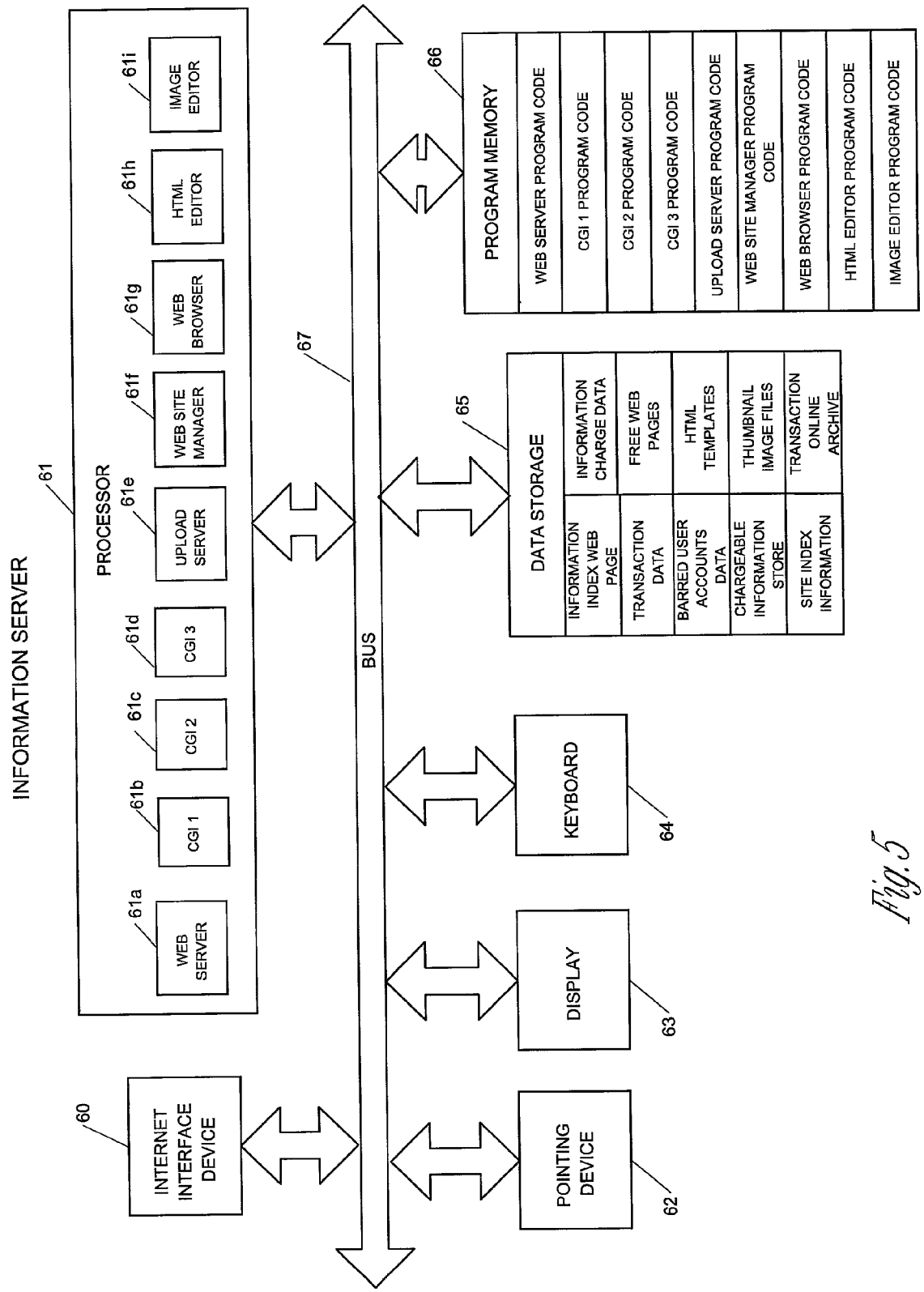
FIG. 5 is a schematic structural diagram of the information server in the embodiment of the present invention.

FIG. 5 is a schematic diagram of the architecture of the information server in this embodiment of the present invention in which program code is implemented on a general purpose computer.

The information server 40 is provided with a pointing device 62, e.g. a mouse, a display 63 for outputting information to a user, and a keyboard 64 for inputting data. An Internet interface device 60 such as a modem or local area network interface is provided for interfacing the information server 40 to the Internet 20. A program memory 66 such as a hard disk drive, CD ROM, floppy disk drive, programmable memory device, or read only memory is provided for storing program code for controlling a processor 61 in the information server. The program memory 61 stores web server program code that is read and implemented by the processor 61 to implement a web server 61a. Program code for the three CGI applications is read and implemented by the processor 61 to implement the three CGI applications 61b, 61c and 61d. Upload server program code is read from the program memory 66 and implemented by the processor 61 to implement the upload server 61e. Web site manager program code is read from the program memory 66 and implemented by the processor 61 to implement the web site manager 61f. Web browser program code is read from the program memory 66 and implemented by the processor 61 to implement the web browser 61g. HTML editor program code is read from the program memory 66 and implemented by the processor 61 to implement the HTML editor 61h. Image editor program code is read from the program memory 66 and implemented by the processor 61 in order to implement the image editor 61i.

The information server 40 is provided with a data storage device 65, e.g. a hard disk drive, CD ROM, floppy disk drive or random access memory (RAM) in order to store the data used by the processor 61 during the implementation of the program code read from the program memory 66. The data storage device 65 stores the information index web pages, the site index information, the information charge data, the transaction data, the free web pages, the barred user account data, the HTML templates, the chargeable information store and the thumbnail image files. All of the components of the information server are interconnected by a control and data bus 67.

The operation of the use of the computer and the information server will now be described with reference to the flow diagrams of FIGS. 6 to 11.

Figure 6A:
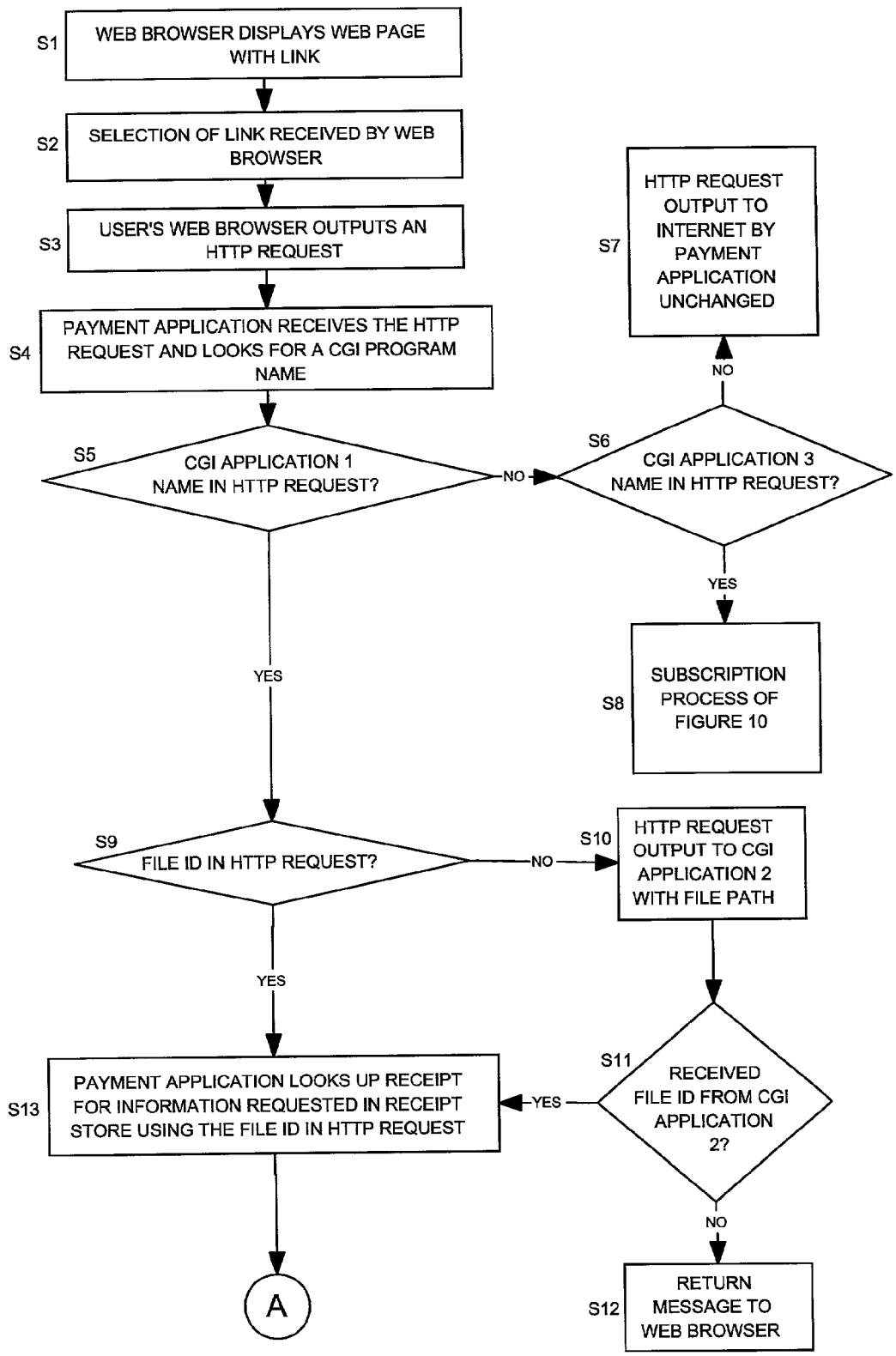
FIGS. 6a and 6b are a flow diagram of the operation of the payment application in the user's computer in the embodiment of the present invention for the process of requesting information.
Figure 6B:
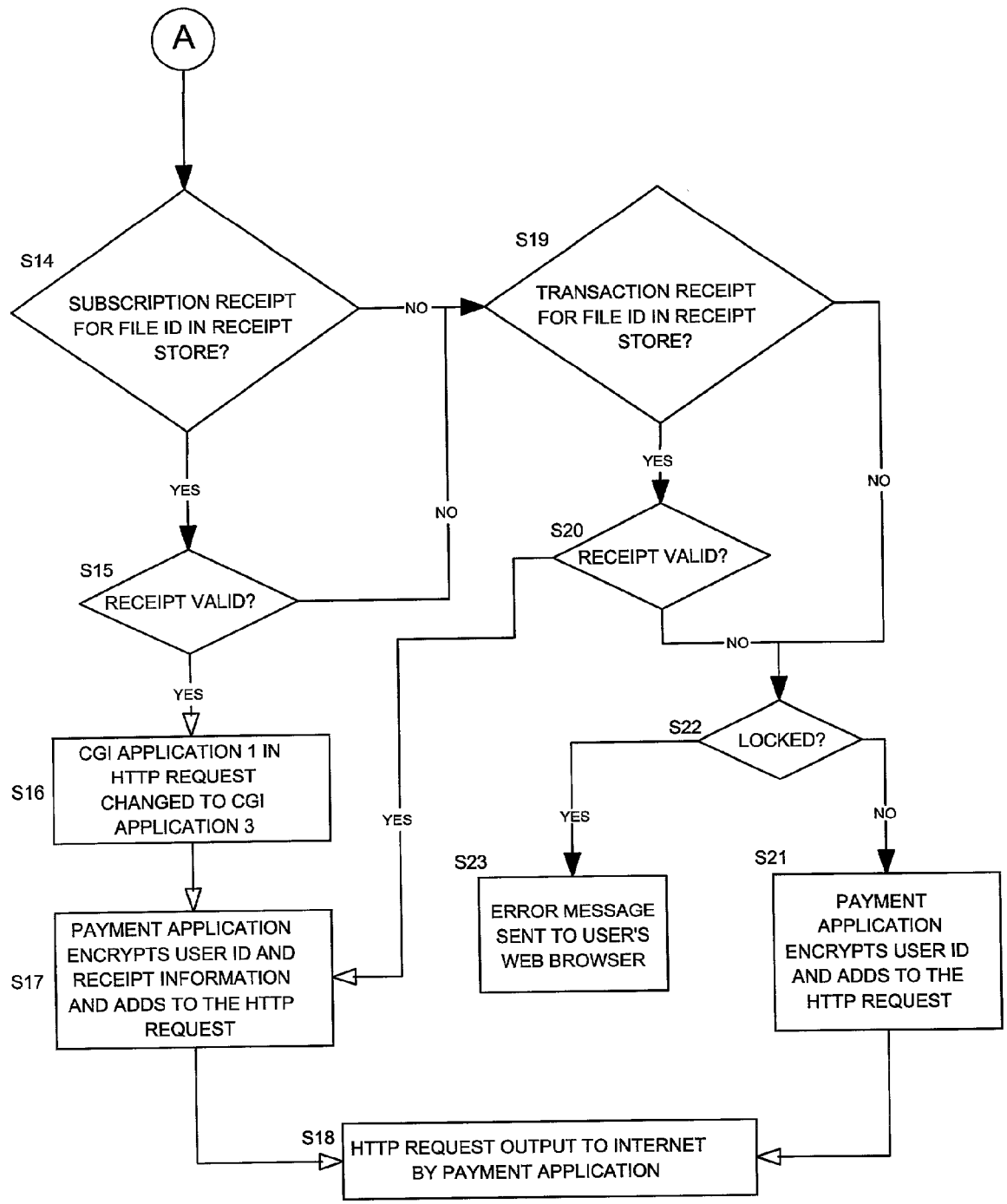

FIGS. 6a and 6b comprise a flow diagram illustrating the steps implemented by the payment application when a request is received from the web browser 13 and the operation of the payment application 12 when receiving a request from the web browser will now be described.

The web browser 13 at the user's computer 10 accesses a web page which includes a link (step S1). The link is selected by the user (step S2) and the web browser 13 outputs a HTTP request to the information application 12 acting as a web proxy (step S3). The payment application 12 receives the HTTP request and looks in the request for a CGI program name (step S4). The HTTP request takes the form:
http:\\server.com\cgi-bin\cgi1.exe?abc+def+ghi In this HTTP request the part server. com identifies the domain name for the information server. The file path cgi-bin indicates that the part following identifies a CGI application. The file name cgi1.exe identifies the CGI application. The parameters following the question mark and delimited by the plus signs comprise parameters passed to the CGI application.

In step S5 the payment application determines whether the CGI application comprises CGI application 1. If not, in step S6 the payment application determines whether the CGI application is the CGI application 3. If not, in step S7 the HTTP request is passed unchanged by the payment application 12 and output to the Internet 20 since it is not a request for chargeable information at an information server 40. It could be a request for free information available at free web pages at the information server 40 e.g. the request could be:

http:\\server.com\freepages.htm

If in step S6 the payment application 12 determines that the CGI application name is the third CGI application, it is identified that this is a request for the subscription process to be implemented (step S8). This will be described in more detail hereinafter with reference to FIG. 10.

If in step S5 it is identified that the name of CGI application is the first CGI application, the parameters following the CGI application file name are examined by the payment application to determine whether one of these parameters comprises a file identification (ID) number. At a minimum, the parameters must include a file path for the information requested. The file path can comprise both the file name e.g. 001.pdf (identifying page 1) and file path e.g. \magazines\PCW\1999\sept\ identifying the file path as the September issue of 1999 of the Personal Computer World magazine. The file ID parameter is composed of a content ID comprising a unique ID for the information, a publication ID comprising a unique ID for the publication to which the information belongs, and a master site ID identifying a site where the charging details of an original copy of the information are defined and the file ID is issued. This is provided since there can be copies of the information provided at mirror sites.

The format of the HTTP request received by the payment application 12 are defined by links inserted in web pages which can be accessed by the web browser. To request information content, the information index web pages stored in the information index web page store 50 at the information server 40 are accessed. The information index web pages are built to include links to chargeable information in the chargeable information store 52 and may or may not include the file ID. They must include the name of the first CGI application 43 and the domain name of the web server 41 as well as the file path for the chargeable information in the information store 52.

If in step S9 it is determined that the HTTP request includes the file ID, in step S 13, the payment application 12 uses the file ID to look in the receipt store 14 to identify whether there is a receipt for the file ID. First a subscription receipt is looked for (step S14) and if none is identified, in step S19 a transaction receipt is looked for. If no transaction receipt is identified and the payment application 12 has been locked by the user (step S22), an error message is sent to the user's browser (step S23) and the transaction is aborted. (The process of locking the payment application 12 will be described in more detail hereinafter with reference to FIG. 13). If no transaction receipt is identified and the payment application 12 has not been locked by the user, the payment application 12 reads the user's ID from the user's ID store 15, encrypts it, and adds it as one of the parameters to the HTTP request (step S21). The modified HTTP request is then output to the Internet 20 by the payment application 12 (step S 18). The modified HTTP request is directed to the first CGI application 43 in the information server 40 and includes with it the user ID and the file path of the requested chargeable information as the parameters after the question mark and delimited by a plus sign.

If in step S19 a transaction receipt for the file ID is identified in the receipt store 14, a validation process (step S20) is performed on the receipt.

FIG. 12a illustrates the structure of a transaction receipt. It comprises a number of parameters stored as a data structure. ProtocolVersion and StructureVersion define version information to enable system and software upgrades. ReceiptType defines the type of receipt i.e. whether it is a transaction receipt or a subscription receipt. MasterSite Id identifies the original site where the particular piece of information was first made available. ContentId unique identifies the piece of information or content which has been previously requested and paid for by the user. SiteId identifies the site from which the information was retrieved. UserId comprises the user ID for the user requested the information. TransactionDate gives the date and time of generation of the transaction receipt. ValidPeriod defines the valid period of the transaction receipt. Currency defines the currency of the transaction e.g. dollars or pounds sterling. Amount defines the amount of the transaction. AdditionalData is a field containing additional information such as the path name of the information content. This field can also include check sums to facilitate detection of tampering with the receipt.

In order to perform the validation procedure (step S20) it is necessary to determine whether the current date and time provided by a system clock in the user's computer identifies a time which is later than the TransactionDate plus the ValidPeriod. In other words, it is determined whether the receipt has expired. This facility enables the operator of an information server to enable users to pay for and receive information without having to pay again for a period of time i.e. they are allowed free access to the information for a limited period. This period can be selected as desired by an information provider by setting the ValidPeriod field.

Thus, if as a result of the validation procedure (step S20), it is determined that the receipt has expired, the receipt is ignored and if the payment application 12 has been locked by the user (step S22), an error message is sent to the user's browser (step S23) and the transaction is aborted. If the receipt is ignored and the payment application 12 has not been locked by the user, in step S21 the payment application 12 encrypts the user ID and adds it to the HTTP request as if there was no transaction receipt. The modified request is then output to the Internet 20 by the payment application 12 (step S18).

If the validation procedure (step S20) identifies that the transaction receipt is valid, the payment application 12 reads the user ID from the user's ID store 15, encrypts it and the receipt information and adds the encrypted information to the HTTP request. The modified HTTP request is then output to the Internet 20 by the payment application 12.

The modifications made to the HTTP request comprise the addition of parameters after the question mark sign and delimited by the plus signs. HTTP requests must be formed of ASCII characters. Thus following the encryption process, which is required to provide a level of security, the encrypted information must be converted to ASCII characters. One well known technique for doing this is UU encoding.

The payment application therefore outputs the HTTP request directed to the first CGI application 43 if there is no subscription receipt or transaction receipt, or if there is a transaction receipt.

The format of the subscription receipt is very similar to that of the transaction receipt and is illustrated in FIG. 12*b*. ReceiptType will identify the receipt as a subscription receipt. Unlike the transaction receipt, there is no ContentID identifying a specific piece of information content since the subscription receipt applies to a whole range of pieces of information provided under a PublicationID. The subscription receipt includes an additional field SubscriptionDate giving the date of the start of the subscription. Transaction-Date identifies the date and time at which the subscription was taken out. This can be different to the subscription date. ValidPeriod defines the subscription period with the subscription date. Currency and Amount define the currency and amount of the subscription.

If the payment server identifies that there is a subscription receipt for a file ID in the receipt store 14 (step S14), a validation process is carried out (step S15). In order to perform the validation process, the HTTP request includes an additional parameter identifying the publication date of the information content which is the subject of the request. Thus the validation procedure (step S15) can compare the publication date with the subscription date and the valid period to determine whether the publication date falls within a subscription period i.e. between the subscription date and the term comprising the sum of the subscription date and the valid period. If it is determined that the subscription receipt is not valid to allow free retrieval of the information (step S15), the payment application 12 then looks for a transaction receipt for the file ID in the receipt store 14 (step S19).

If the validation procedure (step S15) determines that the subscription receipt is valid for the requested information, the HTTP request is modified by changing the name of the CGI application from the first CGI application to the third CGI application (step S16). Then, the payment application 12 reads the user ID from the user's ID store 15, encrypts it and the subscription receipt information, UU encodes it and adds it to the HTTP request (step S17). The HTTP request is then output to the Internet 20 by the payment application 12 (step S18).

Thus the third CGI application 44 in the information server 40 receives and responds to requests for chargeable information for which the user's computer has stored a valid subscription receipt.

As mentioned hereinabove, the links provided in the information index web page stored in the information index web page store 50 need not include the file IDs. This is to enable links to be provided within PDF files for example without requiring significant modifications to the PDF files by the inclusion of unique file IDs. Therefore, when the payment application receives the HTTP request identifying the first CGI application, if there is no file ID in the HTTP request (step S9), an HTTP request is output by the payment application 12 to the second CGI application 42 with the file path. In this way the payment application 12 does not pass on the first HTTP request from the web server 13. This is held whilst a second request is generated to the second CGI application 42 in order to obtain the file ID. If the file ID is not returned from the second CGI application 42 (step S11), a message is returned to the web browser 13 (step S12) to indicate that the information cannot be retrieved. If the file ID is returned from the second CGI application 42 (step S12), the payment application 12 uses the file ID to look up receipts for the requested information in the receipt store 14 (step S13) and the process continues as if the file ID had been received in the HTTP request from the web browser 13.

Thus the second CGI application 42 in the information server 40 is provided to use the information available in the information charge data store to obtain the file ID for the payment application. It can also provide the publication date (for subscription receipt validation as described above) and cost and currency information (for spending limit control as will be described in more detail hereinafter). Thus the second CGI application 42 can provide all these parameters to the payment application 12 using the file path if they are not in the HTTP request from the web browser 13 i.e. not in the links provided in the index web page.

Figure 7:
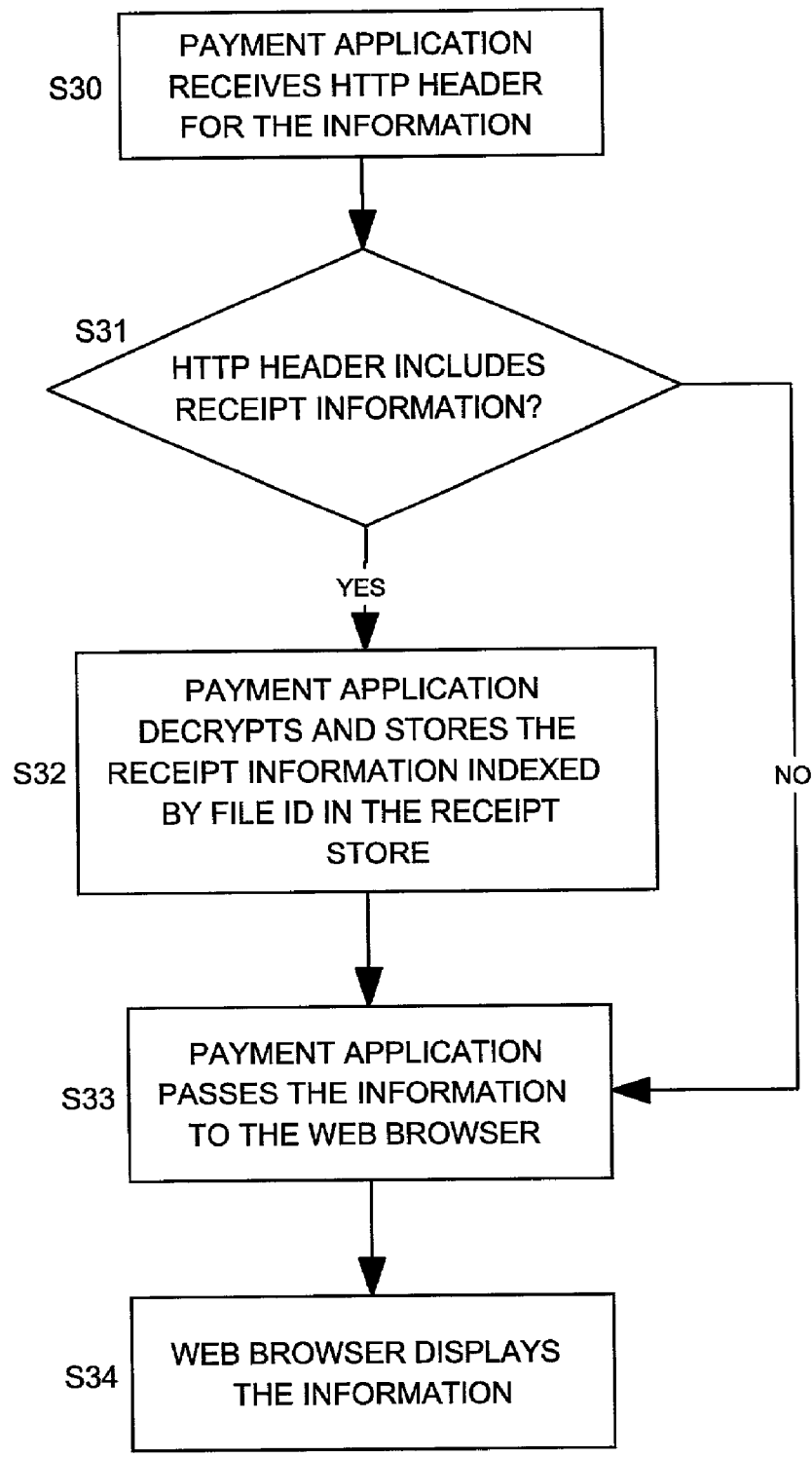
FIG. 7 is a flow diagram of the operation of the payment application in the user's computer when the information is received from the information server.

The operation of the payment application when a HTTP response is received will now be described with reference to the flow diagram of FIG. 7.

The payment application 12 receives the HTTP header for the information (step S30) and it identifies whether the HTTP header includes receipt information (step S31). If receipt information is included, it must first be UU decoded and then decrypted before being stored in the receipt store 14 indexed by the file ID (step S32). The payment application 12 then passes the information received from either the first CGI application 43 or the third CGI application 44 via the web server 41 to the web browser 13 (step S33). Thus when a user has been charged for information retrieval, a transaction is recorded and a receipt stored at the user's computer 10 in the receipt store 14. If the user has previously paid for the information and a valid receipt is stored, there is no transaction since there is no payment and thus there is no transaction receipt received in step S31 and the payment application 12 simply passes the information to the web browser 13 (step S33). The web browser 13 then displays the information to the user (step S34).

Figure 8:
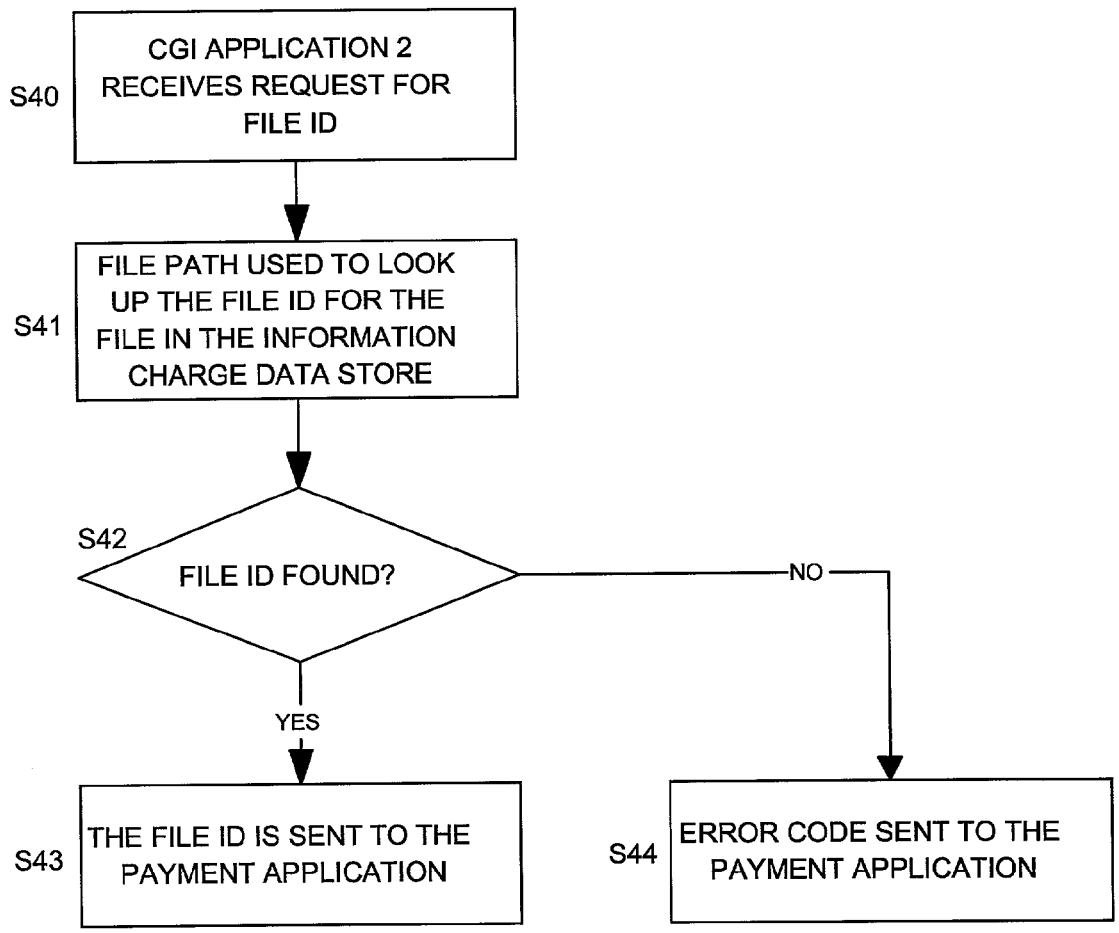
FIG. 8 is a flow diagram of the operation of the CGI application 2 at the information server in the embodiment of the present invention.

The operation of the second CGI application 42 at the information server 40 will now be described with reference to the flow diagram of FIG. 8.

The second CGI application 42 receives HTTP requests from the payment application 12 which include a file path for chargeable information (step S40). The second CGI application 42 uses the file path in the HTTP request to look up the file ID (and publication date, cost and currency) for the information (file) in the information charge data store 51 (step S41). If a file ID is found (step S42) the file ID is sent as the HTTP response to the payment application 12 via the web server 41 (step S43). If a file ID is not found by the second CGI application 42 (step S42) an error code is sent to the payment application 12 via the web server 41 (step S44).

Figure 9:
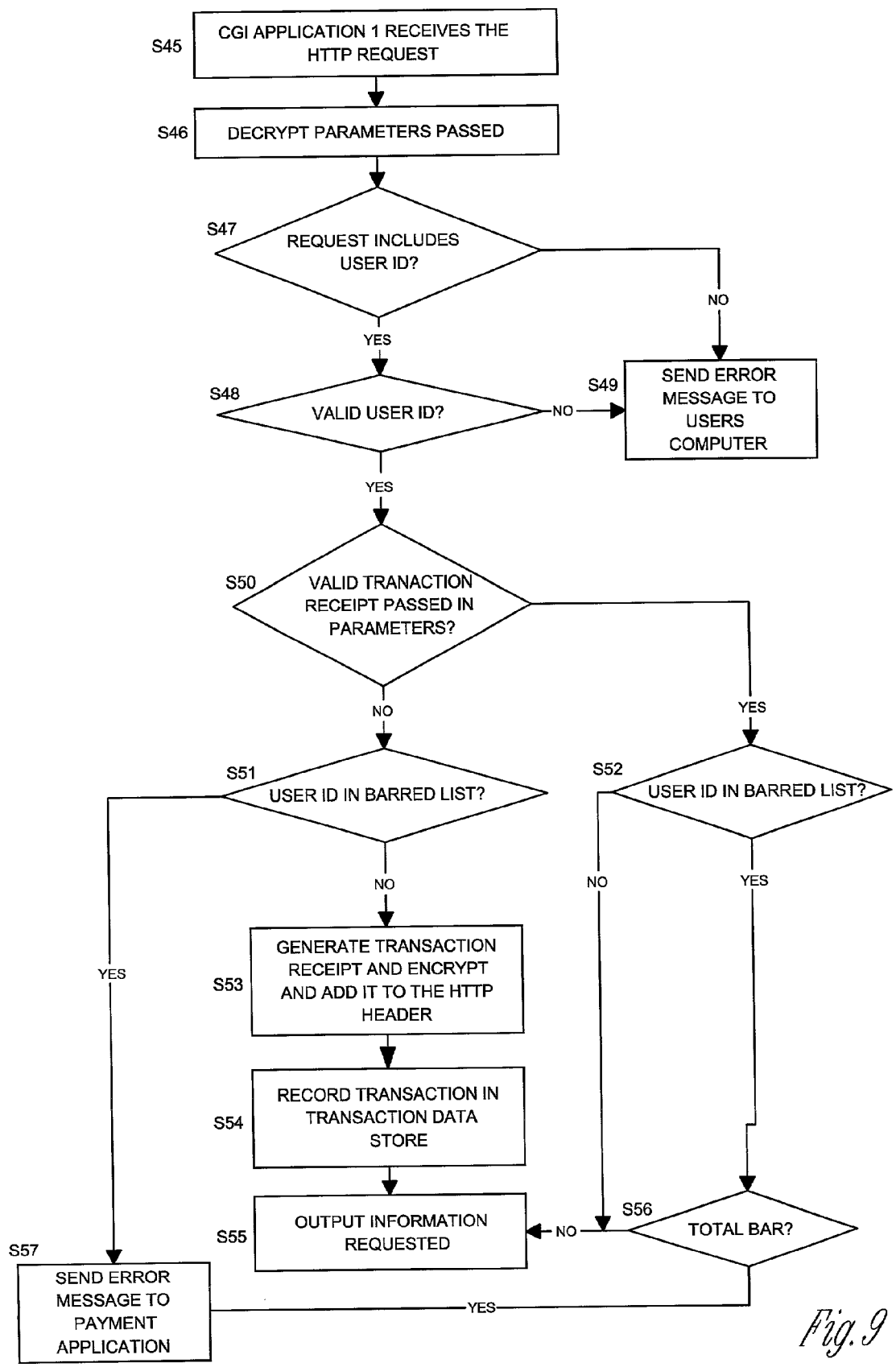
FIG. 9 is a flow diagram illustrating the operation of the CGI application 1 at the information server in the embodiment of the present invention.

The operation of the first CGI application 43 at the information server 40 will now be described with reference to the flow diagram of FIG. 9.

The first CGI application 43 receives HTTP requests from the payment application 12 via the web server 41 (step S45). The first CGI application 43 UU decodes parameters passed with the HTTP request and decrypts them (step S46). The first CGI application 43 then determines whether the request includes a user ID (step S47). If not, an error message is sent to the user's web browser or payment application (step S49) (a missing user ID is indicative of the user attempting to obtain chargeable information directly rather than via the payment application 12). If the first CGI application 43 identifies that the request does include a user ID (step S47), it determines whether the user ID is of valid form (step S48). If it is determined that the user ID is not of valid form (step S48), an error message is sent to the requesting web browser or payment application (step S49) (an invalid user ID is indicative of the user attempting to obtain chargeable information by unauthorized means and not through the payment application 12). If the user ID is valid, the first CGI application 43 determines whether a valid receipt is passed in the parameters (step S50). This process comprises the identification of a valid transaction receipt data structure and a validation determination. The validation determination comprises determining whether the receipt is still valid by determining the current date and time from the information server's internal clock and comparing this with the transaction date plus the valid period. This will identify whether the receipt is still valid. If it is determined that the transaction receipt is valid, the first CGI application 43 then looks in the barred user account data store 46 to determine whether the user ID identifies a user that has been barred from using the service (step S52). If a barred user is identified by the user ID, and the bar is determined to be total (step S56) an error message is sent to the payment application 12 (step S57). If a barred user is identified by the user ID, and the bar is determined not to be total (step S56), i.e. the user is barred only from further purchase using the system, the requested information is retrieved from the chargeable information store 52 and output via the web server 41 over the Internet 20 to the payment application 12 (step S55). If a barred user is not identified (step S52), the requested information is retrieved from the chargeable information store 52 and output via the web server 41 over the Internet 20 to the payment application 12 (step S55). If it is determined that the transaction receipt is not valid, i.e. it has expired, the first CGI application 43 then looks in the barred user account data store 46 to determine whether the user ID identifies a user that has barred from using the service (step S51). If the user has been either barred totally or barred from further purchase using the system an error message is sent to the payment application 12 (step S57). If the user is not barred the first CGI application 43 generates a new transaction receipt by retrieving information from the information charge data store 51 using the file path for the requested chargeable information and using the user ID. The generated transaction receipt is then encrypted to provide a level of security, UU encoded and added to the HTTP header (step S53). Since the generation of a transaction receipt means that the user will be charged for the retrieval of the information, a record of the transaction is recorded in the transaction data store 45 (step S54). Information on the cost and currency for the transaction is available from the information charge data store 51 which stores information on the cost i.e. currency and amount for retrieval of information. The information charge data store 51 will also include the master site ID, the publication ID, the content ID, and the valid period for the information content requested. In other words, the information charge data store 51 contains all of the information for generating a valid receipt and for forming transaction data for storing in the transaction data store 45. Thus, the transaction data store 45 forms a record of all transactions by all users. In this way the transaction data store 45 contains information which can be compared with receipt data stored at the user's computer 10 in order to perform a level of confirmation of the validity of transactions both at the information server 40 and at the user's computer 10. Once the transaction has been recorded in the transaction data store 45 (step S54), the information requested by the payment application 12 is output via the web server 41 over the Internet 20 to the payment application 12 (step S55).

Figure 10:
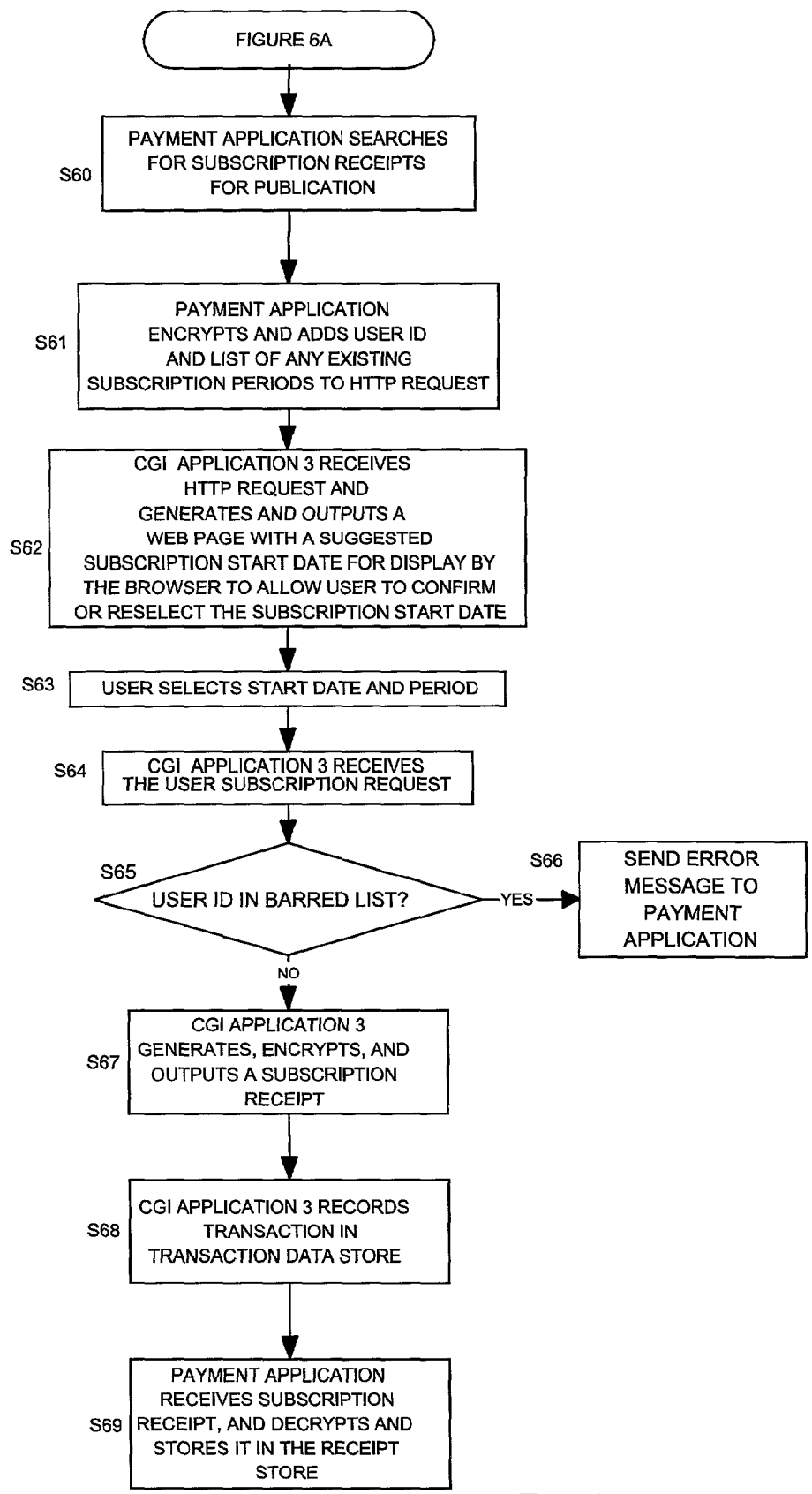
FIG. 10 is a flow diagram illustrating the subscription process in the embodiment of the present invention.

The method of subscribing to a publication will now be described with reference to the flow diagram of FIG. 10. The flow diagram of FIG. 10 follows on from step S8 in FIG. 6a.

At the information server 40 in addition to information index web pages stored in the information index web page store 50, subscription index web pages are provided which contain links to the third CGI application 44 with parameters comprising the publication ID identifying the publication to which the user wishes to subscribe.

The payment application 12 searches receipt store 14 (step S60) for subscription receipts for the publication. The payment application 12 takes the user ID read from the user's ID store 15 together with a list of any subscription receipt dates and periods found in step S60, encrypts, UU encodes and adds these to the HTTP request (step S61). The third CGI application 44 receives the HTTP request via the web server 41 and by reference to publication issue publication dates in data store 51 calculates a suggested subscription start date and list of alternative start dates and generates and outputs a web page (step 62) for display by the web browser 13 at the user's computer 10 to allow the user to confirm the suggested subscription start date or select another start date and also select a subscription period (step S63). The third CGI application 44 receives the HTTP request for a subscription start date and period (step 64) and uses the user ID to look into the barred user account store 46 to determine whether the user has been barred from purchasing using the service (65). If it has been determined that the user has been barred from purchasing using the service an error message is sent to the payment application 12 (step 66). If it has been determined that the user has not been barred from purchasing using the service the third CGI application 44 can then generate, encrypt, UU encode and output a subscription receipt of the form shown in FIG. 12b to the payment application 12 (step S67). The third CGI application 44 then records the transaction in the transaction data store 45 (step S68). The payment application 12 receives the subscription receipt, UU decodes it, decrypts it and stores it in the receipt store 14 (step 69).

Figure 11:
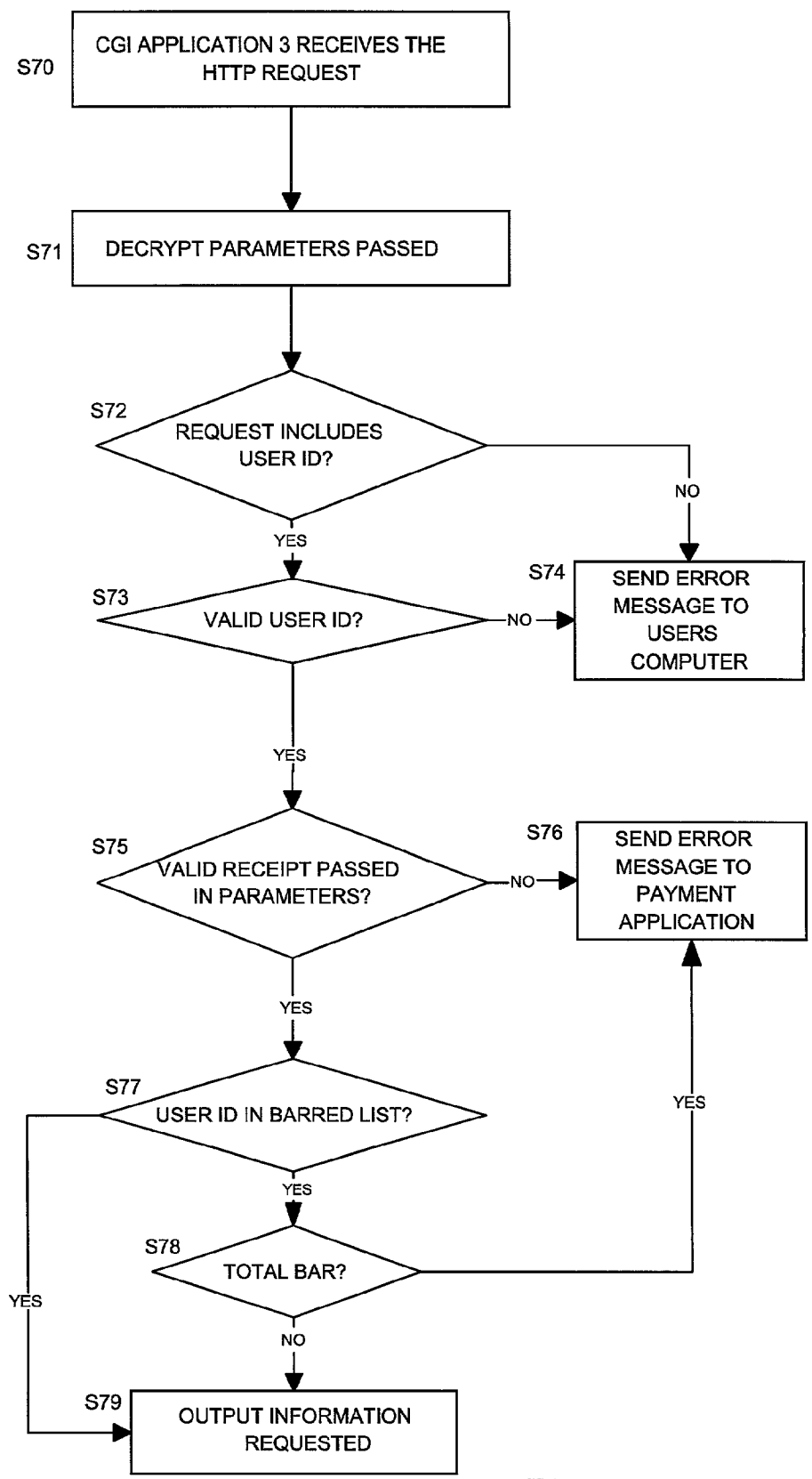
FIG. 11 is a flow diagram of the operation of the CGI application 3 at the information server in the embodiment of the present invention.

The operation of the third CGI application 44 in response to an HTTP request for information will now be described with reference to the flow diagram of FIG. 11. The third CGI application 44 receives an HTTP request for information when the payment application 12 identifies that there is a valid subscription receipt. Thus, the third CGI application receives the HTTP request (step S70). Parameters passed in the HTTP request are UU decoded and decrypted (step S71). The third CGI application 44 then determines whether the request includes a user ID (step S72). If not, an error message is sent to the user's browser or payment application (step S74) (a missing user ID is indicative of the user attempting to obtain chargeable information directly rather than via the payment application 12). If the third CGI application 44 identifies that the request does include a user ID (step S72), it determines whether the user ID is of valid form (step S73). If it is determined that the user ID is not of valid form (step S73), an error message is sent to the web browser or payment application (step S74) (an invalid user ID is indicative of the user attempting to obtain chargeable information by unauthorized means and not through the payment application 12). If the user ID is determined to be of valid form (step S73), the third CGI application 44 determines whether a valid subscription receipt is passed in the parameters (step S75). This validation process uses a publication date of the requested information passed as a parameter with the HTTP request to determine whether the requested information is within the subscription period i.e.

within the period defined by the sum of the subscription date and the valid period. If the receipt is determined not to be valid, the third CGI application 44 sends an error message to the payment application 12 (step S76). If the receipt is determined to be valid, the third CGI application 44 uses the user ID to look into the barred user account data store 46 (step 77) to determine whether the corresponding user has been completely barred from using the service (step 78) (as opposed to being barred from purchasing using the service). If it is determined that the user has been completely barred from using the service, an error message is sent to the payment application 12 (step S76). If it is determined that the user ID is not in the barred user list (step S77) or the user has not been completely barred from using the service (step S78), the information is output as requested (step 79).

The ability of the payment application 12 in the user's computer 10 to control spending on products requested by the web browser 13 will now be described with reference to FIGS. 13 and 14.

When an HTTP request is received for a product, the request includes the identification of the first CGI application 43 and the file path of the file requested. If the information index web pages have been set up to include further information, then the HTTP request will include the file ID, publication date, cost and currency for the information. Alternatively, this further information of the file ID, publication date, cost and currency can be obtained by sending the file path to the second CGI application 42 in order for the second CGI application 42 to look up the information in the information charge data store 51. If the request from the web browser 30 is a request for subscription to a publication, the request will identify the third CGI application 44. The HTTP request will include a publication ID, publication date, valid period, cost and currency for subscription to the publication. Thus, for a subscription the content ID is blank in the file ID since this is not required.

The payment application 12 thus receives information on the cost of the requested information or requested subscription and the currency. This is either received in the request or from the second CGI application 42. The receipt of the cost and currency information with the request before it is sent to the information server enables the payment application 12 to perform cost monitoring and to prevent overspending by the user. To provide this facility, the payment application 12 is provided with a graphical user interface which can be accessed by a user and is illustrated in FIG. 13. When the payment application 12 is implemented on the user's computer 10 in this embodiment in which it is implemented in a Microsoft Windows 95, 98, 2000 or NT (trade mark) operating system environment, an item for the payment application appears in the task bar. When a user right clicks on the item, a menu is displayed to enable a user to select to lock the payment application 12. This prevents new spending using the payment application until the payment application is unlocked. It does not however prevent the user obtaining information for which they have already paid and for which they have a valid receipt. Thus the locking acts as a means of controlling spending. The unlocking of the payment application requires the user to input a password that is selected using the window displayed in FIG. 13. The user is also able to select to display the window shown in FIG. 13 from the displayed menu. This allows further spending control.

As can be seen in FIG. 13, various spending limit related parameters can be set and are stored in the spending limit data store 13 to be used in the monitoring of spending by the user. There are two types of spending limits that can be set by the user. There is a single transaction limit that sets a limit for an individual transaction. As can be seen in FIG. 13, there are three levels of response or action for three different setable levels of spending. In this example, for each single transaction above 0.05 dollars, the action is to ask the user to confirm that the transaction is to go ahead. For transactions above 4 dollars, the user is required to enter a password to authorise the transaction to proceed. Transactions above 10 dollars are refused and will not be permitted. The second type of spending limit is a spending limit per period. In this embodiment, there are four spending limit periods which can be set. In this example, there is a spending limit set of 7 dollars per day, 40 dollars per week, 150 dollars per month and 500 dollars per year. The user can elect to permit overriding of a periodic spending limit upon entry of the password by checking the checkbox adjacent to the limit in question. The user is also able to select the user's main currency that in this case is set to US dollars. This selection of currency selects the user's home currency relevant for the spending limits. A sound to be played upon making a small expenditure can be selected. This is played when the transaction is less than or equal to the lowest single transaction spending limit. A sound to be played upon making a larger expenditure can be selected. This is played when the transaction is greater than the lowest single transaction spending limit. The user can elect to play a sound when the payment application displays a message. The use can set the password the payment application requires for access restriction and overriding spending limits.

Once a user has entered all the user preferences for the spending limit data and clicked on the OK button, the spending limit data is stored in the spending limit data store for use in the control of spending limits by the user by monitoring the cost and currency of each individual transaction or subscription transaction as each request is received from the web browser 13 by the payment application 12.

Figure 14:
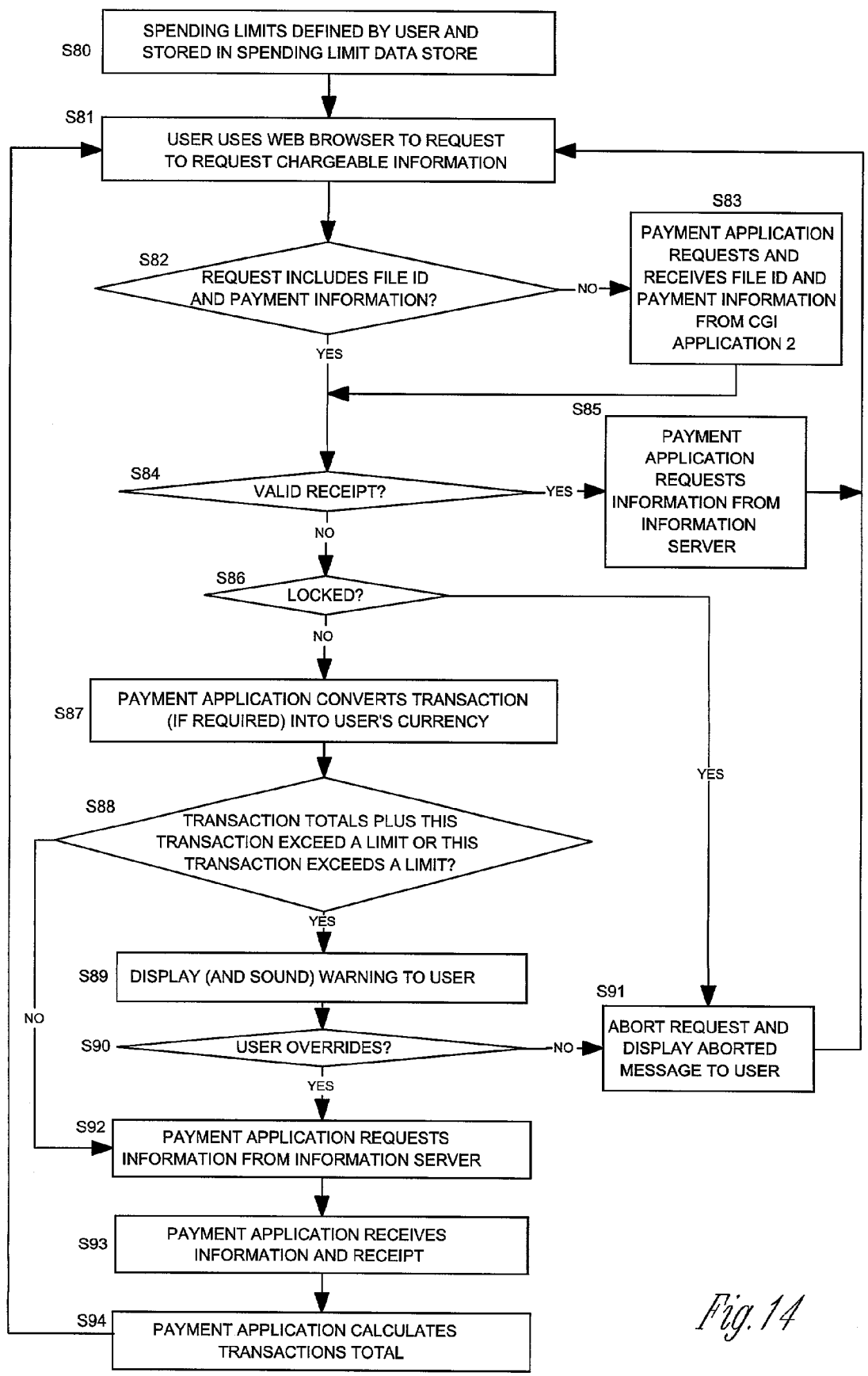
FIG. 14 is a flow diagram illustrating the operation of the payment application in controlling spending by the user in the embodiment of the present invention.

FIG. 14 is a flow diagram illustrating the method of controlling spending by the user. As described hereinabove, the spending limits are defined by the user and stored in the spending limit data store (step S80). When the user uses a browser to request chargeable information (step S81) the payment application determines whether the request includes the file ID and payment information (step S82). If not, the payment application 12 requests and receives the file ID and payment information from the second CGI application 42 at the information server 40 (step S83). Now that the payment application 12 has the file ID, it can determine whether there is a valid receipt stored in the receipt store 14. First of all it determines whether there is any receipt at all i.e. a transaction receipt or a subscription receipt, and if so it then determines whether the receipt has expired. If there is a receipt and it is valid, the payment application requests the information from the information server 40 and sends the receipt as proof of payment (step S85). Thus when there is a valid receipt, there is no need to instigate a spending limit control function since the user does not pay again for the information.

If there is no receipt or the receipt is invalid (step S84) and the payment application has been locked by the user (step S86), i.e. spending is suspended, an error message is sent by the payment application to the user's browser (step S91). If there is no receipt or the receipt is invalid (step S84) and the application has not been locked by the user (step S86), the payment application converts the cost of the transaction into the user's currency if this is necessary using the exchange rate data stored in the exchange rate data store (step S87). The payment application 12 is thus now able to compare the requested transaction with the stored spending limit data in the spending limit data store 11 (step S88). If the transaction totals for all previous transactions plus the requested transaction exceeds one of the spending limits, or if the transaction exceeds one of the single transaction limits, a warning is output to the user in the form of a display and optionally a sound (step S89). Since the two lower single transactions and the spending limits for periods can be overridden, either with a password or simply be confirming (step S90), it is possible for a user to override the warning. If the user does not override, the request is aborted and a display is output to the user to inform them that the request has been aborted (step S91). If the user overrides the spending limit warning (step S90), the payment application transmits the request for information to the information server 40 (step S92). The payment application 12 then receives the information and a transaction receipt from the information server (step S93) then calculates new transactions totals for the spending limits per period (step S94). The transactions totals are stored in the spending limit data store 11 together with the spending limits to be used in step S88 for the determination of whether the next request for chargeable information will exceed the spending limits per period. The payment application 12 then awaits the receipt of the next request for chargeable information (step S81).

The central server will now be described with reference to FIGS. 15 and 16.

Figure 15:
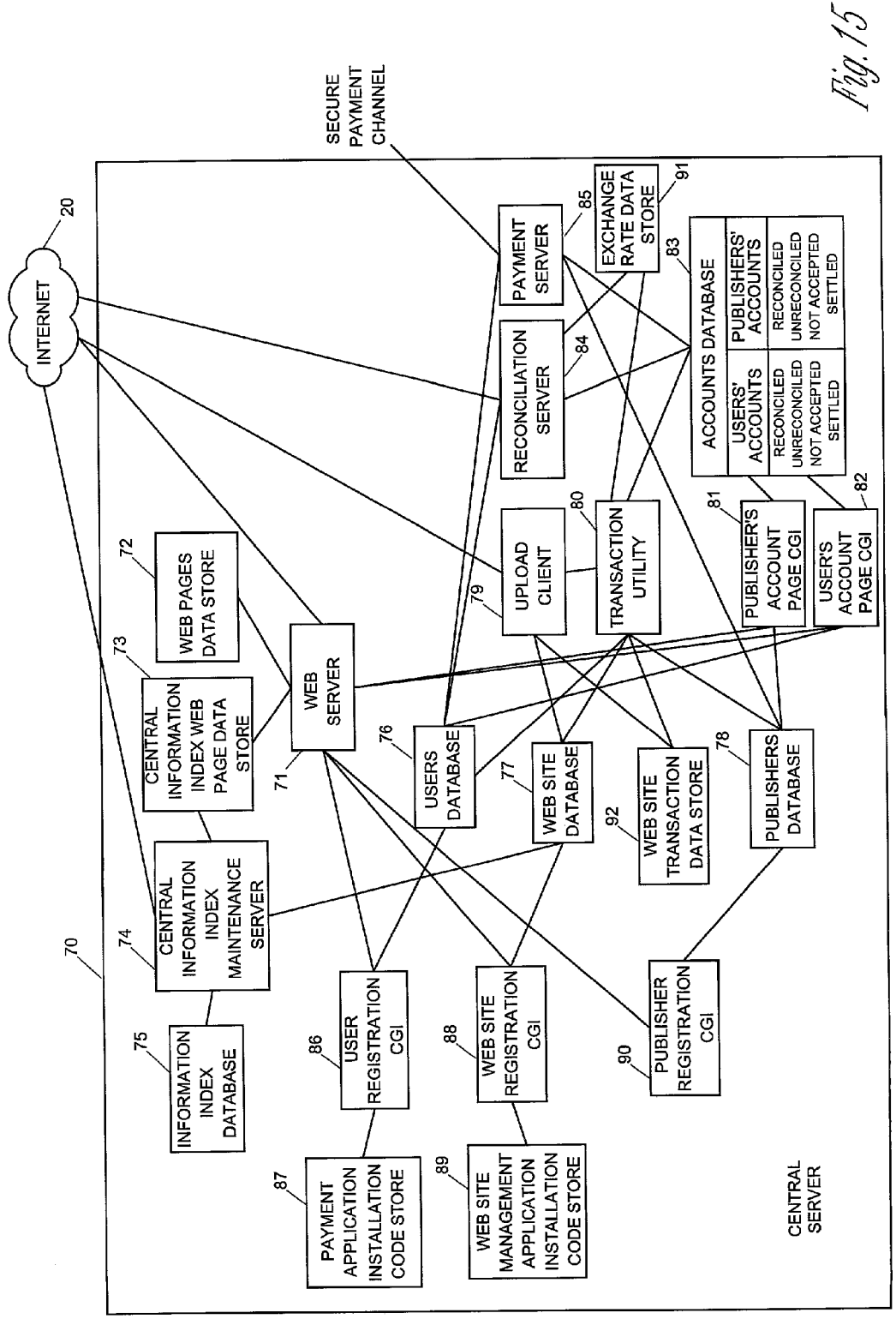
FIG. 15 is a schematic functional diagram of the central server in the embodiment of the present invention.
Figure 16:
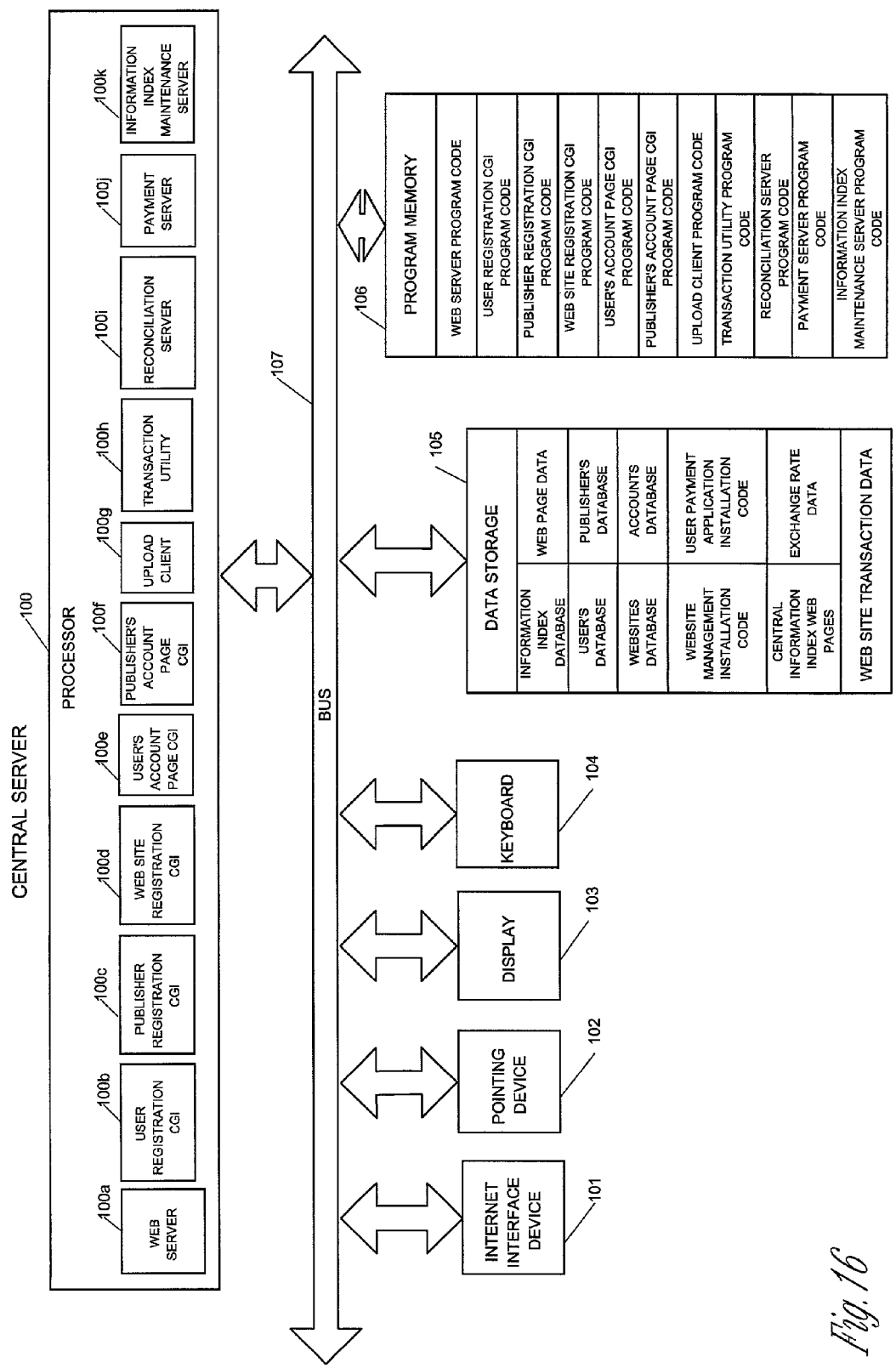
FIG. 16 is a schematic structural diagram of the central server in the embodiment of the present invention.

FIG. 15 is a schematic functional diagram of the central server 70. The central server is provided with a web server 71 connected to the Internet 20 to allow users, web site (information server) administrators or web masters, and publishers of information access to the services provided by the central server 70. The central server 70 thus stores web pages in a web page data store 72 which are freely available. Also, central information index web pages are stored in a central information index web page store 73 to provide a central index of information available at all subscribing information servers 40. A central information index maintenance server 74 is provided connected over the Internet 20 for obtaining index information from information servers 40 and for maintaining and updating the central information index web pages in the central information index web page data store 73. The central information index maintenance server 74 refers to and updates an information index database 75 which stores the index information for all information servers 40 which are party to the service. The central information index maintenance server 74 also accesses a web site (information server) database 77 that stores information on all of the subscribing information servers 40. The central server 70 also stores a users' database 76 storing information on all subscribing users. There is also provided a publishers database 78 storing all information on subscribing publishers. Three applications 86, 88 and 90 are provided for registering users, web sites (information servers) and publishers respectively. A user's registration CGI 86 is implemented via the web server 71 to register users in the user's database 76 and to allow users to download payment application installation code from a payment application installation code store 87. A web site registration CGI 88 is provided to allow web site (information server) administrators to register the web site with the service as a site where chargeable information can be downloaded. The web site registration CGI 88 stores the registration information in the web site database 77. Web site registration CGI 88 also enables the administrator to download the web site management application installation code from the web site management application installation code store 89 via the web server 71. The publisher registration CGI 90 enables publishers of information to register with the service when they have made information available at web sites. A publisher need not host their own web site and can instead provide the published information to web sites (information servers) so that it can be accessed by users. The publisher registration CGI 90 stores the registration information for publishers in the publishers' database 78.

An upload client 79 is provided in the central server 70 for receiving information from the upload server 47 over the Internet 20. This enables the periodic polling of information servers 40 to retrieve transaction data from respective transaction data stores 45. The uploaded transaction data files are stored in a website transaction data store 92. A transaction utility 80 is provided connected to the upload client 79 to process the retrieved transaction data in the website transaction data store 92. The transaction data is entered into an accounts database 83 that stores respective records for users and publishers. Each of the publishers' accounts and users' accounts contain transactions that are reconciled, unreconciled, not accepted, or settled as will be described in more detail hereinafter. The upload client 79 uses information on the location of the web sites from the web site database 77 in order to carry out the polling operation in order to contact respective upload servers 47. Also the transaction utility 80 uses information in the web site database 77, information in the users' database 76 and information in the publishers' database 78 in order to process the transactions to credit the appropriate transactions to the appropriate users and publishers.

The central server 70 is also provided with a reconciliation server 84 connected over the Internet 20 to enable the reconciliation server 84 to connect to payment application 12 in users' computers 10. The reconciliation server 84 is periodically contacted by payment applications 12 in order to perform a reconciliation process on the receipts stored in the receipt store 14 at the user's computer 10 with transaction information for the user obtained from the user's account in the account database 83 and transaction data stored in the web site transaction data store 92. The reconciliation server 84 also accesses the user's database 76 in order to facilitate the reconciliation process and an exchange rate data store 91 to provide exchange rate data to the payment application 12.

Central server 70 is further provided with a payment server 85 for making payments over a secure payment channel to publishers' accounts and for receiving payments over the secure payment channel from users accounts, e.g. a remote credit card server 4. The payment server 85 thus accesses the account database 83, the users database 76 and the publishers database 78 in order to facilitate the payment operation.

The central server 70 is further provided with a publishers account page CGI 81 and a users account page CGI 82 accessing the accounts database 83 to allow publishers and users respectively to access their account information via the Internet 20 and the web server 71 so that they can inspect their accounts. The publishers account page CGI 81 accesses the publishers' database 78 in order to facilitate the interface to the publisher, and the users account page CGI 82 accesses the users database 76 in order to facilitate the interface to the user.

The central server 70 can be implemented on any suitable processing apparatus implementing computer programs. FIG. 16 is a schematic diagram of the structure of the central server 70 in accordance with this embodiment of the present invention that is implemented on a general purpose computer. The central server 70 has a pointing device 102 e.g. a mouse, a display 103, and a keyboard 104. An Internet interface device 101 is provided to enable connection to the Internet 20. The Internet interface device 101 can comprise a modem but will normally comprise a permanent network connection device such as a local area network card. A program memory 106 e.g. a hard disk drive, CD ROM, a floppy disk drive or programmable read only memory device such as a solid state memory device is provided to store program code which is readable and implementable by a processor 100. The processor 100 reads web server program code from the program memory 106 and implements a web server 100a. The processor 100 reads user registration CGI program code from the program memory 106 and implements the user registration CGI 100b. Publisher registration CGI program code is read by the processor 100 from the program memory 106 to implement a publisher registration CGI 100c. Web site registration CGI program code is read from the program memory 106 by the processor 100 to implement a web site registration CGI 100d. Users account page CGI program code is read from the program memory 106 by the processor 100 to implement the users account page CGI 100e. Publisher account page CGI program code is read from the program memory 106 by the processor 100 to implement the publishers account page CGI 100f. Upload client program code is read from the program memory 106 by the processor 100 to implement the upload client 100g. Transaction utility program code is read from the program memory 106 by the processor 100 to implement the transaction utility 100h. Reconciliation server program code is read from the program memory 106 by the processor 100 to implement a reconciliation server 100i. Payment server program code is read from the program memory 106 by the processor 100 to implement a payment server 100j. Information index maintenance server program code is read from the program memory 106 by the processor 100 to implement an information index maintenance server 100k.

A storage device 105 e.g. a hard disk drive, floppy disk drive, CD ROM or random access memory (RAM) is provided to store data used by the processor 100 in the central server 70. Although the data storage device 105 is shown as a single data storage device, this device can of course be provided as a multitude of storage devices e.g. a number of hard disk drives. The data storage device 105 stores the information index database, the exchange rate data, the users database, the web site database, the web page data, the publishers database, the accounts database, the web site management installation code, the user payment application installation code, the central information index web pages, and the web site transaction data.

All the components of the central server 70 are interconnected by a control and data bus 107.

The functions performed by the central server 70 will now be described in more detail with reference to the flow diagrams of FIGS. 17 to 21.

Figure 17:
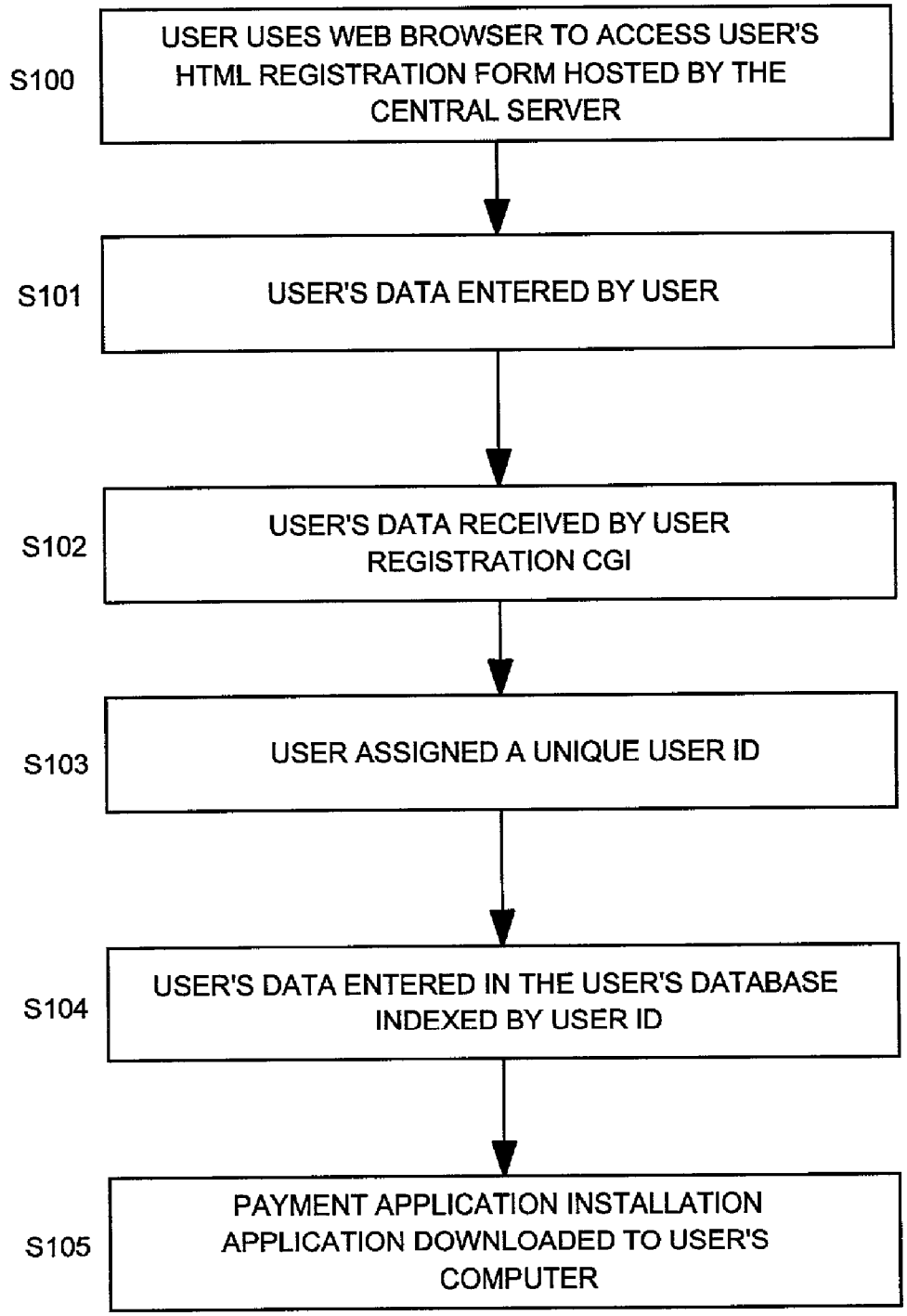
FIG. 17 is a flow diagram of the user registration process.

Before a user is able to use a service, they must first register and this process is illustrated in the flow diagram of FIG. 17. A user uses their web browser 13 to connect to the web server 71 over the Internet 20 in order to access the user registration form (step S100). The user enters the necessary registration data (step S101). The user registration CGI 86 receives the registration form data (step 102) and assigns the user a unique ID (step S103). The user's data is then entered into the users' database 76 by the user registration CGI 86 and the data is indexed by the user's ID (step S104). The user registration CGI 86 then downloads to the user's computer 10 the payment application installation code stored in the payment application installation code store 87 (step S105). The payment application installation application can then be executed by the user in order to install the payment application 12 on the user's computer 10. The installation process will also store the user's unique ID in a user's ID store 15 e.g. the hard disk drive of the user's computer 10. The user's computer 10 is thus ready to use the service. Initially, the receipt store 14 is empty since there have been no previous transactions. The user can access the spending limit interface in order to enter spending limit data into the spending limit data store. The receipts store 14 and the spending limit data store can comprise segments of the hard disk of the user's computer. The exchange rate data can be periodically downloaded to the user's computer for storage in the exchange rate data store 16 by the central server 70. This can take place during the reconciliation process performed by the reconciliation server 84 and will be described in more detail hereinafter.

Figure 18:
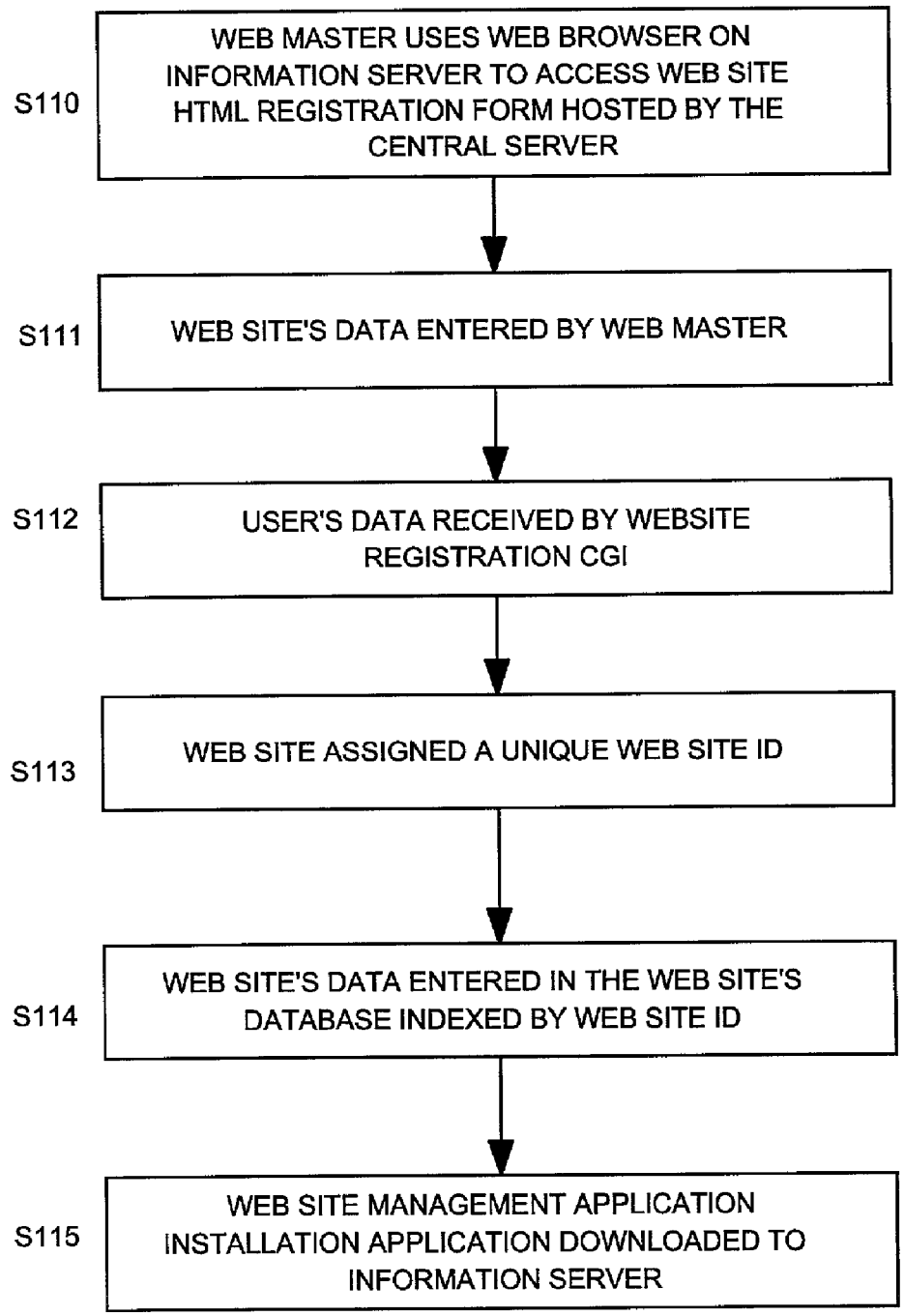
FIG. 18 is a flow diagram of the web site registration process.

The process of registering a web site (information server) will now be described with reference to the flow diagram of FIG. 18. A web master or administrator of the web site (information server) uses the web browser 48 on the information server 40 to access the web server 71 over the Internet 20 to gain access to the web site HTML registration form hosted at the central server 70 (step S110). The web master enters the web site's data in the HTML registration form (step S111). The registration form data is sent to the web site registration CGI 88 (step S112). The web site registration CGI 88 then assigns the web site a unique web site ID (step S1 13) and the web site data is entered in the web site database 77 indexed by the web site ID (step S114). The web site registration CGI 88 then downloads the web site management application installation code from the web site management application installation code store 89 to the information server 40 (step S115). The web site manager application installation code can then be executed at the information server to install all of the necessary components for the implementation of the service i.e. the web site manager 53, and the three CGI applications 42, 43 and 44.

Figure 19:
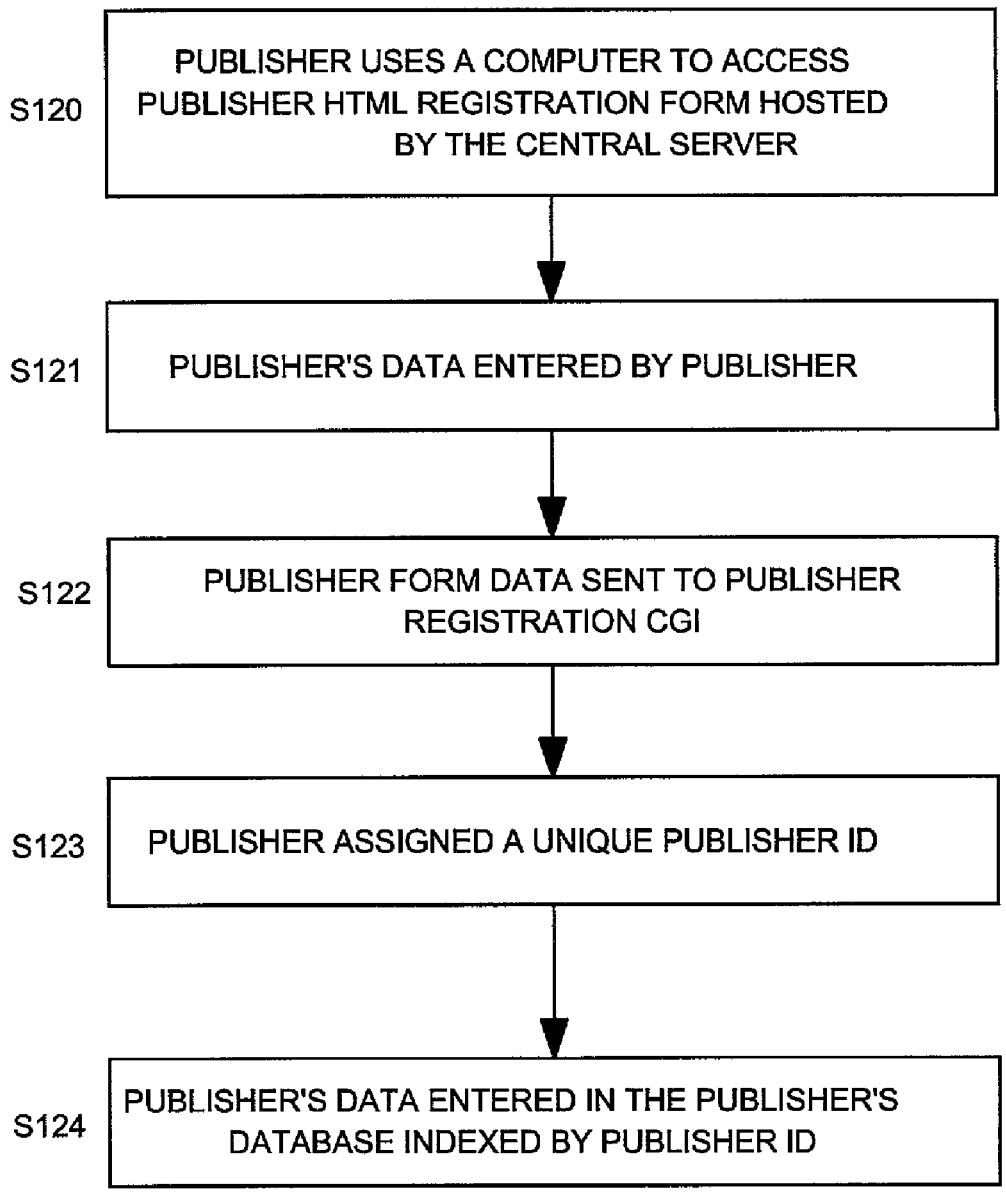
FIG. 19 is a flow diagram of the publisher registration process.

The method of registering publishers of information to the service will now be described with reference to the flow diagram of FIG. 19.

A publisher uses a computer with a web browser to access the web server 71 to gain access to the publisher HTML registration form hosted by the central server 70 (step S120). The publisher enters data in the registration form (step S121). The registration form data is sent to the publisher registration CGI 90 (step S122) and the publisher registration CGI assigns the publisher a unique ID (step S123). The publisher's data is then entered into the publishers' database 88 indexed by the publisher ID by the publisher registration CGI 90 (step S124).

Figure 20:
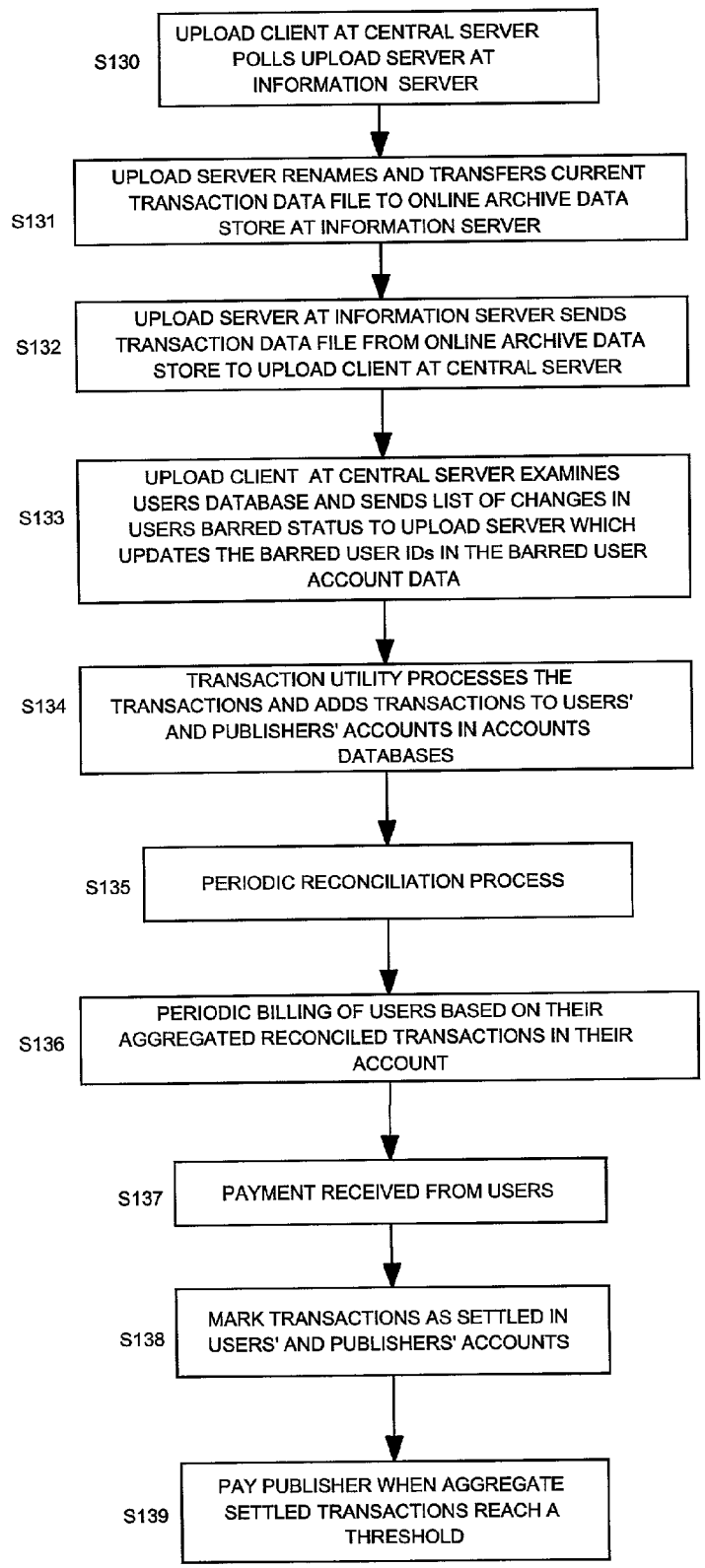
FIG. 20 is a flow diagram of the polling operation implemented by the upload client in the central server in the embodiment of the present invention.

The operation of the central server 70 in calling information servers 40 in order to reconcile and aggregate the transactions will now be described with reference to the flow diagram of FIG. 20.

The upload client 79 at the central server 70 is arranged to identify web sites from the web site database 77 and to periodically poll them in order to contact their respective upload servers 47 (step S130). The upload server 47 at the information server 40 renames the current transaction file (step S131) as the Universal Coordinated Time (UTC) date and time in the form YYYYMMDDHHMMSS at which it was first requested by the upload client 79 and transfers the file to the transaction online archive data store 59 at the information server 40 (step S132). The upload server 47 then inserts the transaction filename into an index of transaction files at the information server and sets the status to "unsent". The upload server 47 encrypts and sends the renamed transaction data file to the upload client 79 at the central server (step S132) and if successful changes the index status to "sent". The upload client 79 reads the transaction data and stores this in the website transaction data store 92 on the central server 70.

The upload client 79 of the central server then examines the users' database 76 at the central server 70 and sends a list of changes in barred users status. This information is used by the upload server 47 to update the barred user account data store 46 at the information server 40 (step S133). Users may be barred from making further purchases if for instance their account is unsettled, the account has been closed or the users credit card is reported as stolen or unusable for any reason. Users may be barred from using the service at all if for instance they have abused the service.

The upload server 47 may request the retransmission of a file or part of a file from the online archive data store 92 on the information server. In this was the central server 70 may recover from a loss of data. Transaction files in the online archive data store 92 on the information server 70 are periodically transferred to an offline archive, e.g. magnetic tape or some other offline storage medium, when the age of a transaction file exceeds a user defined value or the online archive data store 92 free storage space is determined to be running low. In this way, the transaction data stored in the transaction data store 45 of each information server 40 only stores transaction data for recent transaction. This reduces the amount of information that could be accessed by unauthorised personnel and reduces the storage requirement at the information server 40.

The transaction utility 80 in the central server 70 then processes the transaction data received by the upload client 79 and adds the transaction to the users' and publishers' accounts in the accounts database 83 (step S134). The transactions added to the users' accounts and publishers' accounts are added as unreconciled transactions since this merely represents data received from the information servers. Thus the users' accounts include a total of unreconciled transactions representing a cost to the user and the publishers' accounts show unreconciled transactions for each publisher for a number of users and this represents credit. However, the process of adding the transactions to the account database 83 (step S134) does not provide funds that are accessible to the publishers. The funds are only available once they have been reconciled. Periodically, the reconciliation process takes place (step S135) by the payment application 12 on the user's computer 10 contacting the reconciliation server 84 on the central system 70. This process will be described in more detail hereinafter with reference to the flow diagram of FIG. 21.

The result of the reconciliation process is that either the transactions are reconciled i.e. there is a match between the transaction data received from the information server and the receipt data stored in the receipt store 14 at the user's computer, or there is no match and the transaction is not accepted. The transaction utility 80 performs aggregation of the transactions within the accounts database 83. Users are periodically billed based on their aggregated reconciled transactions in their account (step S136). This billing is carried out by the payment server 85 in the central server 70 which makes a connection over a secure payment channel to a credit card server 40 in order to debit the user's credit card account. In order to do this, it has to access a user's database 76 in order to obtain the necessary authorisation information to authorise the transaction from the credit card server 4. The billing of the users takes place periodically when the aggregate amount reaches a certain threshold to make the transaction commercially viable i.e. the amount retrievable is sufficiently large to make it viable to pay the service charge to the credit card company for the transaction. If the aggregate reconciled transactions during a defined period have not reached the threshold, the payment server 85 may still make a request for payment for a threshold amount e.g. 10 dollars to be credited to the user's account. This puts the user's account in credit. This periodic billing even when a threshold has not been reached avoids the possibility of a user spending less the threshold and not being billed for it for some time. Instead, the user is billed for a threshold amount and their account remains in credit until the user spends the credit balance. When the user's credit balance has been consumed, the period after which the user's account will be billed for the threshold amount is calculated from the date of the first transaction to be made by the user after the credit balance is consumed.

When the payment is received from the user's credit card by the payment server 85 (step S137), the transactions in the accounts database 83 are marked as settled in the users' and publishers' accounts (step S138). When the aggregate settled transactions in a publisher's account reaches a threshold (step S139) the payment server 85 is instructed to make a payment over the secure channel to the publisher's account. The aggregate settled transactions once again should reach a threshold to make it commercially viable to transfer the funds to a publisher's account. Funds are only transferred to the publisher's account once payment has been received from the user.

Figure 21:
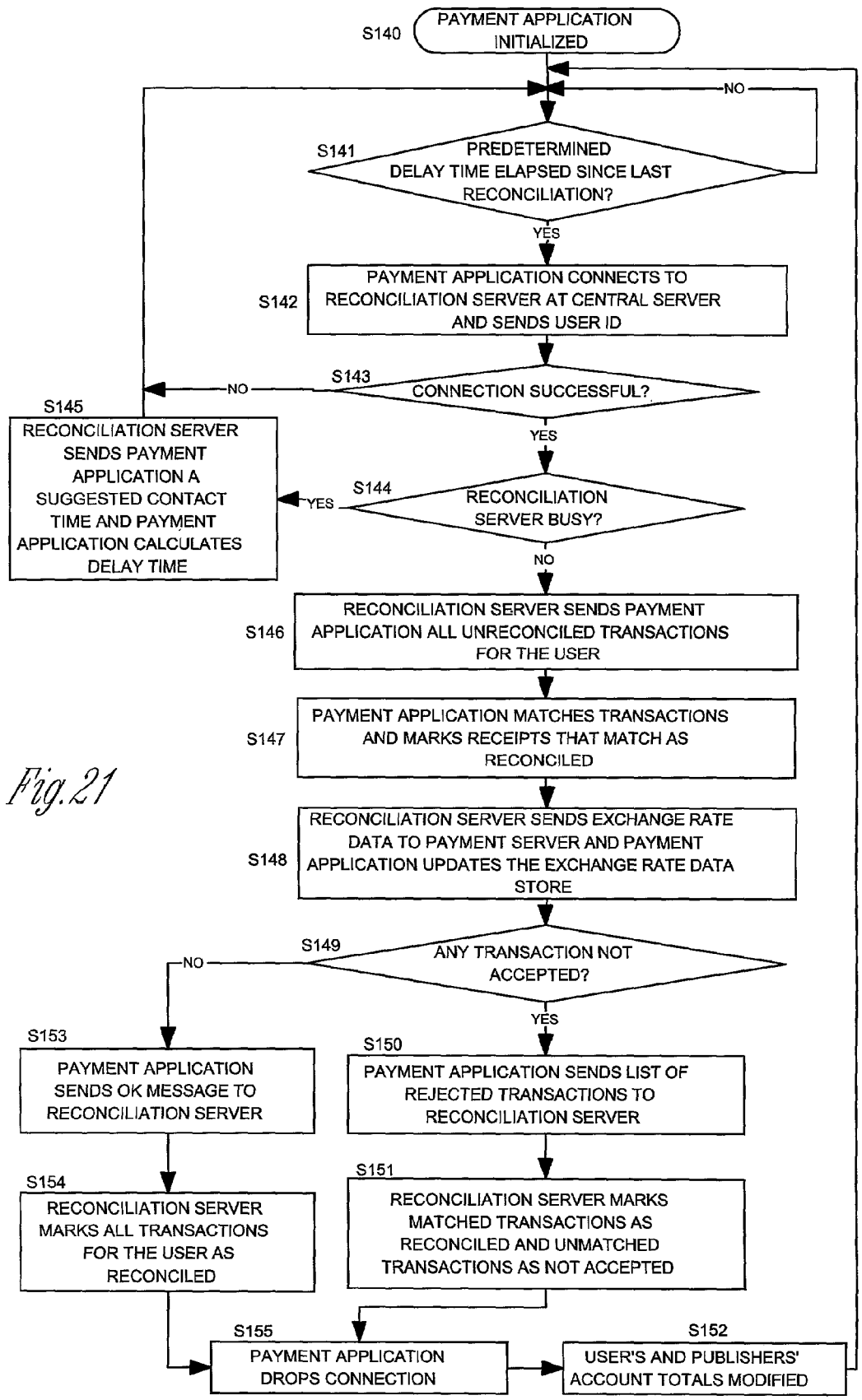
FIG. 21 is a flow diagram of the reconciliation process performed by the upload client and transaction utility in the central server in the embodiment of the present invention.

The reconciliation process (step S135 in FIG. 20) will now be described in more detail with reference to the flow diagram of FIG. 21.

When a payment application 12 is initialised (step S140), it waits a predetermined delay time (step S141) before making a TCP/IP connection over the Internet 20 to the reconciliation server 84 in the central server 70 (step S142). The unique user ID stored in the user's ID store 15 at the user's computer 10 is sent to the reconciliation server 84 to identify the user. If the connection is not successful (step S 143), the payment application waits a predetermined time since the last reconciliation attempt (step S141) before retrying to connect to the reconciliation server 84. If the connection is successful (step S143), the payment application determines whether the reconciliation server is busy (step S144). If the reconciliation server is busy, the reconciliation server sends the payment application a suggested contact time and payment application calculates a new delay time (step S145). The payment application then waits for the delay time (step S141) before trying to reconnect to the reconciliation server (step S142). If the reconciliation server is not busy (step S144), the reconciliation server 84 sends the payment application 12 all unreconciled transactions for the user in the accounts database 83 (step S146). The payment application 12 matches the transactions against receipts in the receipt store 14 and marks receipts that match as reconciled (step S147). The reconciliation server 84 also sends exchange rate data to the payment application 12 from an exchange rate data store 91 in the central server 70 and the payment application 12 updates the exchange rate data stored in the exchange rate data store 16 (step S148). If all of the transactions match receipts in the receipt store 14 (step S149), the payment application 12 sends an OK message to the reconciliation server 84 (step S153), the reconciliation server 84 marks all transactions for the user in the accounts database 83 as reconciled (step S154). The payment application 12 then drops the connection to the reconciliation server 84 (step S155) and the transaction utility modifies the users and publishers account totals in the account database 83 (step S155).

If not all of the transactions are matched with receipts (step S149), the payment application 12 sends a list of rejected transactions to the reconciliation server 84 (step S150). The reconciliation server 84 marks the matched transactions as reconciled and the unmatched transactions as not accepted (step S155). The payment application then drops the connection to the reconciliation server 84 (step S155) and the users and publishers account totals are modified by the transaction utility 80 (step S152).

It can be seen from the method described hereinabove with reference to FIGS. 20 and 21 that the central server aggregates the transaction data from the information servers for users and publishers and carries out a reconciliation process to provide a level of security to verify that there is matching transaction data at the information server 40 and at the users computers 10. Any unmatched transactions will not be billed to a user and a publisher will not be paid for. Transactions which are marked as not accepted in the accounts database can indicate unauthorised transactions being carried out at the information server. This provides a check to ensure correct billing.

Since the payment application 12 marks receipts as reconciled, when the next reconciliation process occurs, the payment application need only look at unmarked receipts in order to reduce the processing required in order to match transactions with unreconciled receipts.

The payment application can also mark receipts as expired or delete receipts which have expired once it is detected that their valid period plus transaction date is beyond the current clock date of the user's computer. This reduces the storage capacity required for the receipt store 14: there is no need to store useless expired receipts. Of course, if the receipts are short-lived compared to the spending limits entered by the user, the total transaction data stored in the spending limit data store 11 for the monitoring of spending is unaffected. The transaction totals will be stored as a total which has date and time associated with each transaction so that for example, yesterday's transactions do not count for today's spending limit total of 7 dollars as illustrated in FIG. 13.

As can be seen in FIG. 15, the central server 70 includes a publishers account page CGI 81 and a user's account page CGI 82 which allows the publisher and user respectively to access their account information via the web server 71 and the appropriate CGI 81 or 82. The user, publisher and website manager are able to access and amend their details held in the databases 76, 77 and 78 via the web server 71 hosting appropriate HTML forms. In order to do this the user, publisher or website manager enters an ID and password in a secure HTML page hosted by the web server 71. The respective CGI 86, 88 or 90 delivers the HTML form with the account details to allow the user, publisher or website manager to amend form. The respective CGI 86, 88 or 90 (or an associated CGI) then validates and updates the account details in the respective database 76, 77 or 78.

The transactions aggregated by the transaction utility 80 within the accounts database 83 may be in different currencies and therefore the exchange rate data in the exchange rate data store 91 is used to convert the currencies to a user's currency so that the user's account is in the user's chosen currency. Each set of exchange rate data includes a serial number so that when the exchange rate data in the user's computer needs to be updated, this can simply be achieved by comparing the serial numbers of the exchange rate data in the exchange rate data store 91 in the central server 70 and the serial number of the exchange rate data in the exchange rate data store 16 at the user's computer 10. If it is different, the exchange rate data is sent by the reconciliation server over the Internet 20 to the exchange rate data store 16 as described hereinabove (step S148).

The operation of the web site manager 53 at the information server 40 for setting up and managing the web site where information is made available to users will now be described with reference to FIGS. 22 to 29.

Figure 22:
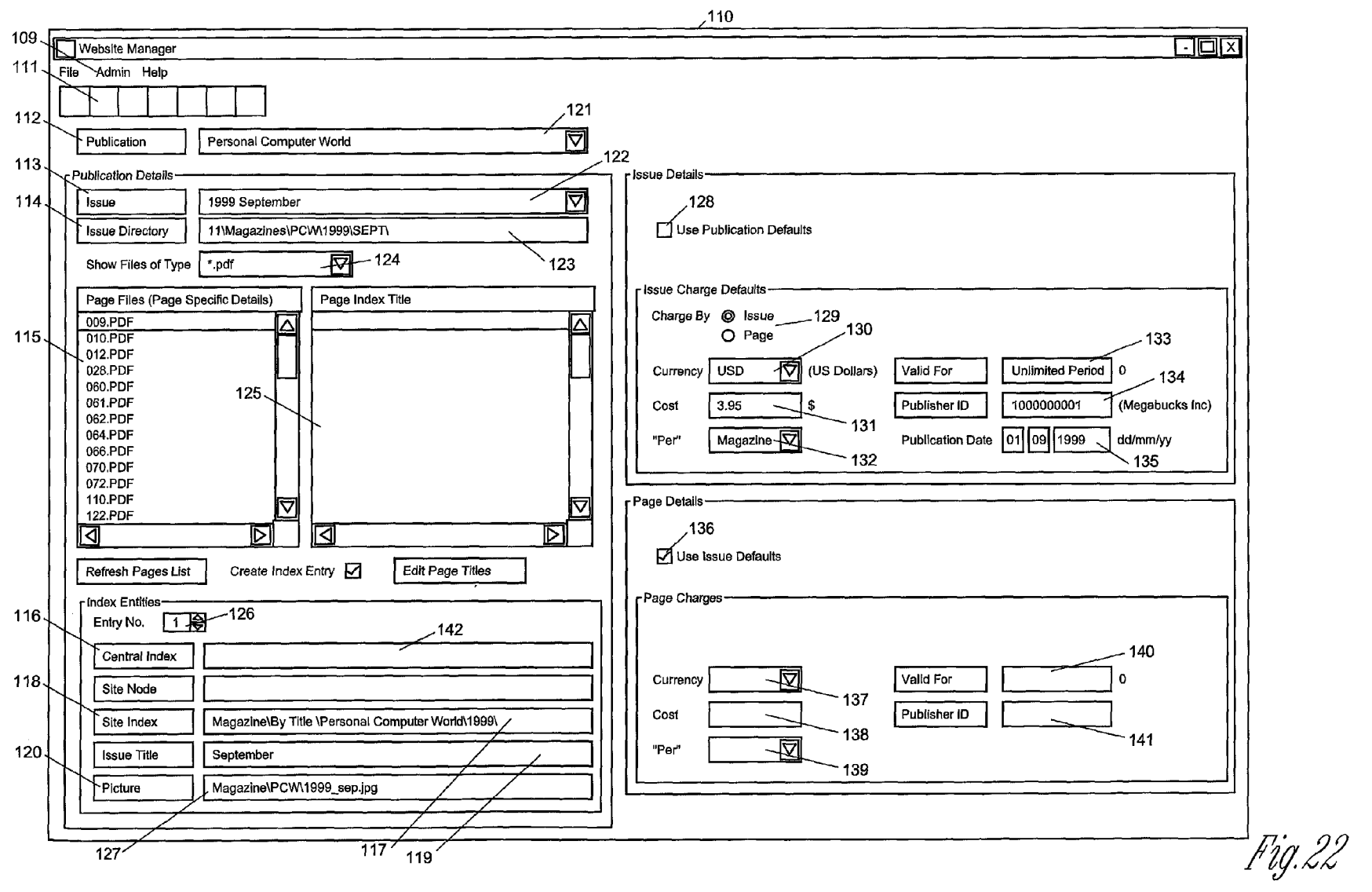

FIG. 22 illustrates the user interface 110 generated by the implementation of the web site manager 53. The web site manager 53 allows the web master to configure the site index information in the site index information store 58, set up charging parameters in the information charge data store 51 and organise the way the information is indexed for the user.

Figure 25:
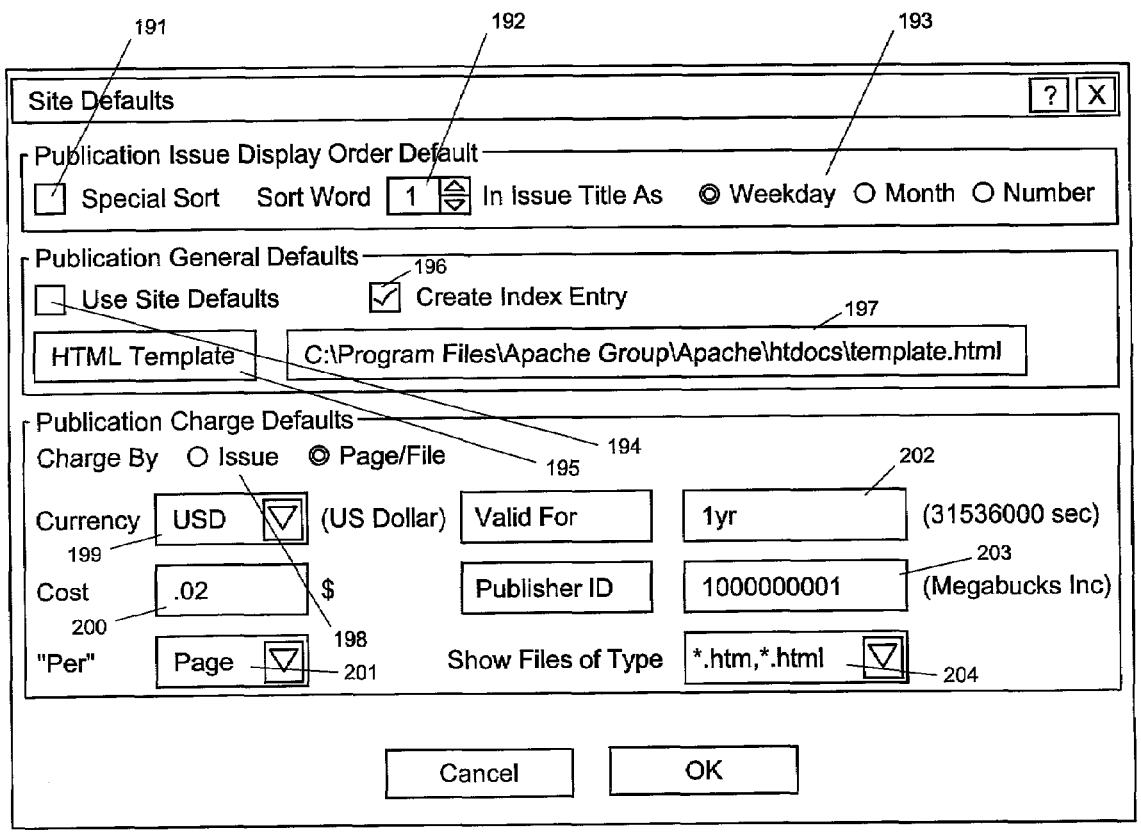
FIG. 25 is a diagram of the user interface for entering web site default information.

Site charge default details can be entered indicating the charge to be made for all content sold at the web site unless overridden. The interface shown in FIG. 25 is invoked from the Admin menu 109 shown in FIG. 22. The default method of determining the order in which publication issue titles are displayed in dropdown box 122 of the interface shown in FIG. 22 may be defined using controls 191, 192 and 193 in FIG. 25. The button 195 enables an HTML template to be selected for the site to be used for generating index web pages when a template has not been defined for a publication using controls 158 and 159 in FIG. 23. The HTML template file path is shown in box 197. An HTML template comprises a web page template (HTML code) generated to include special user-defined tags e.g. <XYZ> and </XYZ> which are non standard HTML tags which can be used to identify the position in the web page template at which index links are to be automatically inserted as will be described in more detail hereinafter. Radio buttons 198 allow the publication to be charged either by the issue or by the page. If a publication is defined as being charged by the issue a user requesting to download a chargeable page or file incurs a charge for the entire issue. Further pages of the issue are downloaded to the user without further charge. In this example, the charge details are set up per page. A publisher ID is chosen from a list of publishers to show the publisher ID in the box 203. A currency type (which in this case is US dollars) is chosen in box 199 and a cost per page can be entered in box 200. The selection in box 201 determines the description of the charge unit to be displayed in the index. In this example "$0.02 per Page" would be shown. In box 202 the valid period parameter is entered, which in this example is given as one year. The default file type of the files to be shown in box 115 of FIG. 22 is selected in dropdown box 204. This information is stored for the site to be used when the interface of FIG. 23 is displayed and the publication is selected using the dropdown box 151 and checkbox 156 is checked indicating that the site default charge data should be used for that publication. FIG. 23 thus enables default parameters to be entered for a web site that may be overridden for a specific publication in the interface shown in FIG. 23 or a specific issue or specific page or file in the interface shown in FIG. 22.

As can be seen in FIG. 22, a dropdown box 121 is available to select the publication. Button 112 invokes the interface as shown in FIG. 23. FIG. 23 enables parameters for a publication, which in this case is Personal Computer World to be set up. Dropdown box 151 allows selection of the publication. Button 152 invokes an interface that allows the publication title to be changed. In this case the publication is designated as a monthly publication. The method of determining the order in which publication issue titles are displayed in dropdown box 122 of the interface shown in FIG. 22 may be defined using controls 153, 154 and 155. If checkbox 156 is checked the site default charging data will be used for the publication. The button 159 enables a HTML template to be selected for the publication to be used for generating index web pages for all content pages for the publication. The HTML template file path is shown in box 158. An HTML template comprises a web page template (HTML code) generated to include special user-defined tags e.g. <XYZ> and </XYZ> which are non standard HTML tags which can be used to identify the position in the web page template at which index links are to be automatically inserted as will be described in more detail hereinafter.

Publication charge default details can be entered indicating the charge to be made for the publication unless overridden. Radio buttons 160 allow the publication to be charged either by the issue or by the page. If a publication is defined as being charged by the issue a user requesting to download a chargeable page or file incurs a charge for the entire issue. Further pages of the issue are downloaded to the user without further charge. In this example, the charge details are set up per page. A publisher ID is chosen from a list of publishers to show the publisher ID in the box 165. A currency type (which in this case is US dollars) is chosen in box 161 and a cost per chargeable unit (either issue or page or file) can be entered in box 162. The selection in box 163 determines the description of the charge unit to be displayed in the index. In this example "$0.05 per Page" would be shown. In box 164 the valid period parameter is entered, which in this example is given as unlimited. In box 167, subscription periods and costs can be entered so that a user is able to subscribe to a number of specific issues. The issues that a user may access under a subscription are determined by the publication dates of the issues and the start date and period of the subscription purchased. Thus users may continue to access issues to which they have subscribed after the subscription period has passed. This information is stored for the publication to be used when the interface of FIG. 22 is displayed and the publication issue is selected using the dropdown box 122 and checkbox 128 is checked indicating that the publication default charge data should be used for that issue. FIG. 23 thus enables default parameters to be entered for a publication that may be overridden for a specific issue or specific page or file in the interface shown in FIG. 22.

Figure 26:
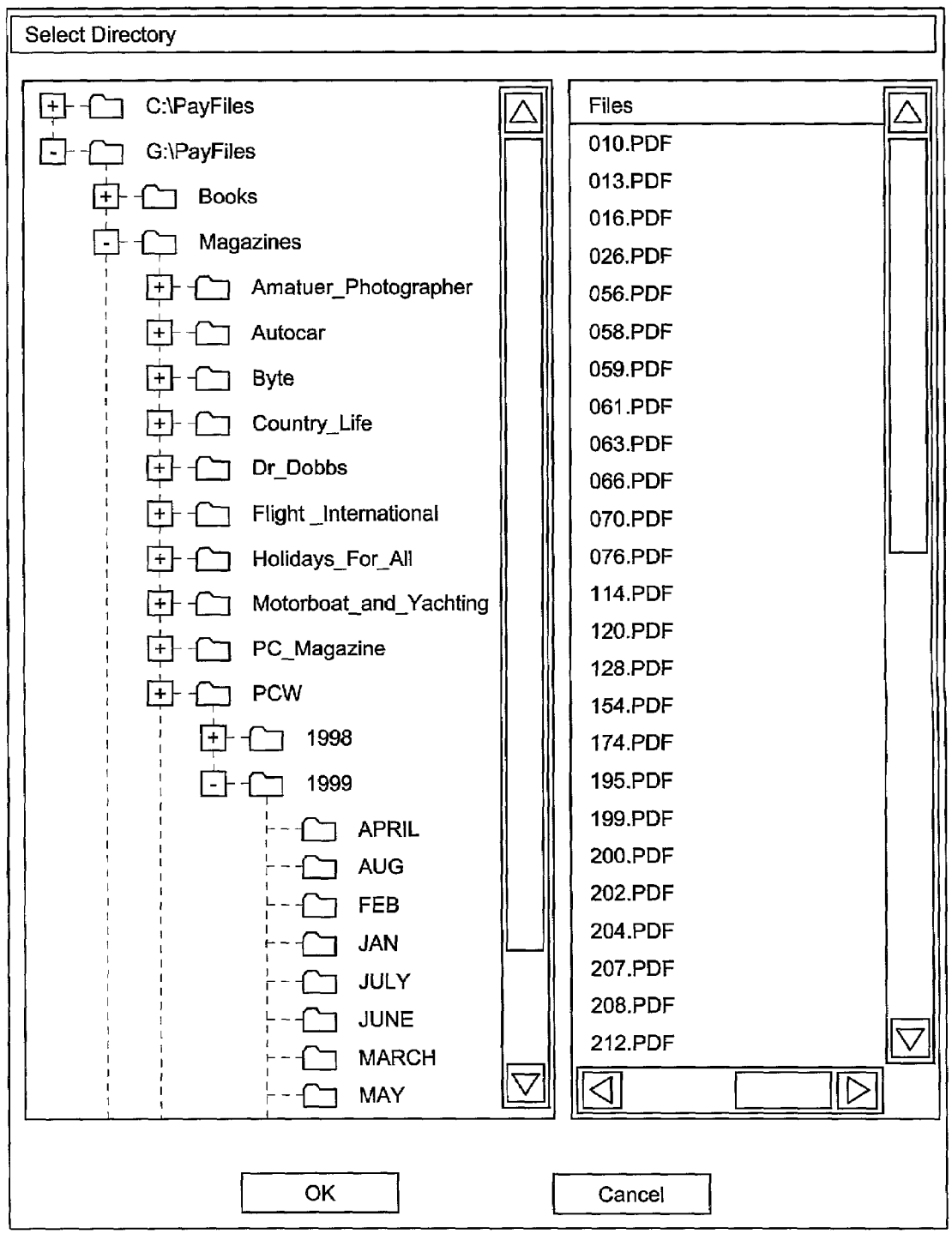
FIG. 26 is a diagram of the user interface for selecting the location of the files comprising a publication issue.

In FIG. 22, publication issue details can be entered and selected. The issue can be selected in dropdown box 122. Button 114 invokes the interface as shown in FIG. 26 from which the directory containing the files that comprise the publication issue can be selected. The issue directory selected is shown in box 123.

Figure 27:
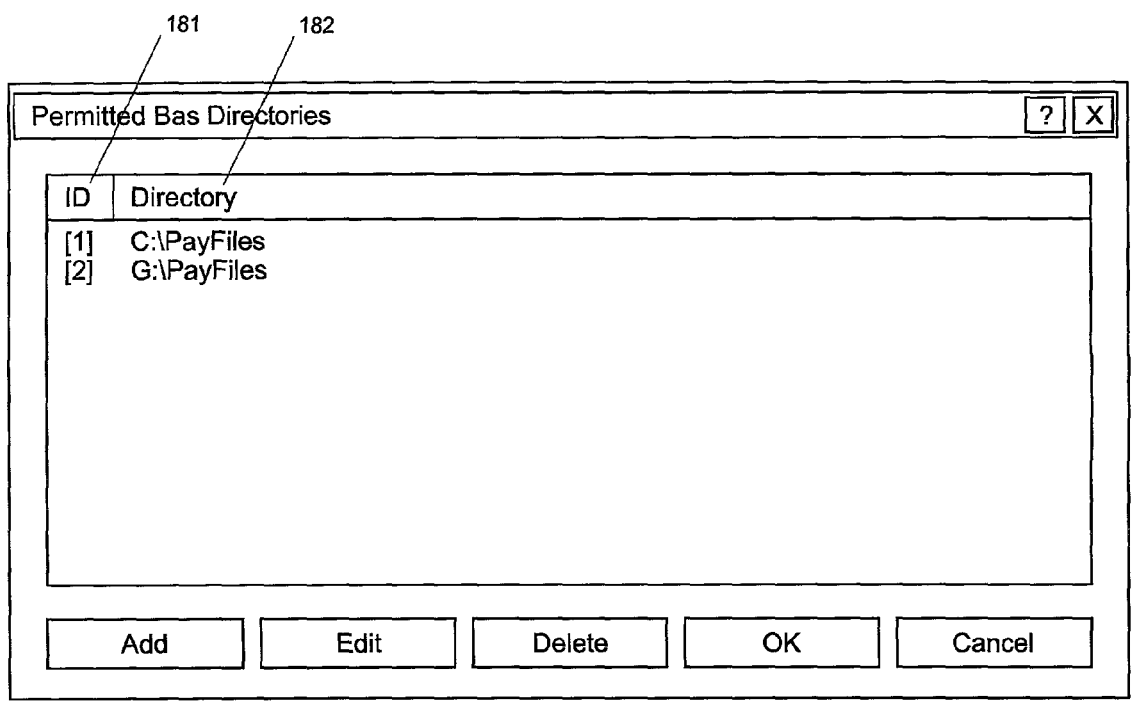
FIG. 27 is a diagram of the user interface for defining Permitted Base Directories.

The directories offered for selection in the interface shown in FIG. 26 are limited to those defined by the system administrator as permitted base directories. These are defined in the interface shown in FIG. 27, which is accessible from the Admin menu 109 shown in FIG. 22. Upon definition the permitted directory defined in column 182 of FIG. 27 is allocated a token value shown in column 181. The token value delimited by a right square bracket is used in the URL links generated in the HTML index files and content files to refer to the corresponding permitted base directory path. Users may select as an issue directory 123 any directory that is a permitted base directory or a directory that has a permitted base directory as its root. Thus users are prevented from placing content for sale in directories that are unauthorized and a potential security risk. Additionally the entire structure of the machines or networks or storage devices or directories may be changed without the need to redefine the location of each group of files that comprise the various publication issues. Additionally this obfuscation increases the resistance of the system to malicious attack via the Internet.

In box 115 in FIG. 22, the files contained in the issue directory are listed. These files typically contain the pages, chapters or other subdivisions of the publication issue. The files listed in box 115 may be limited to those with the file type selected in dropdown box 124 thus excluding from publication files not intended for publication, e.g. administrative data files. Index entries identify the index structure for the information. A central index category can be entered and selected using the button 116. This indicates the central index category in which the title of the publication issue defined in box 119 will be placed in the information index database 75 at the central server 70. A site index category can be input and selected using the button 118 to display the interface shown in FIG. 24. Up to six central index and six site index entries may be defined for an issue, each separate entry being selected by control 126. That is up to six separate values may be entered in boxes 117, 119 and 142.

Figure 24:
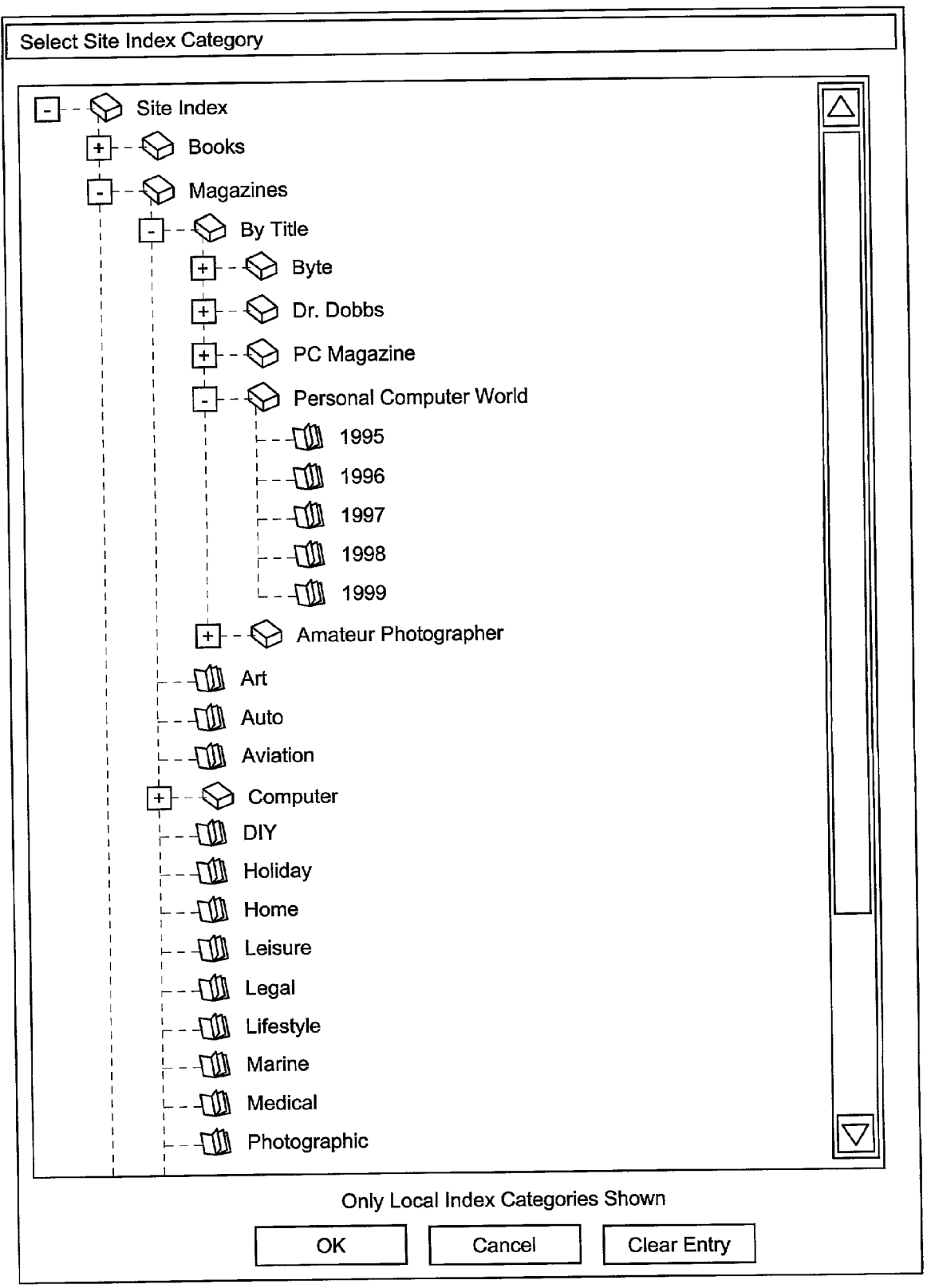
FIG. 24 is a diagram of the user interface for constructing the index hierarchy in the embodiment of the present invention.

FIG. 24 shows the local index categories and provides a hierarchical organisation of information. In this case the Personal Computer World magazine has five years worth of issues selectable. Thus, this index data can be used for the organisation of the information. In box 119 of FIG. 22, the issue title is defined. Button 120 invokes an interface from which an image file may be selected to represent the issue. The path of the image file is displayed in box 127. Thus for the September 1999 issue of Personal Computer World, there is a thumbnail image available.

If checkbox 128 is checked the issue selected will use the publication default charge data. If checkbox 128 is unchecked the issue selected will derive its default charging information from controls 129, 130, 131 132 133 and 134 of FIG. 22. Using control 129 a user can select whether the charge defined in box 131 is levied for an entire issue or a single page or file. A user can select the currency using the box 130, the cost using the box 131. The selection in box 132 determines the description of the charge unit to be displayed in the index. In this example "$3.95 per Magazine" would be shown. The valid period can also be selected using box 133 and the publisher ID can be selected using box 134. Also the publication date can be selected using box 135.

The charging information for individual pages or files may be defined separately to override the issue default charging information. Individual pages or files may be selected in box 115. If checkbox 136 is checked the page or file selected in box 115 will use the issue charging information defaults. If checkbox 136 is unchecked the page or file selected in box 115 will derive its charging information from controls 137, 138, 139 140 and 141 of FIG. 22. A user can select the page or file currency using the box 137, the page or file cost using the box 138. The selection in box 139 determines the description of the charge unit to be displayed in the index. The page or file valid period can also be selected using box 140 and the page or file publisher ID can be selected using box 141.

Thus the charging information for a large amount of content for sale may be defined with the minimum of input yet be easily overridden for a single issue or a single page or file.

In box 125, text information for each page or file can be input as an index title. This enables the text to be input as a link rather than relying on an image.

Using the web site manager 53, details on the hierarchical index structure of the site can be constructed to form a site index identifying the organisation of information. This is stored in the site information index store 58, the charge information which includes master site ID, site ID, file ID, content ID, publication ID, cost, currency, valid period, publisher ID, publication date and the unit to which the costs relate, are stored in the information charge data store 51. This information can be accessed by the first and third CGI applications 43 and 44 using file ID for CGI application 1 and application ID for CGI application 3 i.e. for subscriptions. For subscriptions, subscription information is also entered in the information charge data store but this instead of being indexed by file ID (which includes content ID) is instead indexed by publication ID. Information in the information charge data store 51 includes all of the information necessary for forming the transaction receipt and the subscription receipt.

Once a user has constructed the site index hierarchy and arranged the information in a desired manner, either a title or titles in box 125 or a picture using box 127 must be provided for each node in the index tree i.e. for each page of information (the leaf of the tree) or for each node such as an issue, a year, or a publication e.g. Personal Computer World.

Figure 28:
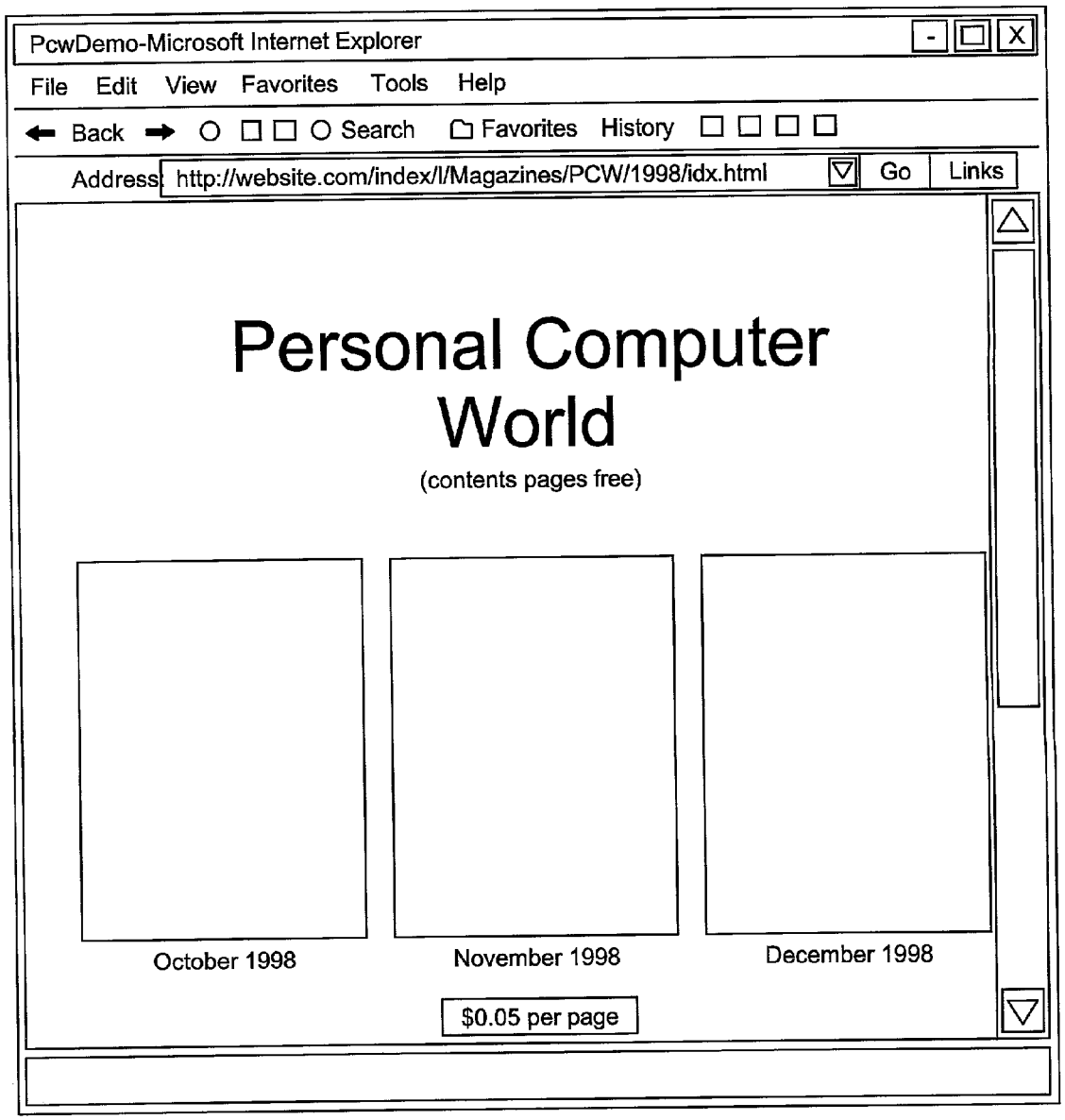
FIG. 28 is a diagram of a web browser interface displaying an index web page to publications generated by the web site manager.

Having constructed the hierarchical organisation of index data and entered data to be used as a link on an index web page, the user can select button 111 and the web site manager will use the appropriate HTML templates to automatically generate index web pages such as that shown on FIG. 28. As can be seen in the web site address of FIG. 28, the issue directory identifies the directory path for the index web page. In this example, 3 thumbnail images are arranged within a template. The index web page also includes code to provide cost information to a user. In this embodiment, it can be seen that there is the ability provided by the web page to provide a mouse over operation enabling the cost per page to be displayed to the user.

Figure 29:
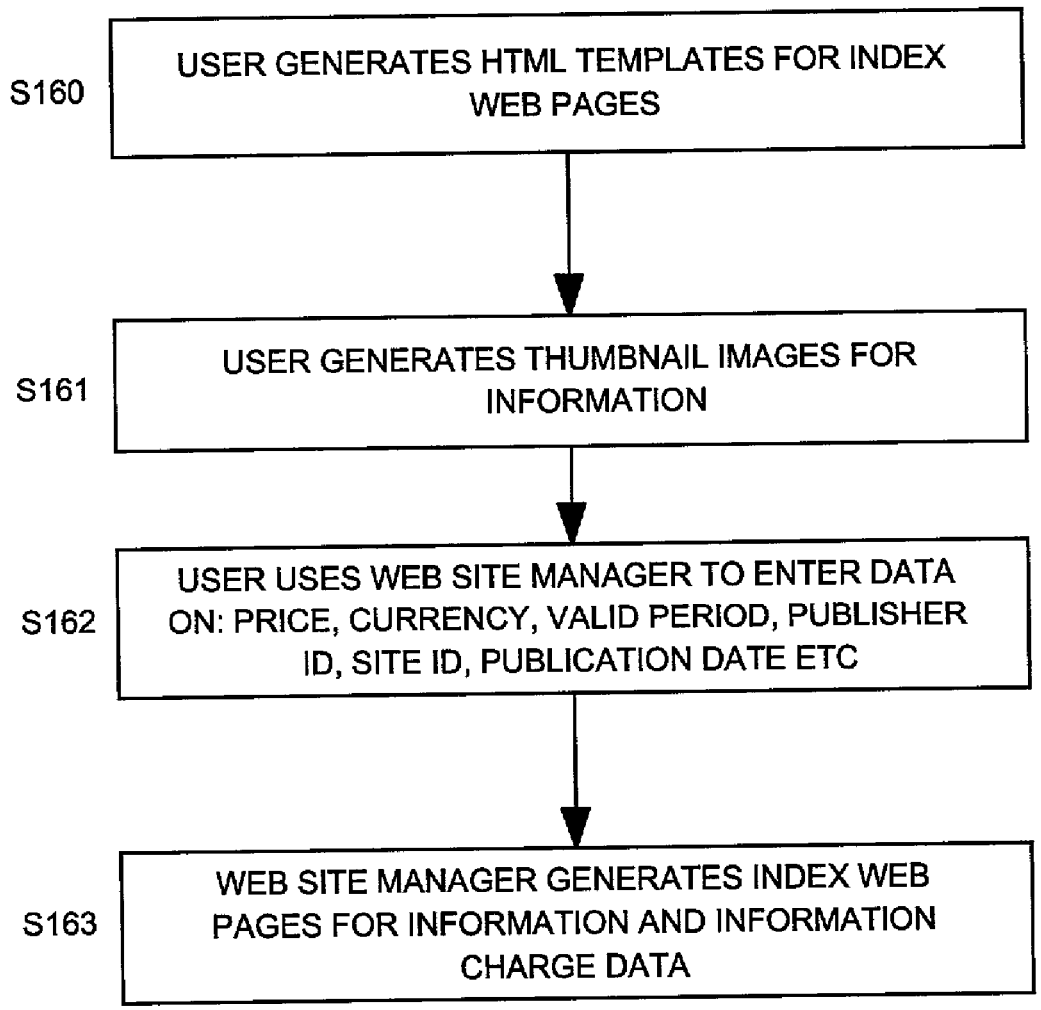
FIG. 29 is a flow diagram of the index web page generation process.

FIG. 29 is a flow diagram illustrating the process for generating the index web pages. Initially a user uses the HTML editor 57 to generate HTML templates for index web pages for various nodes in the index tree (step S160). The HTML templates are stored in the HTML template store 56 which can be read by the web site manager 53. The HTML editor 57 can comprise any proprietary HTML editor or even a text editor for writing HTML code.

The user also uses an image editor 54 to access information in the chargeable information store 52 to generate thumbnail images for the information (step S161). The thumbnail images are stored in the thumbnail image store 55 and can be accessed by the web site manager 53. The image editor 54 can comprise any conventional image editing program.

The user then uses the web site manager 53 to enter data on price, currency, valid period, publisher ID, site ID, publication date etc as described hereinabove (step S162). When the user selects the button 111, the web site manager then uses the HTML templates, the thumbnail images and the information input by the user to generate index web pages for information and information charge data (step S163). The index web pages are stored in the information index web page store 50 and the information charge data is stored in the information charge data store 51.

The central information index maintenance server 74 maintains and updates the central information index web page data store 73. In order to do this, the central information index maintenance server 74 can also receive requests from the web site manager 53 to add or edit central index nodes. For instance a website may wish to add a new publication title to a central index category or node. The granting of this request is controlled by the "trust level" of the website in question. A website having a high "trust level" is allowed to add or edit index categories without restriction. A request to add or edit an index category or node from a website having a lower "trust level" triggers the manual intervention of an operator at the central server 70.

The auto-generation of the information index web pages uses the hierarchical index information to determine how to organise and arrange the links inserted in the HTML template. Thus, the web master is able to use the web site manager to select the order of the files in order to select the order in which they appear in the index web page. The web site manager automatically arranges the thumbnail images in the index web page in accordance with the order in the index data thus ensuring a logical ordering of the links to the information for the user to interface with.

The method of synchronising time at the information server and at the user's computer will now be described with reference to FIGS. 30 and 31.

An important factor in the security of the system is the validation of receipts by the information servers and the users computers. The validation procedure relies on determining whether the receipts have expired. This requires a reference time. A reference time can be obtained from the internal clock of the user's computer and of the information server. However, these clocks may not be synchronised and can be altered by the user or by the web master. This would allow a user or a web master to circumvent the validation procedure by altering the internal clock of the computer. For example, a user could put back the internal clock of the user's computer so that the receipt is determined to be valid and is sent. Also, a web site manager could turn forward the clock at an information server so that receipts are always determined to be invalid and users are always recharged for information and new receipts are issued.

One method to overcome this would be to resynchronise the internal clock of the user's computer and the information servers periodically. However, the resynchronisation of internal clocks can cause significant problems for other operations carried out by the computers.

Therefore, in this embodiment of the present invention, the resynchronisation of the clocks at the computers is avoided by determining an offset time at each computer and using the offset time for the processing of data.

Figure 30:
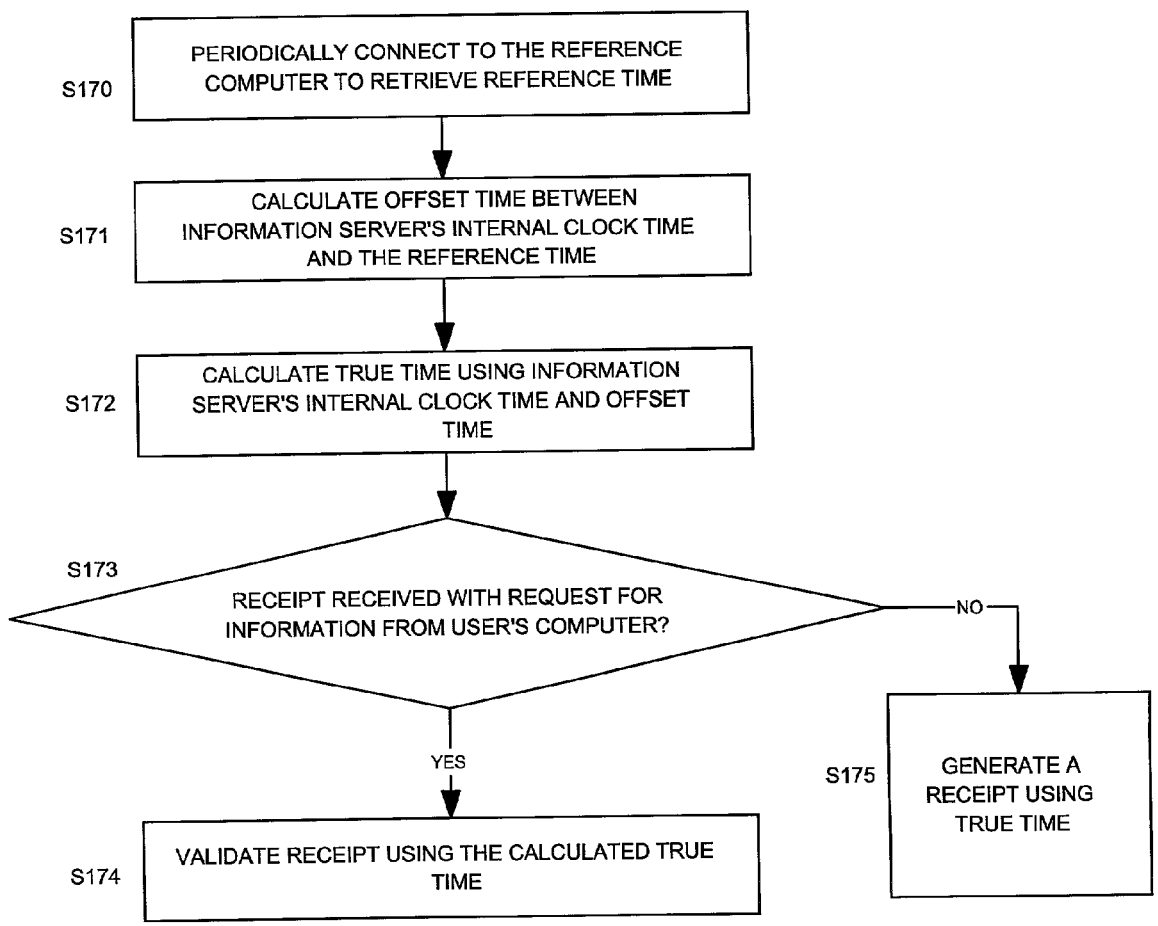
FIG. 30 is a flow diagram of the time synchronisation process at the information server.

FIG. 30 is a flow diagram illustrating the process implemented at the information server. Periodically, the information server connects to a reference computer to retrieve a reference time (step S170). An offset time between the information servers internal clock time and the reference time is calculated (step S171). A true time is then calculated using the information server's internal clock time and the calculated offset time (step S172). When the information server receives the request for information, it determines whether there is a receipt with the request for information (step S173). If not, a receipt is generated using the true time (step S175). A receipt can then be transmitted to the user. If a receipt is received with the request for information from the user's computer (step S173), the receipt is validated using the calculated true time (step S175).

Figure 31:
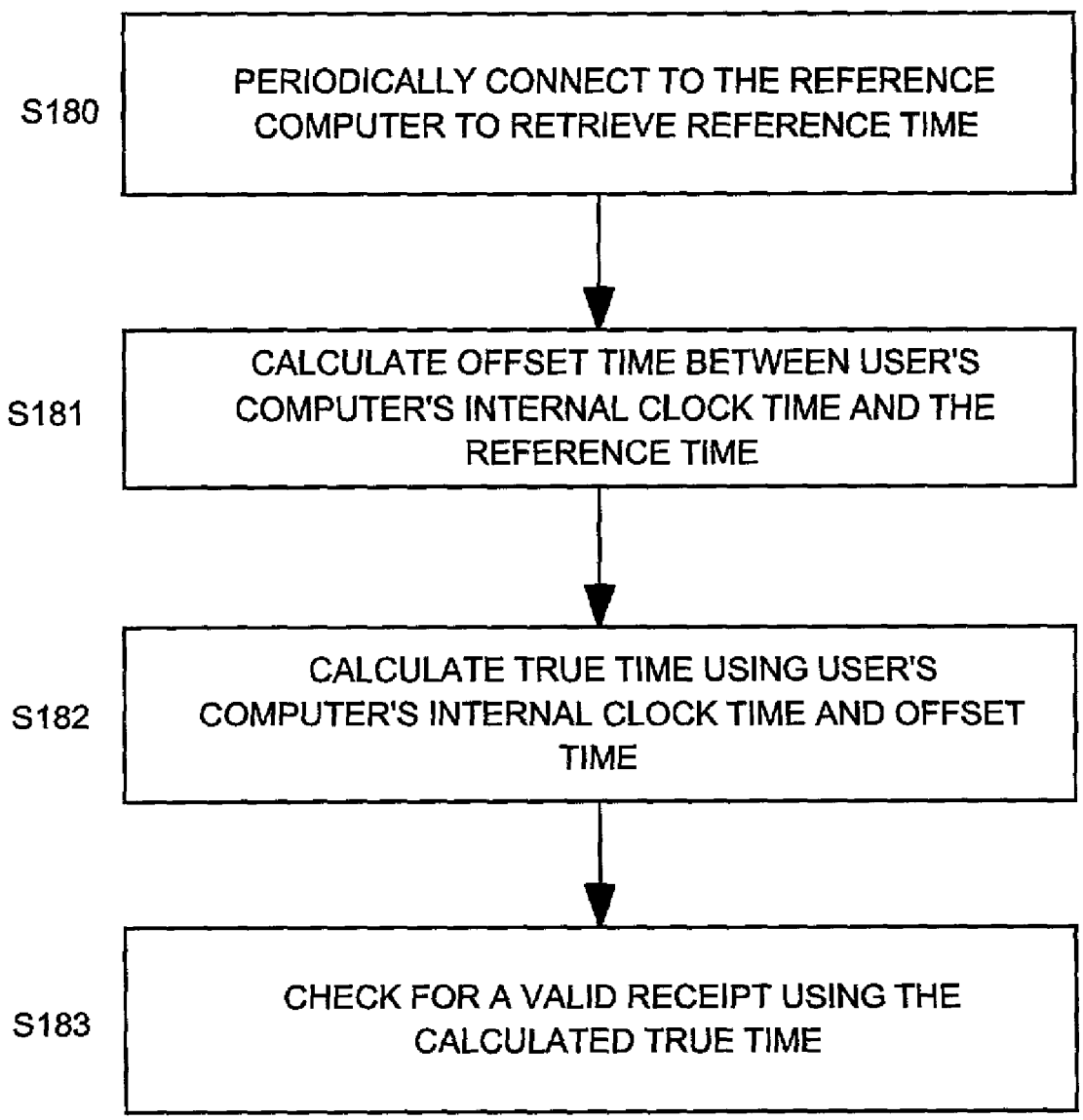
FIG. 31 is a flow diagram of the time synchronisation process at the user's computer.

FIG. 31 is a flow diagram illustrating the process implemented at the user's computer.

Periodically, the user's computer connects to a reference computer to retrieve a reference time (step S180). The reference computer may or may not be the same as that connect to by the information server so long as the reference time is substantially synchronised. An offset time is calculated using the user's computer internal clock time and the reference time (step S181). A true time is calculated using the user's computer internal clock time and the offset time (step S182). Valid receipt determination is carried out using the calculated true time (step S183).

Thus both at the information server and at the user's computer, offset times are stored. At the information server, the offset time is used in the generation of the receipts. At the user's computer, the offset time is used in the validation of the offset receipts. Thus the storage of an offset time avoids the need to reset the internal clock of the information server and the user's computer, thereby avoiding complications for other processing operations.

All times used for determining transaction times and receipt validity are Universal Coordinated Time (UTC) also referred to as Greenwich Mean Time (GMT). The reference time can be obtained by the user's computer and the information server from the same time server over the Internet, but need not. It is common for there to be more than one time server available which means that the information server and the user's computer could access different time servers. Each timer server will give the same time, normally UTC (GMT), to within a very small degree of error. Even allowing for slight inaccuracies in calculating the network round trip time, the error is rarely more than a small fraction of a second. Internet protocols in general work to an accuracy of one second in determining the age of an entity. Thus this is the degree of synchronicity which suffices in this embodiment.

Although the present invention has been described hereinabove with reference to a specific embodiment, modifications lie within the spirit and scope of the present invention as will be apparent to a skilled person in the art.

Although the embodiment of the present invention has been described with reference to networking over the Internet, the present invention is applicable to networking over any type of communications network. For example, the present invention is applicable to networking over a local area network, an Intranet, or an Extranet. Further, the communications network can comprise a terrestrial or a wireless communications network, or a combination of both.

In the embodiment of the present invention, a file identifier is used to identify each piece of information. Although a file path will uniquely identify a piece of information at an information server, it is possible that a mirrored site could provide the same information. Thus, the use of a file ID ensures that this piece of information is uniquely identified and the file ID can identify the master site ID from which the file ID which includes the content ID for the information which was originally generated.

In an embodiment of the present invention, the payment application comprises an independent executable application. The application is independent of the browser thereby providing independence of the security functions of the browser and providing the additional security functions of reconciliation. The executable application can be written in any suitable programming code including C++ and Java (trade mark). The payment application in the embodiment is implemented as a proxy web server through which HTTP requests from the browser are routed and through which all responses are routed. In an alternative embodiment, the payment application could monitor the HTTP requests and responses at the socket layer by patching into winsock.dll in the Microsoft Windows 95 and 98 (trade mark) operating system. The payment application and the web browser are two simultaneously implemented applications cooperating together. The payment application acts as a trusted application to provide the payment function and a level of security without requiring significant user input. For example the use of the payment application avoids the need for a user to set and continuously override security warnings by a browser when using secure features of a browser e.g. the secure socket layer, cookies, or Java (trade mark)applets.

In an embodiment of the present invention, the user ID and the receipt information transmitted between the payment application and the information server is encrypted. The encryption can be of any proprietary form and provides an additional low level of security.

Although the embodiment of the present invention is described with reference to access to files comprising an image of a magazine page, the present invention is applicable to the payment for and provision of electronic content of any form for which there is a charge to be made to the recipient of the information. For example, the information can comprise audio, video, images, text, documents, computer data, computer files, etc. The present invention is also further applicable to pay TV for example.

The present invention is not limited to micro payments. The cost of the transaction can comprise any amount that can be billed to a customer. Where the amounts are large, these need not be aggregated at the central server but can instead be billed immediately.

Although in the described embodiment the information server and the central server are described as comprising a single server, the present invention encompasses the configuration of the information server and the central server as a file server configuration in which an operator is connected to a file server to access, configure and control the system. Thus in this configuration the information server and the central server need not have a user interface capability i.e. there is no requirement for a monitor, mouse and keyboard. The user interface capability can be provided by a local area network to connect another computer to the file server.

Further, modifications lie within the spirit and scope of the present invention will be apparent to a skilled person in the art.

What is claimed is:

1. An electronic payment method for payment for a product in electronic form, the method comprising:

at a customer's terminal, receiving a user request for the product, determining if the product has been paid for previously by identifying if there is a corresponding transaction receipt stored at the customer's terminal, and transmitting a request for the product over a communications network to a merchant's terminal with any identified transaction receipt for the product;

at the merchant's terminal, receiving the request for the product, determining if there is an accompanying transaction receipt, transmitting the product to the customer's terminal, and if no accompanying transaction receipt is received, recording the transaction, and generating and transmitting a transaction receipt to the customer's terminal; and at the customer's terminal, receiving the requested product, and receiving and storing any transaction receipt for the product.

2. An electronic payment method according to claim 1, wherein method is performed at the customer's terminal by an executable application, the user request is initially received by a client application and input to the executable application, the request for the product is received over the network by a server application, and the product is transmitted over the network by the server application.

3. An electronic payment method according to claim 2, wherein the executable application acts as a proxy server for the client application.

4. Terminal apparatus for use by a customer in a secure payment system for payment for a product in electronic form, the terminal apparatus comprising:
- a network interface for connection to a communications network;
- a user interface for allowing a user to generate a request for a product;
- storage means for storing transaction receipts;
- determining means for determining if the product has been paid for previously by identifying if there is a corresponding transaction receipt stored in said storage means;
- transmission control means for controlling said network interface to transmit a request for the product over the communications network to a merchant's terminal with any identified transaction receipt for the product; and
- reception control means for receiving any transaction receipt for the requested product from said merchant's terminal over the network and storing the received transaction receipt in said storage means.

5. Terminal apparatus according to claim 4, including a processor; wherein said user interface comprises client application code implementable by said processor, said determining means, said transmission control means and said reception control means comprise executable application code implementable by said processor, and said executable application code is adapted to control the processor to receive the request from said client application code.

6. Terminal apparatus according to claim 5, wherein said executable application code is adapted to act as a proxy server for the client application code.

7. Terminal apparatus according to claim 5, wherein said executable application code is adapted to identify whether or not the request is a request for a chargeable product, to transmit the request unchanged over the communications network if the request is not for a chargeable product, and to add any transaction receipt for the requested product before transmitting the request over the communications network if the request is for a chargeable product.

8. Terminal apparatus according to claim 4, wherein said client application comprises a web browser, said request comprises a HTTP request with code to identify the request as a request for a chargeable product, and said executable application code is adapted to identify that the request is a request for a chargeable product by identifying the code.

9. Terminal apparatus according to claim 4, wherein said client application comprises a web browser, said request comprises a HTTP request, and said transmission control means is adapted to encode any receipt as ASCII and add the ASCII to the request before transmitting the request over the communications network.

10. Terminal apparatus according to claim 4, wherein said transmission control means is adapted to transmit transaction receipts stored in said storage means to a payment server.

11. Terminal apparatus according to claim 4, wherein said reception control means is adapted to receive transaction information from a payment server, the apparatus including transaction reconciliation means for comparing the transaction information with the transaction receipts in said storage means, wherein said transmission control means is adapted to send information on the result of the comparison to the payment server.

12. Terminal apparatus according to claim 4, wherein said user interface is adapted to allow a user to request a subscription for a regularly provided product, wherein said transmission control means is adapted to transmit the subscription request over the communications network to the merchant's terminal, said reception control means is adapted to receive a subscription receipt from said merchant's terminal over the network and to store the received subscription receipt in said storage means, and said determining means is adapted to determine if the product has been paid for previously by identifying if there is a corresponding transaction receipt or subscription receipt stored in said storage means.

13. Terminal apparatus according to claim 4, wherein said transmission control means is adapted to transmit unique user identification information with said request over said communications network, and said transaction receipt includes the unique user identification information.

14. A method of obtaining a vendible product in electronic form, the method comprising:
- receiving a user selection and generating a request for a product;
- determining if the product has been paid for previously by identifying if there is a corresponding stored transaction receipt;
- transmitting the request for the product over a communications network to a vendor with any identified transaction receipt for the product; and
- receiving any transaction receipt for the requested product from a vendor over the communications network and storing the received transaction receipt.

15. A method according to claim 14, wherein the user selection is received by a client application, the determining, transmitting and receiving are performed by an executable application, and said executable application receives the request from said client application.

16. A method according to claim 15, wherein said executable application acts as a proxy server for the client application.

17. A method according to claim 15, wherein said executable application identifies whether or not the request is a request for a chargeable product, transmits the request unchanged over the communications network if the request is not for a chargeable product, and adds any transaction receipt for the requested product before transmitting the request over the communications network if the request is for a chargeable product.

18. A method according to claim 14, wherein said client application comprises a web browser, said request comprises a HTTP request with code to identify the request as a request for a chargeable product, and said executable application identifies that the request is a request for a chargeable product by identifying the code.

19. A method according to claim 14, wherein said client application comprises a web browser, said request comprises a HTTP request, and any receipt is encoded as ASCII and added to the request before transmitting the request over the communications network.

20. A method according to claim 14, including transmitting stored transaction receipts to a payment server.

21. A method according to claim 14, including receiving transaction information from a payment server, comparing the transaction information with the stored transaction receipts, and sending information on the result of the comparison to the payment server.

22. A method according to claim 14, including receiving a user subscription selection, generating a request for a subscription for a regularly provided product, transmitting the subscription request over the communications network to the vendor, receiving a subscription receipt from said vendor over the communications network, storing the received subscription receipt, and determining if the product has been paid for previously by identifying if there is a corresponding stored transaction receipt or subscription receipt.

23. A method according to claim 14, unique user identification information is transmitted with said request over said communications network, and said transaction receipt includes the unique user identification information.

24. A computer apparatus for obtaining a vendible product in electronic form, the apparatus comprising:
   a data memory operable to store data to be processed;
   an instruction memory storing processor implementable instructions; and
   a processor operable to read and process the data in accordance with instructions stored in the instruction memory;
   wherein the instructions stored in the instruction memory comprise instructions for controlling the processor to:
   receive a user selection and generating a request for a product;
   determine if the product has been paid for previously by identifying if there is a corresponding stored transaction receipt in the data memory;
   transmit the request for the product over a communications network to a vendor with any identified transaction receipt for the product; and
   receive any transaction receipt for the requested product from a vendor over the communications network and storing the received transaction receipt in the data memory.

25. A computer apparatus according to claim 24, wherein the instructions stored in the instruction memory comprise a client application, and an executable application, and said executable application is adapted to receive the request from said client application.

26. A computer apparatus according to claim 25, wherein said executable application is adapted to act as a proxy server for the client application.

27. A computer apparatus according to claim 25, wherein said executable application comprises code to control said processor to identify whether or not the request is a request for a chargeable product, to transmit the request unchanged over the communications network if the request is not for a chargeable product, and to add any transaction receipt for the requested product before transmitting the request over the communications network if the request is for a chargeable product.

28. A computer apparatus according to claim 24, wherein said client application comprises a web browser, said request comprises a HTTP request with code to identify the request as a request for a chargeable product, and said executable application comprises code to control said processor to identify that the request is a request for a chargeable product by identifying the code.

29. A computer apparatus according to claim 24, wherein said client application comprises a web browser, said request comprises a HTTP request, and said executable application comprises code to control said processor to encode any receipt as ASCII and to add to the ASCII to the request before transmitting the request over the communications network.

30. A computer apparatus according to claim 24, including transmitting stored transaction receipts to a payment server.

31. A computer apparatus according to claim 24, wherein the instructions stored in the instruction memory comprise instructions for controlling the processor to receive transaction information from a payment server, compare the transaction information with the transaction receipts in said data memory, and send information on the result of the comparison to the payment server.

32. A computer apparatus according to claim 24, wherein the instructions stored in the instruction memory comprise instructions for controlling the processor to receive a user subscription selection, generate a request for a subscription for a regularly provided product, transmit the subscription request over the communications network to the vendor, receive a subscription receipt from said vendor over the communications network, store the received subscription receipt, and determine if the product has been paid for previously by identifying if there is a corresponding stored transaction receipt or subscription receipt.

33. A computer apparatus according to claim 24, wherein the instructions stored in the instruction memory comprise instructions for controlling the processor to transmit unique user identification information with said request over said communications network, and said transaction receipt includes the unique user identification information.

34. Product vendor apparatus for providing vendible products in electronic form to users over a communications network, the apparatus comprising:
   product storage means for storing products in electronic form;
   transaction storage means for storing transaction data to enable the users to be charged for provided products;
   receiving means for receiving a request for a product from a user over the communications network;
   determining means for determining if valid transaction receipt data for the product is included with the request;
   transmitting means for transmitting the requested product over the communications network to the user with no charge if valid transaction receipt data for the product is received from the user, and for transmitting the requested product over the communications network to the user with transaction receipt data for the product if valid transaction receipt data for the product is not received from the user; and
   transaction processing means for recording the transaction for which transaction receipt data is sent in said transaction storage means.

35. Product vendor apparatus according to claim 34, including a processor, wherein said receiving means and said transmitting means comprise server program code implementable by said processor, and said determining means and said transaction processing means comprise application program code interfaced to said server program code.

36. Product vendor apparatus according to claim 34, wherein said request comprises a HTTP request; transaction receipt data, if present, is encoded in the request as ASCII; and said determining means is adapted to decode any transaction receipt data in a received request and to encode transaction receipt data as ASCII and add the ASCII to a HTTP header sent with the product before the product is transmitted over the communications network by said communication means.

37. Product vendor apparatus according to claim 34, wherein said determining means is adapted to generate transaction receipt data for the product for transmission over the communications network by said communication means if valid transaction receipt data is not received with the request for a product.

38. Product vendor apparatus according to claim 34, wherein the request includes information uniquely identifying the user, including user validation means for performing a validation of the received information and for preventing the transmission of the requested product by the transmission means if the validation fails.

39. Product vendor apparatus according to claim 38, including unauthorised user storage means for storing information on users who are not authorised to receive products, wherein said validation means is adapted to compare the received information uniquely identifying the user with the information in said unauthorised user storage means and to prevent the transmission of the requested product by the transmission means if the comparison identifies that the user is not authorised.

40. Product vendor apparatus according to claim 34, wherein said receiving means is adapted to receive a subscription request for a product from a user, including subscription means for providing subscription receipt data for the product, wherein said transmission means is adapted to transmit the subscription receipt data to the user, said determining means is adapted to determine if valid subscription receipt data for the product is included with the request for the product; and said transmitting means is adapted to transmit the requested product over the communications network to the user with no charge if valid subscription receipt data for the product is received from the user with the request for the product, and for transmitting the requested product over the communications network to the user with transaction receipt data for the product if valid transaction or subscription receipt data for the product is not received from the user with the request for the product.

41. Product vendor apparatus according to claim 34, including transaction storage control means for transmitting the transaction data stored in said transaction storage means to a payment server over said communications network.

42. Product vendor apparatus according to claim 41, wherein said transaction storage control means is adapted to delete the transaction data stored in said transaction storage means after the transmission of the transaction data to said payment server over said communications network.

43. Product vendor apparatus according to claim 34, including index storage means for storing an index of the products stored in said product storage means, and user interface means to allow a user to access the index storage means to use the index to generate a request for a product.

44. Product vendor apparatus according to claim 43, wherein said index storage means is adapted to store the index as web pages with hypertext links comprising requests for products, and said user interface means comprises a web server for providing the index web pages to a web browser operated by a user.

45. A method of providing vendible products in electronic form to users over a communications network, the method comprising:
  receiving a request for a product from a user over the communications network;
  determining if valid transaction receipt data for the product is included with the request;
  transmitting the requested product over the communications network to the user with no charge if valid transaction receipt data for the product is received from the user, and for transmitting the requested product over the communications network to the user with transaction receipt data for the product if valid transaction receipt data for the product is not received from the user; and
  recording the transaction for which transaction receipt data is sent in a transaction store.

46. A method according to claim 45, wherein the receiving and the transmitting are performed by a server application, and the determining and the transaction processing are performed by an application program interfaced to said server application.

47. A method according to claim 45, wherein said request comprises a HTTP request; transaction receipt data, if present, is encoded in the request as ASCII; any transaction receipt data in a received request is decoded, and transaction receipt data is encoded as ASCII and added to a HTTP header sent with the product before the product is transmitted over the communications network.

48. A method according to claim 45, wherein transaction receipt data for the product is generated for transmission over the communications network if valid transaction receipt data is not received with the request for a product.

49. A method according to claim 45, wherein the request includes information uniquely identifying the user, the method including performing a validation of the received information and preventing the transmission of the requested product if the validation fails.

50. A method according to claim 49, including storing information on users who are not authorised to receive products, comparing the received information uniquely identifying the user with the stored information and preventing the transmission of the requested product by the transmission means if the comparison identifies that the user is not authorised.

51. A method according to claim 45, including receiving a subscription request for a product from a user, providing subscription receipt data for the product, transmitting the subscription receipt data to the user, determining if valid subscription receipt data for the product is included with the request for the product, transmitting the requested product over the communications network to the user with no charge if valid subscription receipt data for the product is received from the user with the request for the product, and transmitting the requested product over the communications network to the user with transaction receipt data for the product if valid transaction or subscription receipt data for the product is not received from the user with the request for the product.

52. A method according to claim 45, including transmitting the stored transaction data to a payment server over said communications network.

53. A method according to claim 52, including deleting the stored transaction data after the transmission of the transaction data to said payment server over said communications network.

54. A method according to claim 45, including storing an index of the products, and allowing a user to access the index to use the index to generate a request for a product.

55. A method according to claim 54, wherein said index is stored as web pages with hypertext links comprising requests for products, and a web server provides the index web pages to a web browser operated by a user.

56. A computer apparatus for providing vendible products in electronic form to users over a communications network, the apparatus comprising:
  a transaction store for storing transaction data;

an instruction memory storing processor implementable instructions; and a processor operable in accordance with instructions stored in the instruction memory;

wherein the instructions stored in the instruction memory comprise instructions for controlling the processor to:

receive a request for a product from a user over the communications network;

determine if valid transaction receipt data for the product is included with the request;

transmit the requested product over the communications network to the user with no charge if valid transaction receipt data for the product is received from the user, and for transmitting the requested product over the communications network to the user with transaction receipt data for the product if valid transaction receipt data for the product is not received from the user; and record the transaction for which transaction receipt data is sent in said transaction store.

57. A computer apparatus according to claim 56, wherein the instructions stored in the instruction memory comprise a server application for performing the receiving and the transmitting, and an application program interfaced to said server application for performing the determining and the transaction processing.

58. A computer apparatus according to claim 56, wherein said request comprises a HTTP request; and the instructions stored in the instruction memory comprise instructions for controlling the processor to encode the transaction receipt data, if present, in the request as ASCII, to decode any transaction receipt data in a received request, to encode transaction receipt data as ASCII, and to add the ASCII to a HTTP header sent with the product before the product is transmitted over the communications network.

59. A computer apparatus according to claim 56, wherein the instructions stored in the instruction memory comprise instructions for controlling the processor to generate transaction receipt data for the product for transmission over the communications network if valid transaction receipt data is not received with the request for a product.

60. A computer apparatus according to claim 56, wherein the request includes information uniquely identifying the user, and the instructions stored in the instruction memory comprise instructions for controlling the processor to perform a validation of the received information and to prevent the transmission of the requested product if the validation fails.

61. A computer apparatus according to claim 60, wherein the instructions stored in the instruction memory comprise instructions for controlling the processor to store information on users who are not authorised to receive products, to compare the received information uniquely identifying the user with the stored information, and to prevent the transmission of the requested product by the transmission means if the comparison identifies that the user is not authorised.

62. A computer apparatus according to claim 56, wherein the instructions stored in the instruction memory comprise instructions for controlling the processor to receive a subscription request for a product from a user, to provide subscription receipt data for the product, to transmit the subscription receipt data to the user, to determine if valid subscription receipt data for the product is included with the request for the product, to transmit the requested product over the communications network to the user with no charge if valid subscription receipt data for the product is received from the user with the request for the product, and to transmit the requested product over the communications network to the user with transaction receipt data for the product if valid transaction or subscription receipt data for the product is not received from the user with the request for the product.

63. A computer apparatus according to claim 56, wherein the instructions stored in the instruction memory comprise instructions for controlling the processor to transmit the transaction data stored in said transaction store to a payment server over said communications network.

64. A computer apparatus according to claim 63, wherein the instructions stored in the instruction memory comprise instructions for controlling the processor to delete the stored transaction data after the transmission of the transaction data to said payment server over said communications network.

65. A computer apparatus according to claim 56, wherein the instructions stored in the instruction memory comprise instructions for controlling the processor to store an index of the products, and to allow a user to access the index to use the index to generate a request for a product.

66. A method according to claim 65, wherein the instructions stored in the instruction memory comprise: instructions for controlling the processor to store said index as web pages with hypertext links comprising requests for products, and a web server to provide the index web pages to a web browser operated by a user.

67. A carrier medium encoding computer readable code for controlling a computer to carry out a method of obtaining a vendible product in electronic form, the code comprising code for:

receiving a user selection and generating a request for a product;

determining if the product has been paid for previously by identifying if there is a corresponding stored transaction receipt;

transmitting the request for the product over a communications network to a vendor with any identified transaction receipt for the product; and receiving any transaction receipt for the requested product from a vendor over the communications network and storing the received transaction receipt.

68. A carrier medium according to claim 67, wherein the user selection is received by a client application, the determining, transmitting and receiving are performed by an executable application, and said executable application receives the request from said client application.

69. A carrier medium according to claim 68, wherein said executable application acts as a proxy server for the client application.

70. A carrier medium according to claim 68, wherein said executable application identifies whether or not the request is a request for a chargeable product, transmits the request unchanged over the communications network if the request is not for a chargeable product, and adds any transaction receipt for the requested product before transmitting the request over the communications network if the request is for a chargeable product.

71. A carrier medium according to claim 67, wherein said client application comprises a web browser, said request comprises a HTTP request with code to identify the request as a request for a chargeable product, and said executable application identifies that the request is a request for a chargeable product by identifying the code.

72. A carrier medium according to claim 67, wherein said client application comprises a web browser, said request comprises a HTTP request, and any receipt is encoded as ASCII and added to the request before transmitting the request over the communications network.

73. A carrier medium according to claim 67, including code for transmitting stored transaction receipts to a payment server.

74. A carrier medium according to claim 67, including code for:
receiving transaction information from a payment server, comparing the transaction information with the stored transaction receipts, and sending information on the result of the comparison to the payment server.

75. A carrier medium according to claim 67, including code for:
receiving a user subscription selection, generating a request for a subscription for a regularly provided product, transmitting the subscription request over the communications network to the vendor, receiving a subscription receipt from said vendor over the communications network, storing the received subscription receipt, and determining if the product has been paid for previously by identifying if there is a corresponding stored transaction receipt or subscription receipt.

76. A carrier medium according to claim 67, wherein unique user identification information is transmitted with said request over said communications network, and said transaction receipt includes the unique user identification information.

77. A carrier medium encoding computer readable code for controlling a computer to carry out a method of providing vendible products in electronic form to users over a communications network, the code comprising code for:
receiving a request for a product from a user over the communications network;
determining if valid transaction receipt data for the product is included with the request;
transmitting the requested product over the communications network to the user with no charge if valid transaction receipt data for the product is received from the user, and transmitting the requested product over the communications network to the user with transaction receipt data for the product if valid transaction receipt data for the product is not received from the user; and
recording the transaction for which transaction receipt data is sent in a transaction store.

78. A carrier medium according to claim 77, wherein the receiving and the transmitting are performed by a server application, and the determining and the transaction processing are performed by an application program interfaced to said server application.

79. A carrier medium according to claim 77, wherein said request comprises a HTTP request; transaction receipt data, if present, is encoded in the request as ASCII; any transaction receipt data in a received request is decoded, and transaction receipt data is encoded as ASCII and added to a HTTP header sent with the product before the product is transmitted over the communications network.

80. A carrier medium according to claim 77, wherein transaction receipt data for the product is generated for transmission over the communications network if valid transaction receipt data is not received with the request for a product.

81. A carrier medium according to claim 77, wherein the request includes information uniquely identifying the user, the method including performing a validation of the received information and preventing the transmission of the requested product if the validation fails.

82. A carrier medium according to claim 81, including code for: storing information on users who are not authorised to receive products, comparing the received information uniquely identifying the user with the stored information and preventing the transmission of the requested product by the transmission means if the comparison identifies that the user is not authorised.

83. A carrier medium according to claim 77, including code for: receiving a subscription request for a product from a user, providing subscription receipt data for the product, transmitting the subscription receipt data to the user, determining if valid subscription receipt data for the product is included with the request for the product, transmitting the requested product over the communications network to the user with no charge if valid subscription receipt data for the product is received from the user with the request for the product, and transmitting the requested product over the communications network to the user with transaction receipt data for the product if valid transaction or subscription receipt data for the product is not received from the user with the request for the product.

84. A carrier medium according to claim 77, including code for transmitting the stored transaction data to a payment server over said communications network.

85. A carrier medium according to claim 84, including code for deleting the stored transaction data after the transmission of the transaction data to said payment server over said communications network.

86. A carrier medium according to claim 77, including code for: storing an index of the products, and allowing a user to access the index to use the index to generate a request for a product.

87. A carrier medium according to claim 86, wherein said index is stored as web pages with hypertext links comprising requests for products, and a web server provides the index web pages to a web browser operated by a user.

* * * * *